United States Patent [19]

Jinguji et al.

[11] Patent Number: 5,572,611
[45] Date of Patent: Nov. 5, 1996

[54] OPTICAL SIGNAL PROCESSOR, METHOD OF ITS CONTROL, METHOD OF ITS DESIGNING, AND METHOD OF ITS PRODUCTION

[75] Inventors: Kaname Jinguji; Masao Kawachi; Koichi Takiguchi, all of Mito, Japan

[73] Assignee: Nippon Telegraph and Telephone Corporation, Tokyo, Japan

[21] Appl. No.: 262,248

[22] Filed: Jun. 20, 1994

[30] Foreign Application Priority Data

| Jun. 21, 1993 | [JP] | Japan | 5-149081 |
| Aug. 11, 1993 | [JP] | Japan | 5-199490 |
| Feb. 21, 1994 | [JP] | Japan | 6-022911 |

[51] Int. Cl.$^6$ .............................. G02B 6/26; G02B 6/42
[52] U.S. Cl. ........................................... 385/17; 385/3
[58] Field of Search ........................... 385/17, 3, 9, 11, 385/14, 16

[56] References Cited

U.S. PATENT DOCUMENTS

| 4,818,050 | 4/1989 | Duthie | 385/17 |
| 5,181,134 | 1/1993 | Fatehi et al. | 385/17 |
| 5,222,162 | 6/1993 | Yap et al. | 385/14 |

FOREIGN PATENT DOCUMENTS

| 0099193 | 1/1984 | European Pat. Off. |
| 59-90816 | 5/1984 | Japan |
| 2212822 | 8/1990 | Japan |
| 511226 | 1/1993 | Japan |
| 5-061077 | 3/1993 | Japan |
| 5-150123 | 6/1993 | Japan |

OTHER PUBLICATIONS

"Fiber–Optic Lattice Signal Processing" Moslehi et al. Proceedings of the IEEE, vol. 72, No. 7, Jul. 1984, pp. 909–930.

"Synthesis of Coherent Two–Port Lattice–Form Optical Delay–Line Circuit" Jinguji et al., Journal of Light–wave Technology, vol. 13, No. 1, Jan. 1995, pp. 73–82.

IEEE Transactions on Audio and Electroacoustics, vol. AU–21, No. 6, Dec., 1973, "A Computer Program for Designing Optimum FIR Linear Phase Digital Filters", James H. McClellan et al., pp. 506–526.

Optical and Quantum Electronics 22 Jan (1990) pp. 391–416, "Silica Waveguides on Silicon and Their Application to Integrated–Optic Components", Masao Kawachi.

Kikuchi et al., "Lightwave Filter Architectures–A Mapping Technique of Power–Wave Digital Filters", Proc. Midwest Symp. Circuits Syst., vol. 33, No. 2, pp. 808–811 Jan. (1990).

Jinguji et al., Synthesis of Coherent Two–Port Lattice–Form Optical Delay–Line Circuit, J. Lightwave Tech., vol. 13, No. 1, Jan. 1995, pp. 73–82.

Yariv, Coupled–Mode Theory for Guided–Wave Optics, IEEE J. Quantum Elect., vol. QE–9, No. 9, Sep. 1973, pp. 919–920.

Jinguji et al., Mach–Zender Interferometer Type Optical Waveguide Coupler with Wavelength–Flattened Coupling Ratio, Elect. Letters, vol. 26, No. 17, Aug. 1990, pp. 1326–1327.

Ozeki et al., Adaptive equalization of polarization–mode dispersion, OFC/IOOC '93 Technical Digest, pp. 143–144. No Month 1993.

*Primary Examiner*—Rodney B. Bovernick
*Assistant Examiner*—Robert E. Wise
*Attorney, Agent, or Firm*—Spencer & Frank

[57] ABSTRACT

An optical signal processor according to the present invention is an optical circuit of a lattice configuration. Its basic circuit structure comprises 3 dB directional couplers, two optical waveguides with equal optical path lengths, and two optical waveguides with different optical path lengths (an optical path difference of about 1 to 50 mm). Phase controllers for performing phase shift are provided on the optical waveguides. The portions with equal optical path lengths function as variable directional couplers, and variable directional couplers having arbitrary coupling rates can be constructed by changing the phase controllers on the optical waveguides with equal optical path lengths. As for an adaptive filter, there is adopted a construction in which a photodetector for withdrawing part of output is provided at the output port, and a feedback electric wiring for feedback control is laid.

73 Claims, 41 Drawing Sheets

DIRECTIONAL COUPLER WITH VARIABLE COUPLING RATE

[WAVEGUIDE LAYOUT 1]
WAVEGUIDES WITH LONGER OPTICAL PATHS ARE PROVIDED ALTERNATIVELY ON WAVEGUIDES 1 AND 2 SIDES.

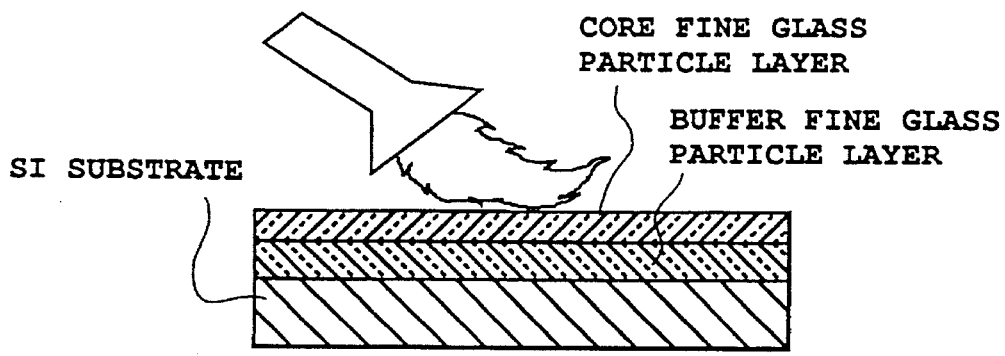
FIG.38A
(STEP 1)
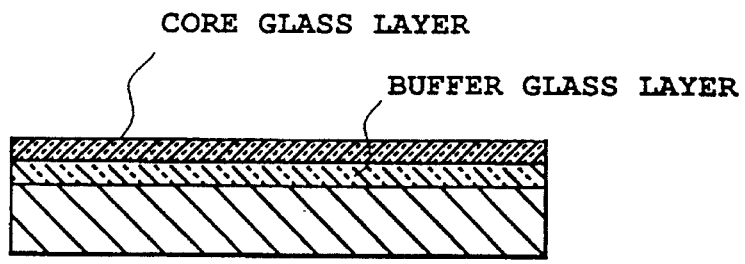
FIG.38B
(STEP 2)
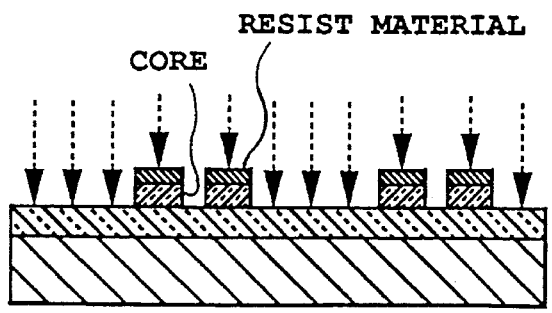
FIG.38C
(STEP 3)
FIG.38D
(STEP 4)

(STEP 5)

(STEP 6)

(STEP 7)

(STEP 8)

(STEP 1)

(STEP 2)

(STEP 3)

(STEP 4)

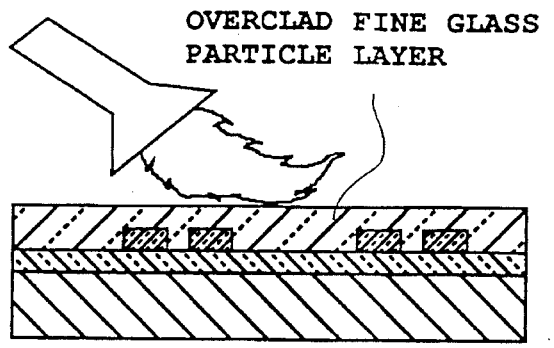
FIG.39E (STEP 5)
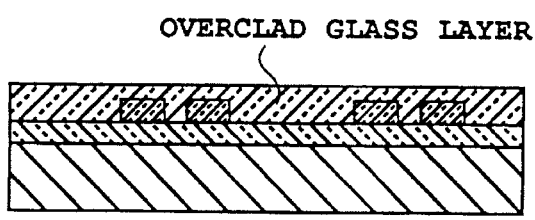
FIG.39F (STEP 6)
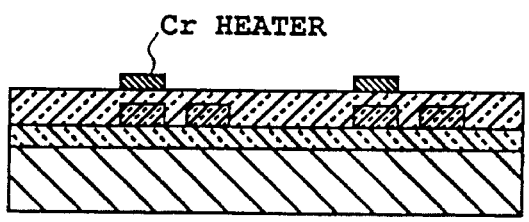
FIG.39G (STEP 7)
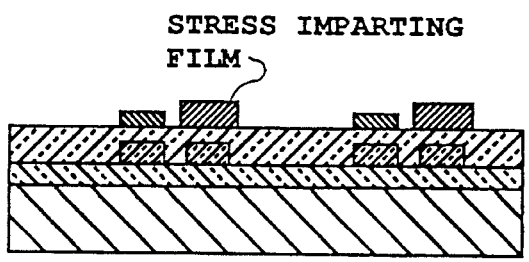
FIG.39H (STEP 8)
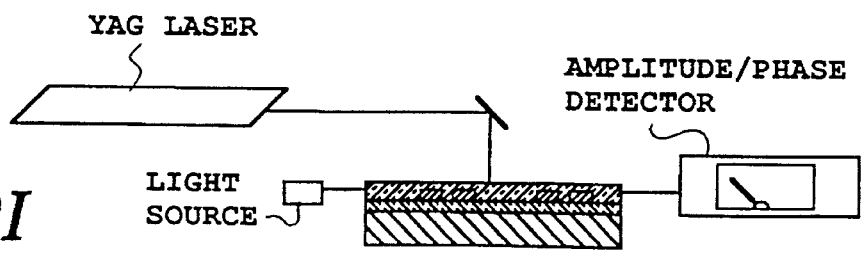
FIG.39I (STEP 9)

OPTICAL SIGNAL PROCESSOR, METHOD OF ITS CONTROL, METHOD OF ITS DESIGNING, AND METHOD OF ITS PRODUCTION

BACKGROUND OF THE INVENTION

1. Field of the Invention

The present invention relates to an optical signal processor for performing an arbitrary advanced optical filtering treatment in the fields of optical communication, optical exchange and optical computing, as well as a method of controlling the processor, a method of its designing, and a method of its production.

2. Description of the Prior Art

In recent years, wide attention has been drawn to optical signal processors capable of filtering optical signals, as such, in broad bands at high speeds, without converting them into electric signals, in the fields of optical communication, optical exchange and optical computing. In optical frequency multiplex communication where optical signals are multiplexed and transmitted, in particular, optical frequency filters which filter incoming frequency-multiplexed optical signal according to different frequencies are parts of importance.

Optical signal processors that have been reported to attain the above purpose include one of a transversal type as shown in FIG. 1 (see Japanese Patent Application Laying-Open No. 212822/1990). This type of device is constructed such that variable directional couplers 3-1 through 3-N are disposed on the input ports 5, 6 side, optical signals are distributed to branching waveguides 10-1 through 10-N at arbitrary branching ratios, and the branched optical signals are combined by a coupling part composed of N-1 3 dB directional couplers 9-1 to 9-(N–1). On the branching waveguides 10-1 through 10-N are arranged phase controllers 4-1 through 4-N for controlling the phases of the branched optical signals individually. This type of device can achieve the desired transmission characteristics by varying the coupling rates of the variable directional couplers 3-1 through 3-N, while varying the amounts of phase shift of the phase controllers 4-1 to 4-N.

According to the above-described circuit, the functional accuracy of the filter characteristics can be improved by increasing the number of the branching waveguides. Increasing the number N of the branching waveguides for the purpose of increasing the filter accuracy, however, poses the problem of the maximum transmittance of the transmission characteristics becoming small. This is because the directional coupler is basically a two-input two-output element, so that the 3 dB directional couplers 9-1 through 9-(N-1) of the coupling part have corresponding dummy ports 11-1 through 11-(N-1), from which the optical signals are partly released.

An optical signal processor of an improved transversal type as shown in FIG. 2 (see Japanese Patent Application Laying-Open No. 11226/1993) has been reported as a device for overcoming the above-mentioned drawback. In the aforementioned first transversal type device, the variable directional couplers 3-1, 3-3, 3-5 to 3-(2N-1) were used only on the input port side to optimize the coupling rate, while the 3 dB directional couplers 9-1 through 9-(N-1) were used at the coupling part on the output port side. In this second device, by contrast, variable directional couplers 3-2, 3-4, 3-6 to 3-2N are used not only on the input port side, but also on the output port side, to optimize the coupling rate.

Because of this construction, the second conventional device has succeeded in curtailing the lowering of the optical intensity after filtering that is noted when the number N of the branching waveguides is increased.

In the second conventional example, however, the transversal configuration made the number of the dummy output ports practically equal to that in the first conventional example. No matter how optimal the configuration adopted was, release of optical signals from the dummy output ports was not avoidable, and the achievement of a filtering device with a maximum transmittance of 100% was impossible.

SUMMARY OF THE INVENTION

The present invention has been accomplished in the light of the conventional technologies discussed above, and it has the following objectives:

(1) To realize, in a single filter circuit, an optical signal processor with a maximum transmittance of 100% capable of achieving the desired filter characteristics only by changing the circuit parameters set in the frequency region (improvement of an optical signal processor).

The present invention also aims at the following having four high grade characteristics:

(2) To realize an optical signal processor with an arbitrary maximum transmittance of 100% capable of achieving the desired filter characteristics in the wavelength region (realization of a filter with an arbitrary wavelength characteristics).

(3) To realize an optical signal processor having arbitrary filter characteristics involving an arbitrary maximum transmittance of 100%, or more than or less than 100% (realization of an arbitrary maximum transmittance).

(4) To realize, in a single filter circuit, an optical signal processor which changes the circuit parameters so as to have predetermined desired signal processing characteristics in a time series manner (programmability).

(5) To realize an optical signal processor capable of changing signal processing characteristics in harmony with input signals which change over time (realization of adaptive property).

As described above, the present invention aims not only at improving the conventional technologies, but also at realizing high grade signal processing, and more specifically, the attainment of some or all of those four targets.

To attain the five objects set forth above, the present invention adopts circuit structures, controlling methods, designing methods, and production methods as described below.

DESCRIPTION (A)

Before means for achieving an object of the present invention are described below, the coupling rates will be described which represent the characteristics of the variable directional couplers of constituent elements of the present invention.

In the specification, in order to represent the characteristics of the variable directional couplers, two coupling rates, i.e., the power coupling rate and the amplitude coupling rate are used whose definitions differ from each other. As described later, the amplitude coupling rate is mainly used.

These coupling rates can be defined on the basis of the paper by A. Yariv "Coupled-mode theory for guided-wave optics" IEEE J. Quantum Electron Vol. QE-9, No. 9, pp. 919–933, 1973.

As shown in formula 1 of formulas (6) on page 919 of this paper, a complex amplitude output of an output port 2a when light with a complex amplitude BO is incident into a variable directional coupler from an input port 1b is given by the following formulas (a):

$$A(z) = B_o \frac{2K_{ab}}{(4K^2 + \Delta^2)^{1/2}} e^{-i\Delta \frac{z}{2}} \sin[1/2(4K^2 + \Delta^2)^{1/2} z] \quad (a)$$

where z is the length of the variable directional coupler, $\Delta$ is the phase-mismatch constant of two optical waveguides forming the variable directional coupler and K ab is coupling coefficients, i.e., $K^2 = |K_{ab}|^2 = |K_{ba}|^2$.

In the present invention, since it is assumed that all the optical waveguides have the same cross-sectional area, there is no phase-mismatch constant, and therefore $\Delta=0$. Thus the coupling coefficients $K_{ab}$. When $K_{ab} = K_{ab} = -jk$ so as to satisfy the relationship of $K_{ab} = -K$ ba of the relationship of formula (4) in the above stated paper, the above formulas (a) are given as follows:

$$A(z) = -jB_{oe}^{-j\Delta z/2} \sin[Kz] \quad (b)$$

Formula (b) is obtained as the complex amplitude output when the two optical waveguides forming the variable directional coupler in formulas (a have the same cross-sectional structure.

In formula (b), one power coupling rate Pc is defined as $Pc = \sin^2[Kz]$ and the other amplitude coupling rate is defined as $Ac = \sin[Kz]$. In formula (b), z represents the length of the variable directional coupler. These coupling rates become zero when $z=0$, which means that since a variable directional coupler with the length $z=0$ has no coupling, both the power coupling rate and the amplitude coupling rate are zero. When $Kz=\pi/2$, the power coupling rate $Pc=1$ and the amplitude coupling rate $Ac=1$, which means 100% coupling.

The amplitude coupling rate Ac can be changed to both positive and negative with the length z of the variable directional coupler. On the other hand, since being the square of the sine function, the power coupling rate Pc is always positive. For instance, when $Kz>\pi$, the power coupling rate Pc is positive but the amplitude coupling rate Ac is negative. Here, the negative value of the amplitude coupling rate Ac means that the phase of the outputted complex amplitude A(z) is shifted by $\pi$. Since the negative state of the coupling rate is expressed correctly, the amplitude coupling rate is used as the coupling rate for explaining the characteristics of the variable directional coupler in the present invention.

<Measure for attaining the object 1>

The object 1 is the most fundamental object of the present invention, and the circuit structure required by the object 1 also constitutes the basis for the present invention. The circuit structure comprises asymmetric Mach-Zehnder interferometers 14-1 to 14-N arranged sideways at the N stages shown by the portion surrounded by a one-dot chain line in FIG. 3. The asymmetric Mach-Zehnder interferometers 14-1 to 14-N comprise two types of optical waveguides, 1-1 through 1-N and 2-1 through 2-N, with different optical path lengths, and beside them, variable directional couplers 3-1 through 3-(N+1) with positive and negative amplitude coupling rates provided that only the asymmetric Mach-Zehnder interferometer 14-1 at the stage 1 has the variable directional couplers 3-1 and 3-2 on both sides of the optical waveguides 1-1 and 2-1 with different optical path lengths. The fact that the Mach-Zehnder interferometer is asymmetric means that the optical path lengths of the two waveguides constituting the interferometer are different from each other. On the two lines of optical waveguides 1-1 to 1-N and 2-1 to 2-N of the asymmetric Mach-Zehnder interferometers 14-1 to 14-N are disposed phase controllers 4-1 to 4-N capable of varying phases. According to the present invention, the circuit structure of the optical signal processor is claimed in claim 1, while the circuit structure of the variable directional couplers is claimed in claim 2. In the instant structure, moreover, the coupling rates of the N+1 variable directional couplers with positive and negative amplitude coupling rates, and the amounts of phase shift of the N phase controllers are required to take circuit parameters which are defined by the recurrence formula indicated in claim 3.

<Measure for attaining the object 2>

In addition to the object 1, the object 2 is the most fundamental object of the present invention, and the circuit structure required by the object 2 also constitutes the basis for the present invention. The invention provides the following two kinds of circuit structures as means for achieving the object 2. The circuit structures are practically the same as the basic circuit structure of FIG. 3. The difference is that directional couplers having almost constant coupling rates with respect to wavelengths and having positive and negative amplitude coupling rates are used in place of the variable directional couplers with positive and negative amplitude coupling rates. claim 6 claims the structure of an optical signal processor in which fixed directional couplers with almost constant coupling rates with respect to wavelengths are used, while claim 7 claims the structure of an optical signal processor in which variable directional couplers with almost constant coupling rates with respect to wavelengths are used. The structures of fixed directional couplers with almost constant coupling rates with respect to wavelengths are claimed in claims 8 and 9, while the structures of variable directional couplers with almost constant coupling rates with respect to wavelengths are claimed in claims 10, 11 and 12. In the instant structures, moreover, the coupling rates of the N+1 directional couplers with almost constant coupling rates with respect to wavelengths, and the amounts of phase shift of the N phase controllers are required to take circuit parameters which are defined by the recurrence formula indicated in claim 13.

<Measure for attaining the object 3>

The present invention provides the following two kinds of circuit structures as means for achieving the object 3:

[Structure 1]

A structure where amplifying/attenuating devices 25 are disposed adjacent to phase controllers 4 on asymmetric Mach-Zehnder interferometers 14, in addition to the basic circuit structure stated in the object 1 or 2 (FIG. 16).

[Structure 2]

The basic circuit structure stated in the object 1 or 2 in which optical waveguides capable of amplification and attenuation, such as Er-doped silica-based waveguides, are used in place of the simple optical waveguides 1, 2.

In the Structure 2, all the optical waveguides are composed of optical waveguides capable of amplification and attenuation. In the Structure 1, some of the optical waveguides can be replaced by waveguides capable of amplification and attenuation as amplifying/attenuating devices. The amplifying/attenuating device referred to in the present invention means not only a single device which can carry out both amplification and attenuation, but also a collective device including individual amplifiers and attenuators and any combinations of them.

According to the present invention, the Structure 1 is claimed in claim 11, and the Structure 2 in claims 17, 18, 19. In the above structures, moreover, the coupling rates of the N+1 directional couplers with variable coupling rates, the amounts of phase shift of the N phase controllers, the values of amplification and attenuation of the amplifying/attenuating device, or the values of amplification and attenuation of the optical waveguides capable of amplification and attenuation are required to take circuit parameters which are defined by the recurrence formula indicated in claims 20 to 25.

<Measure for attaining the object 4>

To attain the object 4, there is adopted a structure comprising, in addition to the circuit structure for achieving the object 1 or 2, an operation part 16 for controlling circuit parameters, and a power control part 15 for controlling variable directional couplers 3, phase controllers 4, and amplifying/attenuating devices 25, or waveguides 27, 28 capable of amplification and attenuation (FIG. 24). The operation part 16 is required to possess database for the recurrence formula for calculation, or the results of calculation, of circuit parameters described in claims 3, 13, or 20–25 intended for controlling the coupling rates of the variable directional couplers, the amounts of phase shift of the phase controllers, the values of amplification and attenuation of the amplifying/attenuating devices, or the amplification or attenuation rate of the waveguides capable of amplification and attenuation. In the present invention, this circuit structure is claimed in claims 26, 27 and 28.

<Measure for attaining the object 5>

To attain the object 5, there is adopted a structure comprising, in addition to the circuit structure for achieving the object 4, a single or a plurality of optical extraction part(s) 19 for extracting part of optical signal, detectors 20 for detecting respective optical signals extracted from the optical extraction parts and converting them into electric signals, and a feedback electric wiring 21 extending from the detectors to the operation part for performing feedback control based on the electric signals detected by the detectors (FIG. 25). The optical extraction part may be disposed in various ways, for example, in at least one of the output ports as claimed in claims 32, 33, 34, or on at least one of the two optical waveguides constituting the asymmetric Mach-Zehnder interferometers 14 as claimed in claims 35, 36, 37. Furthermore, the operation part 16 is required to possess database for the recurrence formula for calculation, or the results of calculation, of circuit parameters for calculating, based on the feedback control data, the coupling rates of the variable directional couplers, the amounts of phase shift of the phase controllers, the values of amplification and attenuation of the amplifying/attenuating device, or the amplification or attenuation rate of the waveguides 27, 28 capable of amplification and attenuation. In the present invention, this structure is claimed in claims 29 to 37. The way of feedback control is claimed in claims 38, 39, 40.

Feedback control can also be carried out by feeding reference light separable from optical signal from a reference light source 22, and then detecting reference light (FIG. 33). In the present invention, this structure is claimed in claims 41, 42, 43. The methods of feedback control are claimed in claims 44, 45, 46.

The optical signal processor of the present invention has attained some or all of the aforementioned five objects by combining the circuit structures, methods of controlling, designing, and producing them that have been described. The designing techniques are claimed in claims 47 to 50. The producing methods are claimed in claims 51 to 57.

To achieve the five objects, the present invention has taken up those circuit structures, controlling methods, designing methods, and producing methods. Actions related to each of them will be mentioned below for the different objects.

<Actions concerned with the object 1>

The optical signal processor of claim 1 has the circuit structure mentioned already <Measure for attaining the object 1>, and basically comprises a two-input two-output circuit. Accordingly, the number of the output ports is always 2, irrespective of the number of stages of the asymmetric Mach-Zehnder interferometers. Thus, the wasteful release of optical signals can be prevented, and filtering with a maximum transmittance of 100% becomes possible.

Moreover, the use of the variable directional couplers 3-1 to 3-(N+1) and the phase controllers 4-1 to 4-2N enables the production of an optical signal processor capable of achieving arbitrary transmission characteristics from a single circuit.

In addition, the values of circuit parameters that are given by the recurrence formula described in claim 3 provide the coupling rates of variable directional couplers and the amounts of phase shift of phase controllers for achieving arbitrary filter characteristics. In this respect as well, an optical signal processor having arbitrary transmission characteristics is feasible.

<Actions concerned with the object 2>

Normally, a directional coupler changes in coupling rate with respect to wavelength, and thus the use of an ordinary directional coupler poses difficulty in achieving an optical signal processor having arbitrary filter characteristics. The optical signal processor of claim 6 or 7 has the aforementioned circuit structure <Measure for attaining the object 2>, which is basically the same as the structure of claim 1. However, directional couplers having virtually constant coupling rates with respect to wavelength are used, thus making it possible to actualize an optical signal processor having arbitrary filter characteristics with a maximum transmittance of 100% throughout the wavelength region.

In addition, the values of circuit parameters that are given by the recurrence formula described in claim 13 provide the coupling rates of variable directional couplers and the amounts of phase shift of phase controllers for achieving arbitrary desired filter characteristics. In this respect as well, an optical signal processor having arbitrary transmission characteristics is feasible.

<Actions concerned with the object 3>

The optical signal processors of claims 14 to 19 have the circuit structures mentioned already <Measure for attaining the object 3>.

The aforementioned [Structure 1] is a structure comprising an amplifying/attenuating device added to the structure of claim 1, 6 or 7. Thus, the amplifying/attenuating device is used only for the adjustment of maximum transmittance. Specifically, the desired filter characteristics with a transmittance of 100% are achieved by the basic structure of claim 1, 6 or 7, and then the optical transmittance of all characteristics is adjusted by using the additionally disposed amplifying/attenuating device. In this case, arbitrary maximum transmittance can be obtained by disposing amplifying/attenuating devices having the same values of amplification/attenuation on both of the two optical waveguides of the asymmetric Mach-Zehnder interferometers. The amplifying/attenuating device(s) may be installed either in any one of the asymmetric Mach-Zehnder interferometers or in the plural asymmetric Mach-Zehnder interferometers. The advantage of installing the amplifying/attenuating devices in the asymmetric Mach-Zehnder interferometers is that large values of amplification and attenuation are obtained as a whole, although the values of amplification and attenuation of individual amplifying/attenuating devices are small.

The aforementioned [Structure 2] is the structure of claim 1, 6 or 7 in which optical waveguides capable of amplification and attenuation are used in place of ordinary optical waveguides. The optical waveguides capable of amplification and attenuation are free to perform amplification and attenuation by varying the optical intensity of a pumping light source. Hence, the entire filter characteristics can achieve arbitrary maximum transmittance within the range of the amplification/attenuation rates of the waveguides.

In addition, the values of circuit parameters that are given by the recurrence formula described in claims 20 to 25 provide the coupling rates of variable directional couplers, the amounts of phase shift of phase controllers, and the values of amplification and attenuation of amplifying/attenuating devices or optical waveguides capable of amplification/attenuation, for the purpose of achieving desired filter characteristics involving arbitrary maximum transmittance. In this respect as well, an optical signal processor having desired filter characteristics including arbitrary maximum transmittance is feasible.

<Actions concerned with the object 4>

The optical signal processors of claims 26, 27, 28 have the circuit structures mentioned already <Measure for attaining the object 4>. This structure comprises, in addition to the structure of claim 1, 6 or 7, an operation part for controlling circuit parameters, and a power control part for controlling variable directional couplers, phase controllers, amplifying/attenuating devices, or optical waveguides capable of amplification and attenuation. The operation part possesses database for the recurrence formula for calculation, or the results of calculation, of circuit parameters described in claims 3, 13, and 21–25 intended for controlling the coupling rates of the variable directional couplers, the amounts of phase shift of the phase controllers, the values of amplification and attenuation of the amplifying/attenuating device, or the amplification and attenuation rates of the waveguides capable of amplification and attenuation. Hence, the circuit parameters are so programmable that they can be freely designed to meet the desired characteristics. For example, a circuit with filter characteristics varying in a time series manner is easy to construct.

<Actions concerned with the object 5 >

The optical signal processors of claims 29 to 37 have the circuit structures mentioned already <Measure for attaining the object 5>.

This structure comprises, in addition to the structure of claims 26 to 28, an optical extraction part for extracting part of optical signal, a detector for detecting respective optical signals extracted from the optical extraction part and converting them into electric signals, a feedback electric wiring extending from the detector to the operation part for performing feedback control based on the electric signals detected by the detector, an operation part for controlling circuit parameters, and a power control part for controlling variable directional couplers, phase controllers, and amplifying/attenuating devices, or optical waveguides capable of amplification and attenuation. Because of the presence of this feedback path, the optical signal processor is capable of feedback control. The operation part possesses database for the recurrence formula for calculation, or the results of calculation, of circuit parameters described in claims 3, 13, and 21–25 intended for calculating the coupling rates of the variable directional couplers, the amounts of phase shift of the phase controllers, the values of amplification and attenuation of the amplifying/attenuating devices, or the amplification and attenuation rates of the waveguides capable of amplification and attenuation, on the basis of the feedback control data. Since the instant structure is thus capable of feedback control, the filter characteristics of the circuit can be varied and adapted in response to constantly changing situations. claims 38 to 40 recite concrete procedures for performing feedback control.

The optical signal processor using a reference light source that is stated in claims 41 to 43 carries out feedback control by injecting reference light and detecting it. Thus, even in the absence of optical signal, feedback control can be performed, and a stable feedback control is practicable. The procedures for this control are stated in claims 44 to 46.

The above and other objects, effects, features and advantages of the present invention will become more apparent from the following description of embodiments thereof taken in conjunction with the accompanying drawings.

BRIEF DESCRIPTION OF THE DRAWINGS

FIG. 38A is an explanatory view of Step 1 of the method of producing an optical signal processor described in Embodiment 10 of the present invention;

FIG. 38B is an explanatory view of Step 2 of the method of producing an optical signal processor described in Embodiment 10 of the present invention;

FIG. 38C is an explanatory view of Step 3 of the method of producing an optical signal processor described in Embodiment 10 of the present invention;

FIG. 38D is an explanatory view of Step 4 of the method of producing an optical signal processor described in Embodiment 10 of the present invention;

FIG. 39E is an explanatory view of Step 5 of the method of producing an optical signal processor described in Embodiment 11 of the present invention;

FIG. 39F is an explanatory view of Step 6 of the method of producing an optical signal processor. described in Embodiment 11 of the present invention;

FIG. 39G is an explanatory view of Step 7 of the method of producing an optical signal processor described in Embodiment 11 of the present invention;

FIG. 39H is an explanatory view of Step 8 of the method of producing an optical signal processor described in Embodiment 11 of the present invention; and FIG. 39I is an explanatory view of Step 9 of the method of producing an optical signal processor described in Embodiment 11 of the present invention.

DETAILED DESCRIPTION OF PREFERRED EMBODIMENTS

<Embodiment 1>

This embodiment is a concrete revelation of an optical signal processor as claimed in claim 1, in order to attain the object 1.

Figure 1:
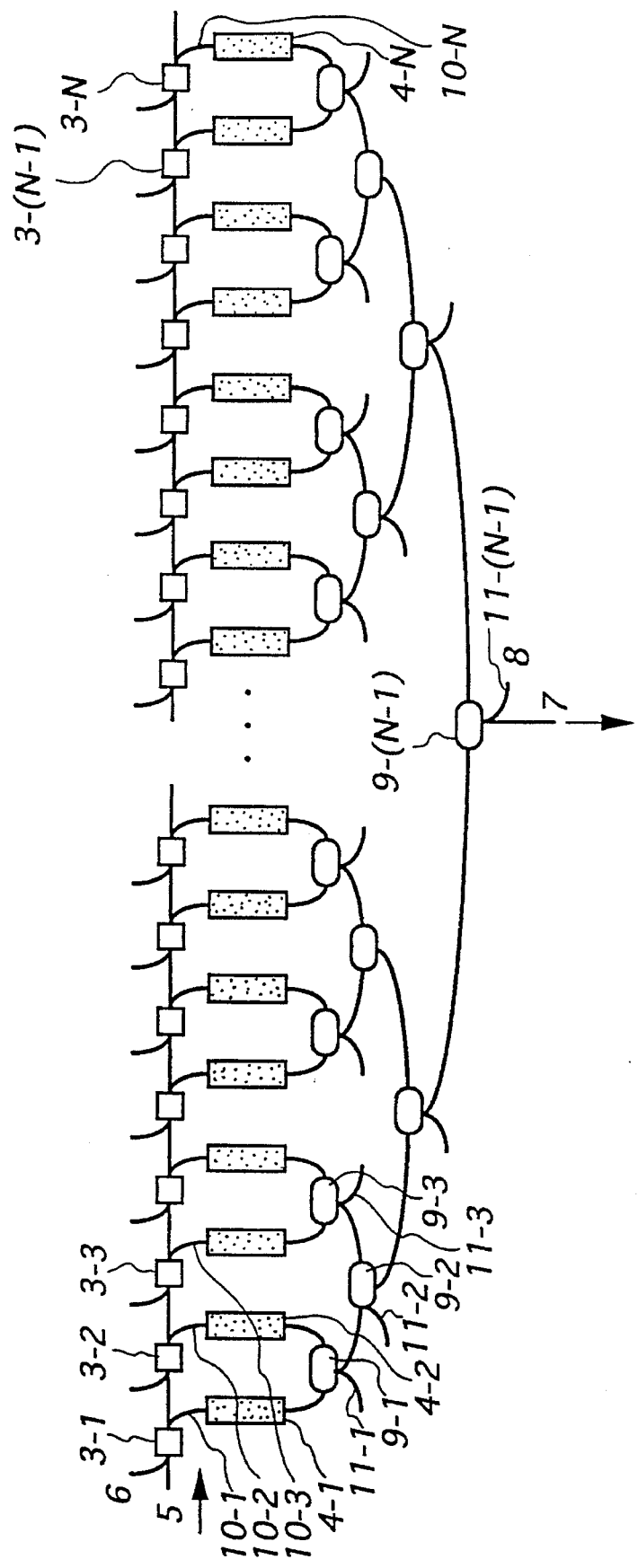
FIG. 1 is a circuit structure diagram showing a conventional transversal type optical signal processor.
Figure 2:
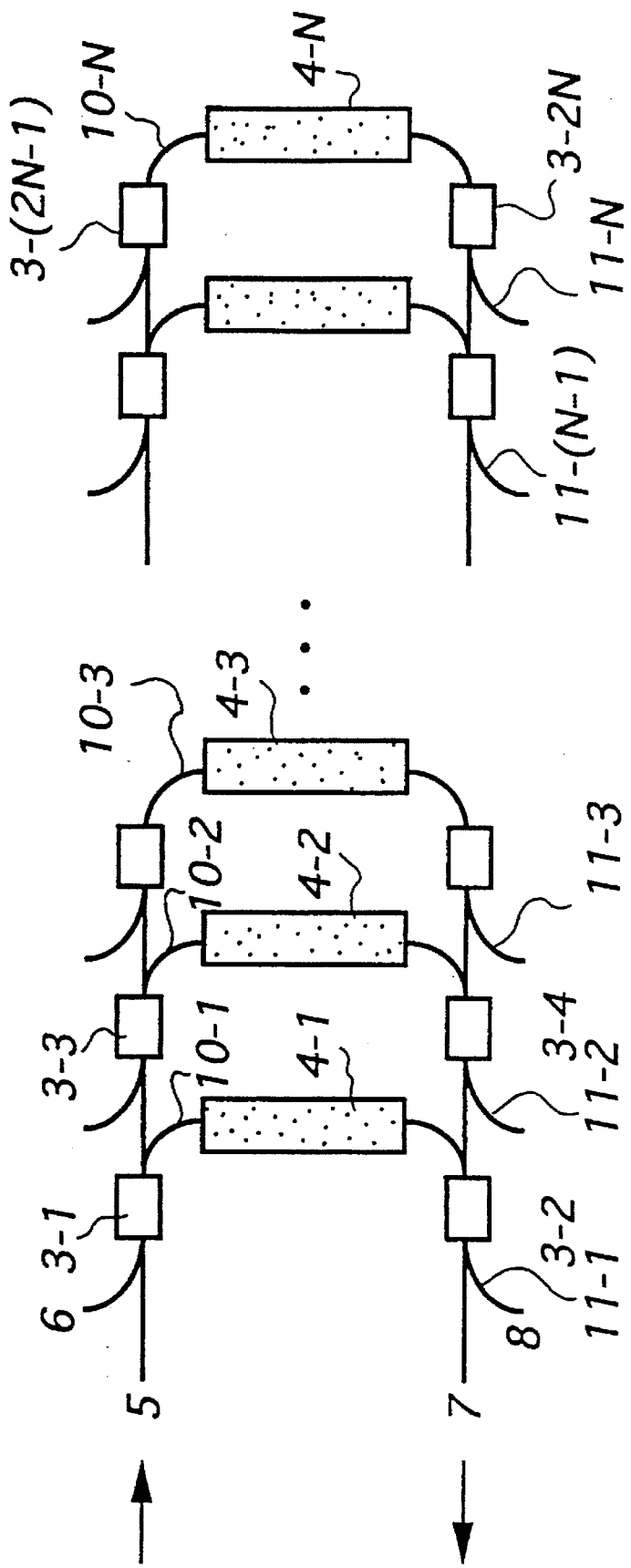
FIG. 2 is a circuit structure diagram showing another conventional transversal type optical signal processor.
Figure 3:
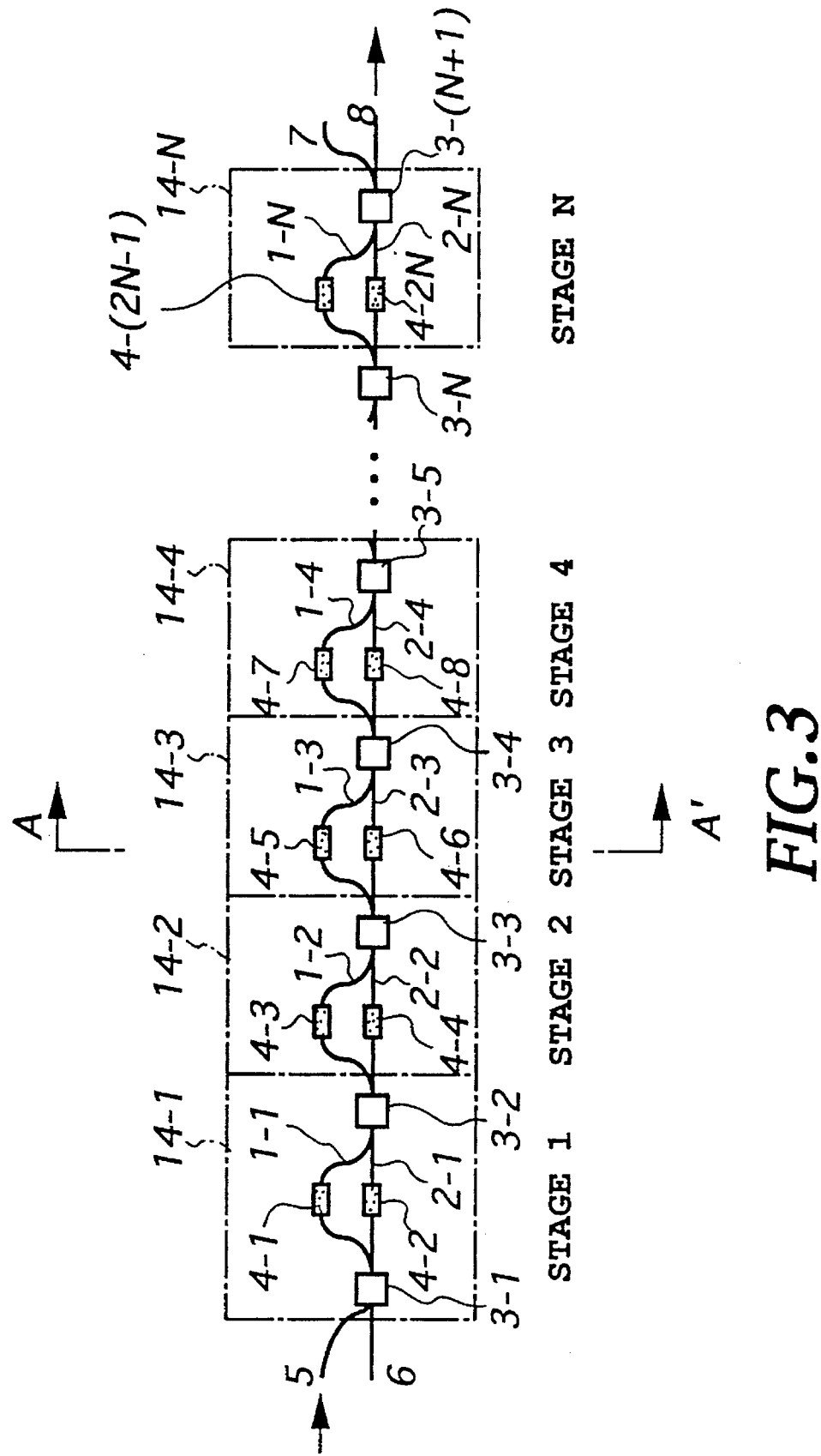
FIG. 3 is a circuit structure diagram showing a first embodiment of an optical signal processor relevant to the present invention.

The circuit structure of Embodiment 1 is shown in FIG. 3. As recited in claim 1, the circuit indicated comprises two optical waveguides 1, 2, and N+1 directional couplers 3 with variable coupling rates which couple together the two optical waveguides 1, 2 at N+1 different sites. This circuit structure as a whole has asymmetric Mach-Zehnder interferometers arranged serially at many stages. The two optical waveguides making up the respective asymmetric Mach-Zehnder interferometers 14 have their own constant optical path differences, and have on at least one thereof phase controllers 4 which provide a desired phase shift. In the drawing, the reference numerals 5, 6 are input ports, and the numerals 7, 8 output ports.

In this embodiment, an optical signal processor was constructed from a planar circuit with high mass production capacity. The optical path difference between the two optical waveguides 1 and 2 was set at 2.074 mm corresponding to a frequency interval of 100 GHz at a wavelength of 1.55 μm.

Figure 4:
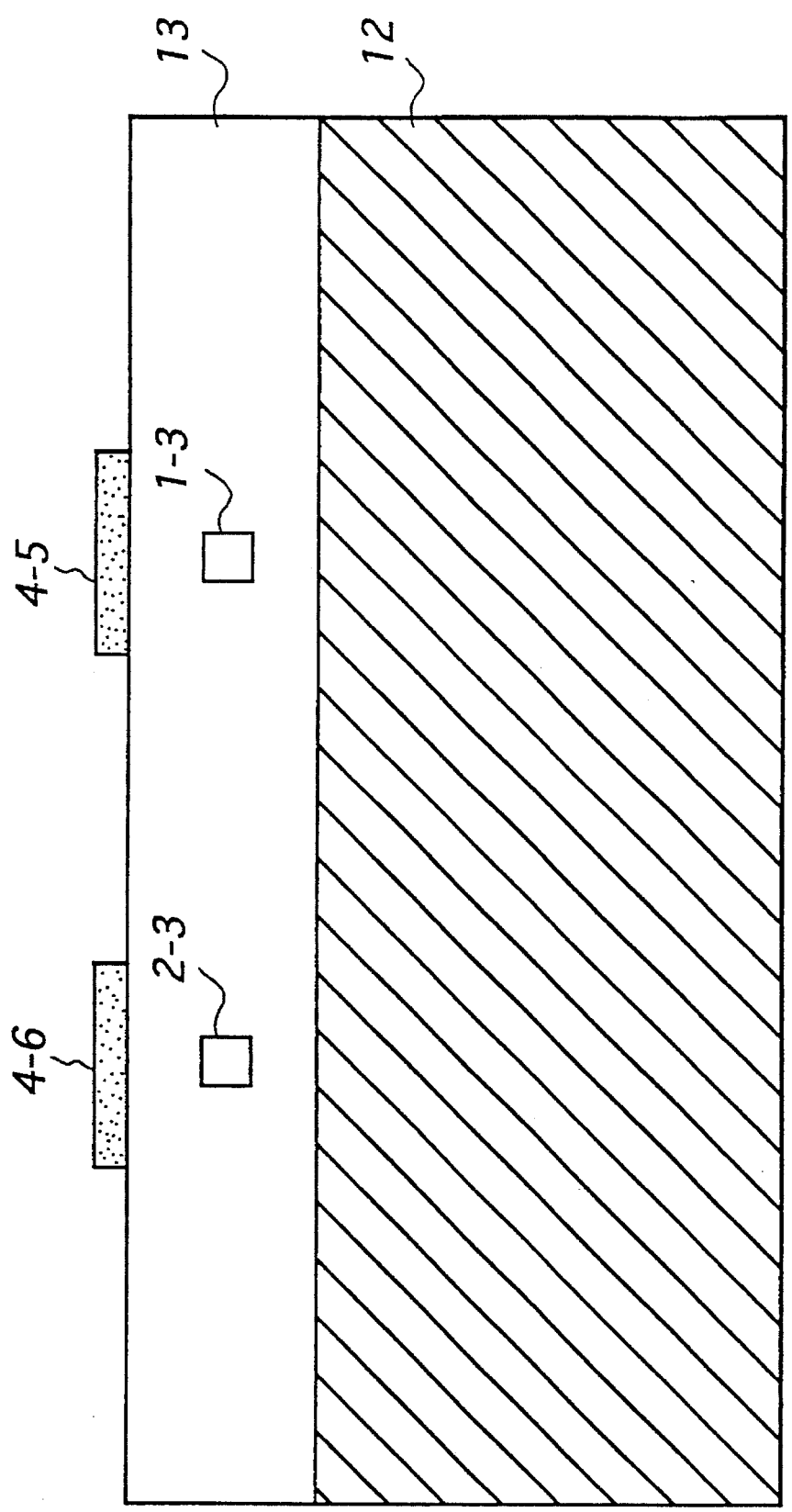
FIG. 4 is a sectional view taken on line A–A' of FIG. 3.

FIG. 4 represents a section taken on line A–A' of the optical signal processor illustrated in FIG. 3. In this embodiment, a silicon substrate was used as a substrate 12. A silica thin film 13 was formed on the substrate 12 by flame deposition, and the waveguide structures indicated at 1 and 2 were prepared by photolithography. The core sizes of the waveguides 1, 2 were determined so as to give a single mode. The optical signal processor of the present invention (optical filter) attains its filter characteristics by utilizing the interference, branching and coupling of light, and the presence of a higher mode within the waveguide causes the deterioration of performance. Thus, the embodiments of the present invention all employ single-mode waveguides. The phase controller 4 was prepared by forming a chromium heater on the silica thin film. Upon heating of the heater, the silica thin film forming the waveguides changes in refractive index, thus making it possible to control the optical path lengths of the waveguides 1, 2. In the instant embodiment, the phase controllers 4 are constructed on both of the two waveguides 1 and 2, but control is possible with only one of them. The advantage of forming them on both waveguides lies in the fact that if only one of them is present, a phase change of 0 to 2 $\pi$ is required of the phase controller 4 for the purpose of phase control, whereas if both of them are present, the phase change required of the respective phase controllers 4, 4 can be halved to 0 to $\pi$.

Figure 5:
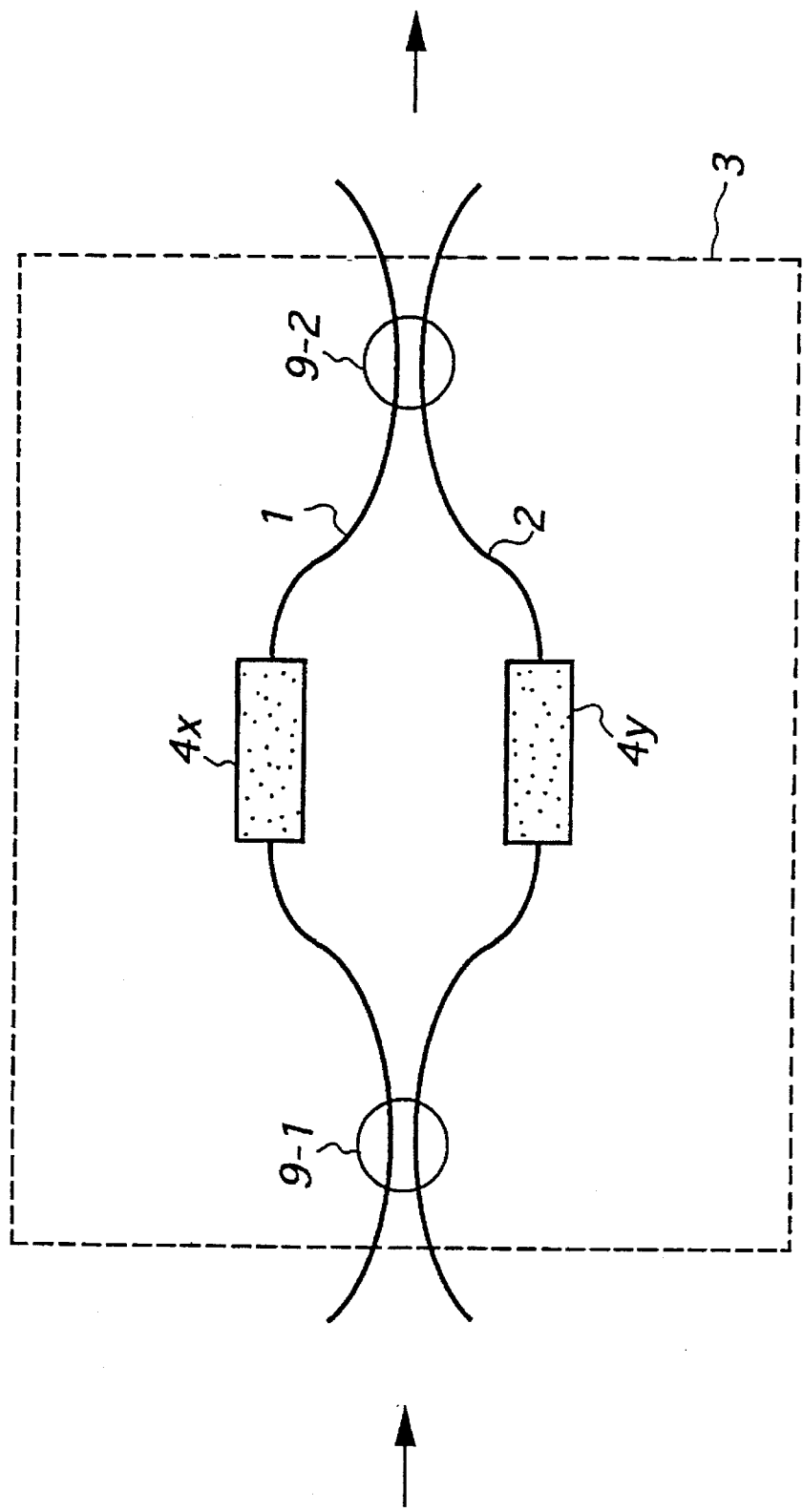
FIG. 5 is a circuit structure diagram showing a variable directional coupler constituting the optical signal processor as the first embodiment of the present invention.

FIG. 5 shows a variable directional coupler 3 used in the instant embodiment. This instrument makes up a symmetric Mach-Zehnder interferometer composed of two optical waveguides 1 and 2 with equal optical path lengths, and 3 dB directional couplers 9-1 and 9-2 disposed on both ends of the waveguides. On the optical waveguides 1 and 2 are located, respectively, phase controllers 4$x$, 4$y$ prepared from chromium heaters. In relation to the phase controllers 4$x$, 4$y$, too, even if the heater is mounted on only one of the waveguides as stated earlier, a variable directional coupler can be constructed. By changing the phase difference between the two optical waveguides by 0 to $\pi$ with the use of the phase controller, the ampitude coupling rate can be changed from −1 to 1. With the variable directional coupler 3 of a symmetric Mach-Zehnder configuration with equal optical path lengths, when the amount of the phase shift of the phase controller 4 provided therein is 0, it becomes a directional coupler with a amplitude coupling rate of 1. When the amount of the phase shift is $\pi$, it becomes a directional coupler with a amplitude coupling rate of 0. When the amount of the phase shift is −$\pi$, it becomes a directional coupler with an amplitude coupling rate of −1.

It is also possible to make a difference of a half wavelength between the two waveguides 1 and 2 so that a directional coupler with a amplitude coupling rate of 0% emerges when the amount of phase shift of the phase controller 4 is 0. The 3 dB directional couplers 9-1 and 9-2 constituting the variable directional coupler 3 may further be replaced by the same coupler as the variable directional coupler constituting the symmetric Mach-Zehnder interferometer shown in FIG. 5. In order for the variable directional coupler to be completely variable until a amplitude coupling rate of −1 to 1 as designed, it is necessary that the power coupling rates of the 3 dB couplers making up this coupler be 3 dB at a considerable accuracy. To make the power coupling rate of the 3 dB coupler exactly 3 dB, the 3 dB coupler is replaced by a variable directional coupler. This makes use of the feature that in the variable directional coupler constituting the symmetric Mach-Zehnder interferometer shown in FIG. 5, the power coupling rate of 3 dB can be realized, even if the power coupling rate of the 3 dB coupler is slightly different from 3 dB.

In the instant embodiment, moreover, the entire optical circuit was placed on a Peltier element, and the temperature of the optical circuit was controlled at an accuracy of about 0.1 degree, in order to eliminate the influence of changes in ambient temperature.

Since the optical signal processor of the present invention utilizes the coherent interference of light, optical signal must be coherent light.

In FIG. 3, optical signal injected from the input port 5 passes each asymmetric Mach-Zehnder interferometer 14, and goes out of output ports 7 and 8. During this period, optical signal is branched by each variable directional coupler. For example, optical signal traveling on the shortest optical path passes the waveguide 2-1, 2-2, ..., 2-N. Optical signal traveling on the longest optical path passes the waveguide 1-1, 1-2, ..., 1-N. In this way, output light from the ports 7 and 8 is expressed as the sum of various types of optical signal passing through the different optical paths. The physical optical paths through which optical signals pass are present in the number $2^N$, but those having the same optical path length are counted as a single optical path. If the optical path difference between the two optical waveguides making up each asymmetric Mach-Zehnder interferometer 14 is expressed as $\Delta L$, optical signal passes through any one of the N+1 optical paths having the optical path lengths 0, $\Delta L$, $2\Delta L$, ..., $N\Delta L$. Therefore, the complex amplitude of output light from the port 7 is expressed by Equation (1-1).

$$h(z) = \left( \sum_{k=0}^{N} a_k e^{-jk\beta\Delta L} \right) e^{j\frac{N\beta\Delta L}{2}} \qquad (1\text{-}1)$$

$$= \left( \sum_{k=0}^{N} a_k e^{-2\pi jk\frac{\omega}{\omega_0}} \right) e^{j\pi N\frac{\omega}{\omega_0}}$$

$$= \left( \sum_{k=0}^{N} a_k z^{-k} \right) z^{\frac{N}{2}}$$

where $a_k$ represents the complex amplitude of optical signal that has passed the N+1 optical paths, $\beta$ represents the propagation constant of the optical waveguides 1 and 2, and $\omega_o$ denotes the period of the frequency characteristics. According to this equation, as is often the case with the digital filter theory in the field of electricity, $$e^{2\pi j \frac{\omega}{\omega_0}}$$

is assumed to be the complex number z, and $$h(e^{2\pi j \frac{\omega}{\omega_0}})$$

is extended to the function h(z) on a complex number plane. On this z complex number plane, the frequency function h(($\omega$)) is deemed to be a function on a circumference with a radius of 1 for |z|=1.

In Equation (1-1), the through characteristic h (z) is expressed by the polynominal for $z^{-1}$. This equation means that the characteristic in question is equivalent to the transmission characteristic of a non-feedback type digital filter called the FIR (Finite Impulse Response) type. This fact plays an important role in the synthesis of an optical filter as mentioned below. Similarly, the output light f(z) injected from the port 5 and ejected from the port 8 is expressed by Equation (1-2).

$$f(z) = \left( \sum_{k=0}^{N} b_k z^{-k} \right) z^{\frac{N}{2}} \quad (1-2)$$

The definition of f(z) in claim 3 involves the complex number j, but there is no complex number j in Equation (1-2). This is because if the instant embodiment takes up a variable directional coupler of a symmetric Mach-Zehnder configuration as recited in claim 2, the notation of Equation (1-2) is simpler in expression, and there are no basic differences between the expression of the instant embodiment and the expression of claim 3.

The instant signal processor is of a two-input two-output type, and so the transmission matrix S of the entire signal processor is expressed as a 2×2 matrix of the following Equation (2).

$$S = \begin{pmatrix} h(z) & -f_*(z) \\ f(z) & h_*(z) \end{pmatrix} \quad (2)$$

where the suffix, represents a paraconjugate $$\left( h_*(z) = h^* \left( \frac{1}{z^*} \right) \right).$$

Assuming that the circuit has no loss, there holds between h(z) and f(z) a unimodular unitary relationship of Equation (3) meaning that the determinant of the matrix of Equation (2) is 1.

$$h(z)h_*(z) + f(z)f_*(z) = 1 \quad (3)$$

In the instant embodiment, filter design was made such that the cross characteristic f(z) would have desired properties. The degree of freedom for Equation (1-2) expressing the cross characteristic is 2N+2, since the number of the complex expansion coefficients is N+1. In view of the restraining conditions (to be described later) which keep maximum transmittance down to 100%, the degree of freedom is decreased by 1 to become 2N+1. The instant embodiment having the structure described in claim 1, on the other hand, comprises the N+1 variable directional couplers and the N phase controllers. Accordingly, the degree of freedom given to the circuit is 2N+1. This degree of freedom is consistent with the degree of freedom of Equation (1-2). Thus, all the circuit parameters are theoretically obtained by giving Equation (1-2).

Figure 6:
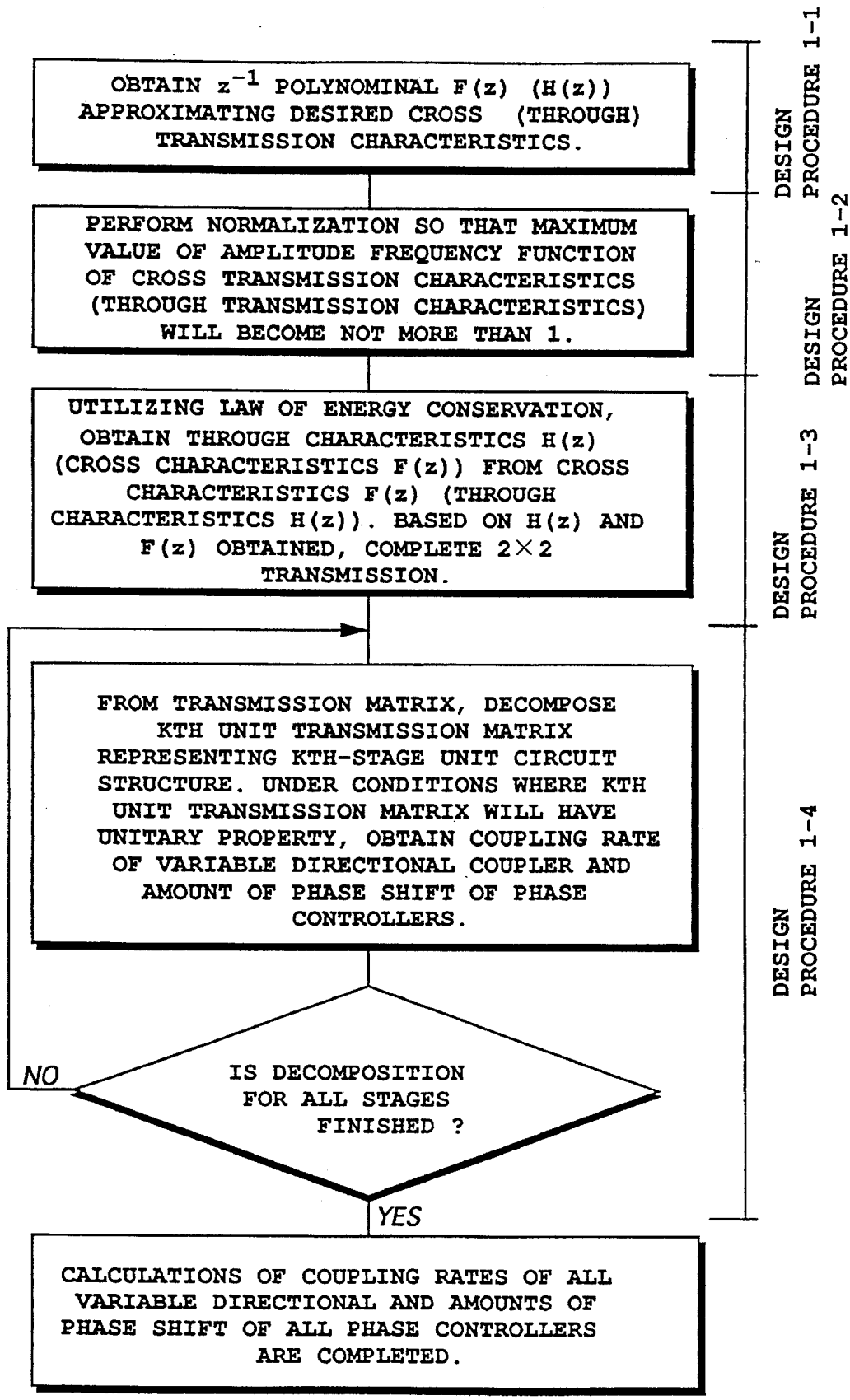
FIG. 6 is a flow chart showing the design procedure for the optical signal processor as the first embodiment of the present invention.

Specifically, the circuit parameters which enable the cross characteristics (transmission characteristics from the input port 5 to the output port 8) to fulfill the desired filter characteristics were obtained by the procedures shown below (FIG. 6).

[Design procedure 1-1]

In obtaining $b_k$ being the complex expansion coefficient of Equation (1-2) such that the desired filter characteristics are fulfilled, use is made of the fact that the transmission characteristics of an optical filter written in Equation (1-2) are the same as those of a digital filter called the FIR type. Concretely, various approximate techniques developed in the digital filter field are used in obtaining the complex expansion coefficient $b_k$. For example, Fourier expansion, the window function method, frequency sampling, and the Remez Exchange method are well known (Oppenheim & Schafer, "Digital Signal Processing"). As a result of calculations by these methods, the minimum number of expansion terms necessary to fully satisfy the desired filter characteristics is determined based on the requirements for the desired filter characteristics. The minimum number of expansion terms corresponds to the number of stages, N, of the asymmetric Mach-Zehnder interferometers.

[Design procedure 1-2]

In the [Design procedure 1-1], the complex expansion coefficient of Equation (1) was obtained using the above optimal techniques for digital filters so as to achieve the desired filter characteristics. If an optical signal processor is achieved using the resulting complex expansion coefficient unchanged, the absolute value of amplitude characteristic may sometimes exceed 100%. With the instant signal processor which is an analog signal processor using optical wave, a physical quantity, however, the absolute value of the complex amplitude of Equation (1) essentially cannot exceed 100%, because of the law of energy conservation. Thus, the complex expansion coefficient $b_k$ obtained by the digital filter synthesis technique needs to be normalized using the following equation so that the absolute value of amplitude characteristic will not exceed 100%.

$$\max_{|z|=1} |f(z)| = \max_{\omega} |f(\omega)| \leq 1 \quad (4)$$

[Design procedure 1-3]

An S matrix representing the transmission characteristics of the instant optical signal processor is obtained such that the complex amplitude characteristic having the normalized complex expansion coefficient obtained in the <Design procedure 1-2> will be achieved in the cross output (output from the port 5 to 8) of this optical signal processor. Specifically, the remaining unknown transmission function h (z) of the S matrix is obtained from the unimodular unitary relationship of Equation (3). $h(z)h_*(z)$ is expressed by Equation (5) based on the unimodular unitary relationship by using f(z) normalized in the [Design procedure 1-2], and expanding this relationship into the product of linear equations on z.

$$\begin{aligned} h(z)h_*(z) &= 1 - f(z)f_*(z) \quad (5) \\ &= (-1)^N a_0 \alpha_0^* \alpha_1^* \alpha_2^* \alpha_3^* \ldots \\ &\quad \alpha_N^*(z - \alpha_1)\left(z - \frac{1}{\alpha_N^*}\right)(z - \\ &\quad \alpha_2)\left(z - \frac{1}{\alpha_2^*}\right) \ldots \\ &\quad (z - \alpha_N)\left(z - \frac{1}{\alpha_N^*}\right) \end{aligned}$$

In Equation (5), $a_0$ is determined from Equation (6), if it is taken to be provided with the same phase as that of the complex expansion coefficient $b_0$ of f(z) which has been known.

$$|\alpha_0| = \sqrt{\frac{1 - f(1)f_*(1)}{(1-\alpha_1)(1-\alpha_1^*)(1-\alpha_2)(1-\alpha_2^*)\ldots(1-\alpha_N)(1-\alpha_N^*)}} \quad (6)$$

$\arg(a_0) = \arg(b_0)$

Since the result of Equation (5) must be expressed as the product of h(z) and $h_*(z)$, the zero point of the polynomial on the right-hand side is obtained as N pairs, $\{\alpha_k, 1/\alpha_k^*\}$. In obtaining h(z), the polynominal h(z) must have one of the pair of roots for $\{\alpha_k, 1/\alpha_k^*\}$ as its root. Depending on the way of choosing the root, therefore, h(z) has $2^N$ solutions. These $2^N$ solutions for h(z) have equal amplitude characteristics and different phase characteristics. As a whole, there are $2^N$ S matrices common in f(z) and different in h(z). As a result, $2^N$ kinds of circuit parameters are determined. However, even when a circuit is prepared with any of these $2^N$ circuit parameters, cross characteristics become the same characteristics f(z). In the instant embodiment, since the f(z) characteristics which are cross characteristics are of interest, a suitable solution of the $2^N$ solutions for h(z) was selected. In selecting h(z), it goes without saying that appropriate selection criteria may be employed, such as low element sensitivity, suitable phase characteristics, and so on.

[Design procedure 1-4]

In obtaining circuit parameters, an S matrix representing the transmission characteristics of the optical signal processing circuit constituting the whole N-stage asymmetric Mach-Zehnder interferometer configuration is expanded to the form of the product of S matrices each representing the transmission characteristics of the unit configuration representing a one-stage asymmetric Mach-Zehnder interferometer. The S matrix $S_{tc}$ for the variable directional coupler shown in FIG. 5 which is composed of a symmetric Mach-Zehnder interferometer and phase controllers provided on the waveguides is obtained as follows:

$$S_{tc} = j \begin{pmatrix} \sin\frac{\eta_n}{2} & \cos\frac{\eta_n}{2} \\ \cos\frac{\eta_n}{2} & -\sin\frac{\eta_n}{2} \end{pmatrix}$$

where $\eta_n$ denotes the amount of phase shift of the phase controllers provided on the waveguides of the symmetric Mach-Zehnder interferometer, and n denotes the nth variable directional coupler.

Let the entire S matrix is decomposed as follows:

$$S = S_N S_{N-1} \ldots S_2 S_1 S_0 \quad (7)$$

where $S_n$ is assumed to be the nth-stage unit constituent circuit.

$$S_n = j \begin{pmatrix} \sin\frac{\eta_n}{2} e^{-j\frac{\phi_n}{2}} z^{-\frac{1}{2}} & \cos\frac{\eta_n}{2} e^{j\frac{\phi_n}{2}} z^{\frac{1}{2}} \\ \cos\frac{\eta_n}{2} e^{-j\frac{\phi_n}{2}} z^{-\frac{1}{2}} & -\sin\frac{\eta_n}{2} e^{j\frac{\phi_n}{2}} z^{\frac{1}{2}} \end{pmatrix}$$

$$S_0 = j \begin{pmatrix} \sin\frac{\eta_0}{2} & \cos\frac{\eta_0}{2} \\ \cos\frac{\eta_0}{2} & -\sin\frac{\eta_0}{2} \end{pmatrix}$$

The nth-stage unit constituent circuit is composed of (1-n)th and (2-n)th optical waveguides, (4-(2n-1))th and (4-2n)th phase controllers, and a (3-(n+1))th variable directional coupler, while a unit constituent circuit for n=0 is constructed of a single variable directional coupler, 3-1. The 3-(N+1) variable directional coupler is comprised of a symmetric Mach-Zehnder interferometer equipped with phase controllers shown in FIG. 5. In Equation (7), the amount of phase shift of the phase controllers on the symmetric Mach-Zehnder interferometer of the variable directional coupler of the nth-stage unit constituent circuit is expressed as $\eta_n$, and the amount of phase shift of the phase controllers on the asymmetric Mach-Zehnder interferometer constituting a delay line is expressed as $\phi_n$. The actual decomposition of the S matrix is performed by having the inverse matrix $S_n^{-1} = S_n^+$ for the unit constituent S matrix ($S_n^+$ is the transposed conjugate matrix for $S_n$) act from the left side of the S matrix in the sequence n=N, N–1, ..., 2, 1, 0.

$$S^{[n-1]} = S_n^+ S^{[n]} \quad (8)$$

where $S^{[n]} = S_n S_{n-1} \ldots S_2 S_1 S_0$. By this repetition, $S_n$ is obtained.

Concretely, if $S^{[n]}$ is known in Equation (8), the amount, $\eta_n$, of phase shift of the phase controllers on the symmetric Mach-Zehnder interferometer constituting the variable directional coupler is determined by the conditions under which the term $z^{(n+1)/2}$ or $z^{-(n+1)/2}$ becomes zero, and the amount, $\phi_n$, of phase shift of the phase controllers provided on the waveguides of the asymmetric Mach-Zehnder interferometer is determined by the conditions under which $$-\frac{b_0^{[n-1]}}{a_0^{[n-1]}}$$

becomes a real number.

$$\begin{cases} \eta_n = -2\tan^{-1}\left(\frac{b_0^{[n]}}{a_0^{[n]}}\right) \\ \phi_n = -\arg\left(\frac{a_1^{[n]}b_0^{[n]} - a_0^{[n]}b_1^{[n]}}{(a_0^{[n]})^2 + (b_0^{[n]})^2}\right) \end{cases} \quad (9\text{-}1)$$

where $a_0^{[n]}$, $a_1^{[n]}$, $b_0^{[n]}$, and $b_1^{[n]}$ are complex expansion coefficients in $S^{[n]}$. $a_k^{[n-1]}$ and $b_k^{[n-1]}$ that are necessary in the following step of the recurrence formula can be obtained by calculations for the above equation.

$$\begin{cases} a_k^{[n-1]} = -j\left(a_{k+1}^{[n]}\cos\frac{\eta_n}{2} - b_{k+1}^{[n]}\sin\frac{\eta_n}{2}\right)e^{j\frac{\phi_n}{2}} \\ b_k^{[n-1]} = -j\left(a_k^{[n]}\sin\frac{\eta_n}{2} + b_k^{[n]}\cos\frac{\eta_n}{2}\right)e^{-j\frac{\phi_n}{2}} \end{cases} \quad (9\text{-}2)$$

$(k = 0, 1, \ldots, n-1)$

By completing the decomposition procedure for the S matrix until the final stage, in other words, by solving the recurrence formula composed of Equations (9-1) and (9-2), all the circuit parameters are obtained. Equations (9-1) and (9-2) are different from the recurrence formula described in claim 3. This has occurred because the structure recited in claim 2 is taken up as the variable directional coupler in the present embodiment, and the circuit parameter $\eta_n$ does not represent the angular of the amplitude coupling rate $\theta_n$ of the variable directional coupler defined in claim 3, but it represents the amount of phase shift of the phase controllers provided on the symmetric Mach-Zehnder interferometer constituting the variable directional coupler. Equations (9-1) and (9-2)

can be transformed by a simple conversion into the recurrence formula described in claim 3.

As explained above, the present invention requires $2^N$ circuit parameters for the desired cross filter characteristics. The use of any of these circuit parameters gives the same cross filter characteristics. Based on this fact, the present invention asserts that no numerical restrictions are imposed on circuit parameters, and the range of the invention covers all the circuit parameters obtained in the above-described circuit synthesis techniques.

According to the instant embodiment, circuit parameters were calculated so that the desired filter characteristics come true based on the cross output, but it is also possible to calculate circuit parameters so that the desired filter characteristics are achieved by the through output (output from the port 5 to the port 7).

In the present embodiment, the number of stages of the asymmetric Mach-Zehnder interferometers was set at 23 (N=23), in view of the filter characteristics to be realized. Hereinbelow will be indicated the outcome that an optical signal processor having different characteristics was achieved with a single optical signal processor having a 23-stage asymmetric Mach-Zehnder interferometer configuration by varying the coupling rates of variable directional couplers and the amounts of phase shift of phase controllers.

a) Optical filter having linear phase Chebyshev transmission characteristic

This optical filter has phase characteristics with cross characteristics proportional to frequency. In terms of group delay characteristics, it has constant group delay characteristics, and achieves band-pass Chebyshev type transmission characteristics. The characteristic values required of this optical filter were set at a frequency interval of 100 GHz, a transmission range frequency of −12.4 GHz to 12.4 GHz, and an attenuation rate at the left and right ends of transmission range of 38.1 dB. The polynominal for z, i.e. f(z), which satisfies these requirements have already been obtained by the Remez Exchange method (J. H. McClellan, T. W. Parks, and L. R. Labiner: IEEE Trans. Audio & Electroacoust., AU-21, p506, 1975), and expressed by Equation (10).

$$f(z) = j \left( \sum_{k=0}^{23} b_k z^{-k} \right) z^{\frac{23}{2}} \qquad (10)$$

$$= j \{0.00337 + 0.01494 z^{-1} + 0.01057 z^{-2}$$

$$0.01494 z^{-22} + 0.00337 z^{-23}\} z^{\frac{23}{2}}$$

Table 1 reveals all the expansion coefficients.

TABLE 1

| Number of stages | Expansion coefficient for F(z) obtained by the Remez exchange method | Normalized expansion coefficient for F(z) $b_k$ | Expansion coefficient for H(z) obtained from normalized F(z) $a_k$ | Amount of phase shift of phase controller of variable directional coupler $\theta_k$ | Amount of phase shift of phase controller on asymmetric Mach-Zehnder interferometer $\phi_k$ |
|---|---|---|---|---|---|
| 0  | 0.00337  | 0.00332  | −0.00369 | 0.00295 × π |            |
| 1  | 0.01494  | 0.01468  | −0.02777 | 0.98507    | 0.000 × π  |
| 2  | 0.01057  | 0.01039  | −0.06446 | −0.87045   | 0.000      |
| 3  | 0.00254  | 0.00250  | −0.07708 | 0.98060    | 0.000      |
| 4  | −0.01598 | −0.01565 | −0.11144 | −0.99477   | 0.000      |
| 5  | −0.03409 | −0.03349 | −0.00643 | −0.97951   | 0.000      |
| 6  | −0.03811 | −0.03745 | −0.02560 | 0.95335    | 0.000      |
| 7  | −0.01463 | −0.01438 | 0.25958  | −0.94670   | 0.000      |
| 8  | 0.04009  | 0.03939  | 0.00000  | 0.98012    | 0.000      |
| 9  | 0.11541  | 0.11341  | 0.35648  | 0.93535    | 0.000      |
| 10 | 0.18851  | 0.18524  | −0.67658 | −0.81128   | 0.000      |
| 11 | 0.23355  | 0.22949  | −0.10130 | 0.70737    | 0.000      |
| 12 | 0.23355  | 0.22949  | 0.31968  | −0.70737   | 0.000      |
| 13 | 0.18851  | 0.18524  | 0.00574  | 0.81128    | 0.000      |
| 14 | 0.11541  | 0.11341  | 0.00425  | −0.93535   | 0.000      |
| 15 | 0.04009  | 0.03939  | 0.03567  | −0.98012   | 0.000      |
| 16 | −0.01463 | −0.01438 | 0.01571  | 0.94670    | 0.000      |
| 17 | −0.03811 | −0.03745 | 0.01284  | −0.95335   | 0.000      |
| 18 | −0.03409 | −0.03349 | −0.00428 | 0.97951    | 0.000      |
| 19 | −0.01593 | −0.01565 | −0.00647 | 0.99477    | 0.000      |
| 20 | 0.00254  | 0.00250  | −0.00813 | −0.98060   | 0.000      |
| 21 | 0.01057  | 0.01039  | −0.00482 | 0.98045    | 0.000      |
| 22 | 0.01494  | 0.01468  | 0.00397  | −0.98507   | 0.000      |
| 23 | 0.00337  | 0.00332  | 0.00298  | 0.99705    | 0.000      |

Figure 7:
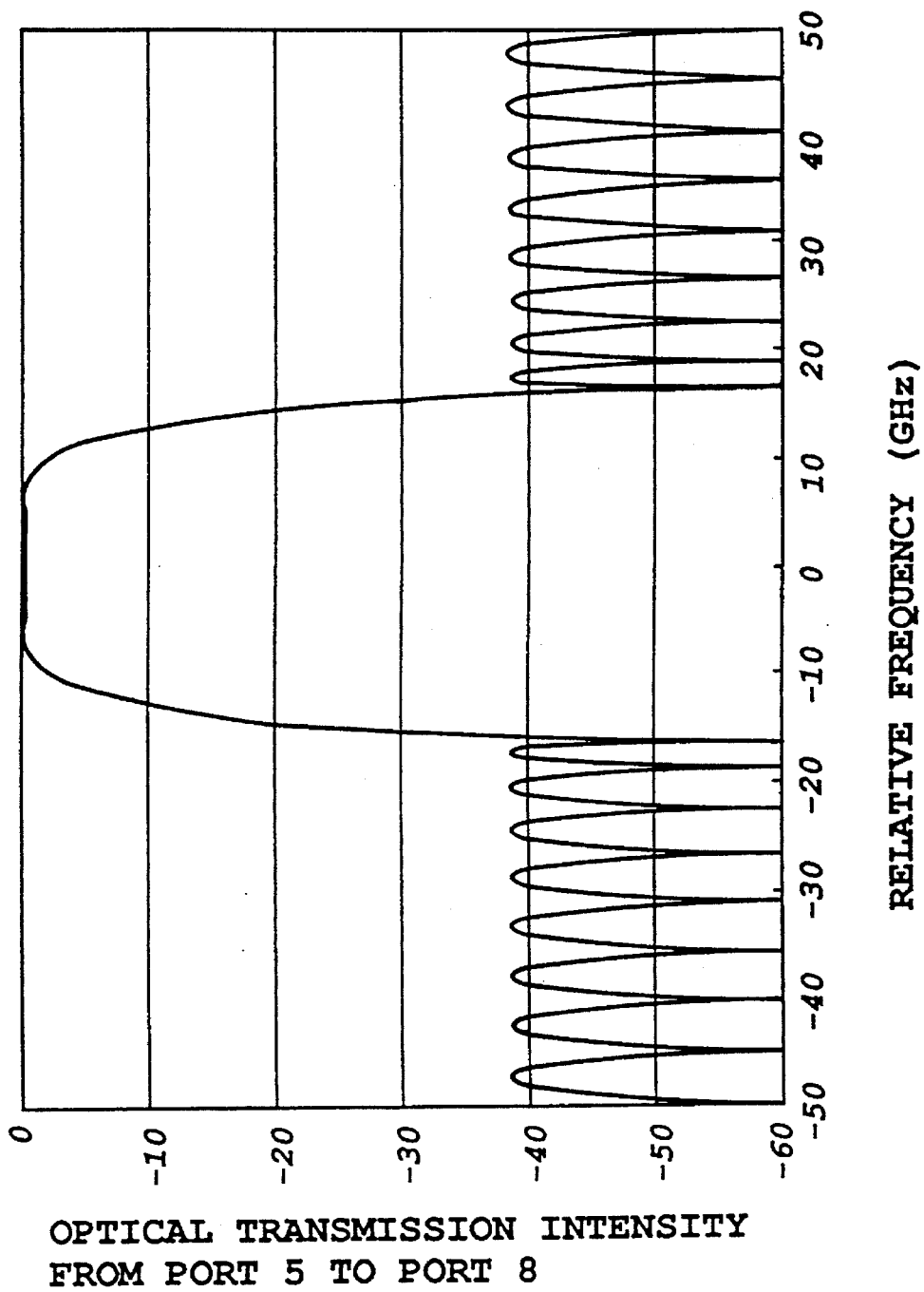
FIG. 7 is a graph showing the transmission characteristics of a Chebyshev type optical frequency filter achieved by the optical signal processor as the first embodiment of the present invention.

The minimum number of expansion terms that fulfills the above requirements was 23. In this example, the amplitude characteristics are symmetric with respect to the origin of the frequency, while the phase characteristics are asymmetric with respect to the origin of the frequency. Thus, the expansion coefficient for f(z) becomes a real number. Based on the expansion coefficients in the table, the amount $\theta_k$ of phase shift of phase controllers of variable directional coupler, and the amount $\phi_k$ of phase shift of phase controllers on the delay line were designed in accordance with the aforementioned design procedures. FIG. 7 shows the results of measurement of the power transmission intensity of the optical filter prepared. Chebyshev type transmission characteristics as designed were obtained in the vicinity of −10 GHz to 10 GHz.

b) Frequency selective filter

This example concerns a filter for extracting through the cross port only optical signal of the desired frequency from among eight frequency multiplex optical signals, $f_1$ to $f_8$, arranged at equal frequency intervals of 12.5 GHz. Here a frequency filter was prepared under the design conditions under which frequency optical signals, $f_1$, $f_3$ and $f_7$, are withdrawn from the cross port.

The z inverse number polynominal expansion f(z) of cross characteristics satisfying the above requirements was obtained by the discrete Fourier expansion as indicated in Equation (11).

$$f(z) = j\left(\sum_{k=0}^{15} b_k z^{-k}\right) z^{\frac{15}{2}} \quad (11)$$

$$= j\{(-0.05774 - 0.02392j) +$$
$$(0.04419 - 0.04419j) z^{-1} +$$
$$(-0.05774 + 0.02392j) z^{-2} +$$
$$(-0.05774 + 0.02392j) z^{-14} +$$
$$(0.01875 z^{15}\} z^{\frac{15}{2}}$$

Figure 8:
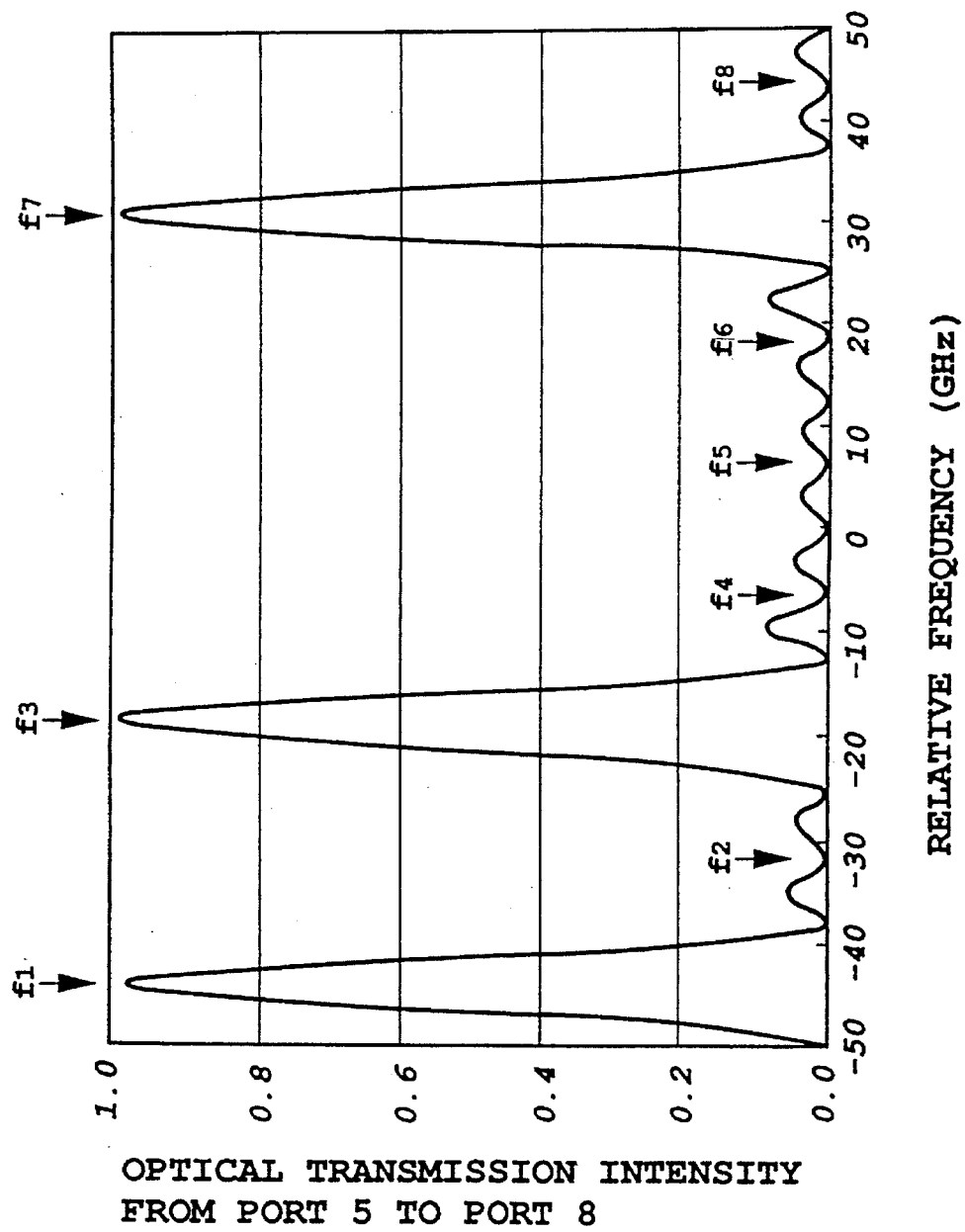
FIG. 8 is a graph showing the transmission characteristics, with $f_1$, $f_3$ and $f_7$ representing transmission, of a frequency selective filter achieved by the optical signal processor as the first embodiment of the present invention.

Table 2 reveals all the expansion coefficients.

shift of the phase controllers represents the amount of phase shift of the phase controllers on the longer optical waveguide 1 of the two optical waveguides constituting the asymmetric Mach-Zehnder interferometer. This value being negative means that positive phase shift of that value is given to the phase controller of the shorter waveguide side. FIG. 8 shows the transmission characteristics of a frequency selective filter prepared based on the designed values.

Figure 9:
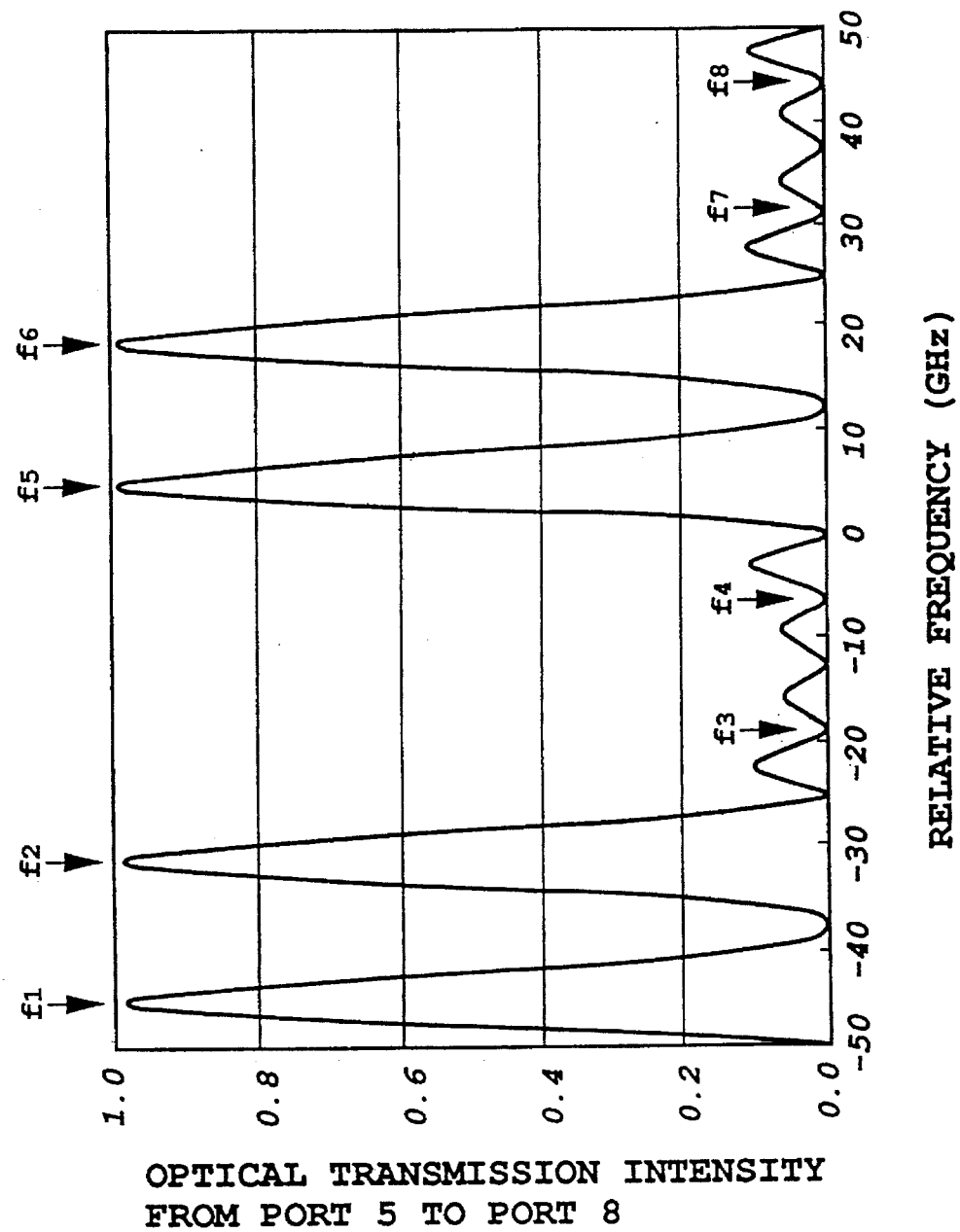
FIG. 9 is a graph showing the transmission characteristics, with $f_1$, $f_2$, $f_5$ and $f_6$ representing transmission, of a frequency selective filter achieved by the optical signal processor as the first embodiment of the present invention.

FIG. 9 shows the power transmission characteristics of a filter prepared by the same design technique to extract the frequencies of $f_1$, $f_2$, $f_5$, and $f_6$ from among eight optical signals.

In this example, two kinds of frequency selective filters as shown in FIGS. 8 and 9 were realized. The frequencies to be selected can be set freely by varying the amount of phase shift of the phase controllers of the variable directional

TABLE 2

| Number of stages | Expansion coefficient for F(z) obtained by the discrete Fourier series expansion | Normalized expansion coefficient for F(z) $b_k$ | Expansion coefficient for H(z) obtained from normalized F(z) $a_k$ | Amount of phase shift of phase controller of variable directional coupler $\theta_k$ | Amount of phase shift of phase controller on asymmetric Mach-Zehnder interferometer $\phi_k$ |
|---|---|---|---|---|---|
| 0 | −0.05774   0.02392j | −0.05711 − 0.02366j | 0.73784 + 0.30562J | −0.14526 × π |  |
| 1 | −0.04419 − 0.04419j | −0.04371 − 0.04371j | 0.08863 + 0.03945j | 0.93724 | −0.09407 × π |
| 2 | −0.02392 − 0.05774j | −0.02366 − 0.05711j | 0.06236 + 0.13593j | 0.93328 | 0.83390 |
| 3 | 0.00000 + 0.18750j | 0.00000 + 0.18546j | −0.02801 + 0.12590j | 0.94850 | 0.83715 |
| 4 | 0.02392 − 0.05774j | 0.02366 − 0.05711j | 0.10816 − 0.26489j | 0.79654 | −0.07160 |
| 5 | 0.04419 − 0.04419j | 0.04371 − 0.04371j | −0.02325 + 0.04513j | 0.93110 | −0.06296 |
| 6 | 0.05774 − 0.02392j | 0.05711 − 0.02366j | −0.07545 + 0.03590j | 0.91408 | 0.81249 |
| 7 | −0.18750 + 0.00000j | −0.18546 + 0.00000j | −0.08230 − 0.01164j | 0.93136 | 0.81100 |
| 8 | 0.05774 + 0.2392j | 0.05711 + 0.02366j | 0.14428 + 0.05840j | 0.78841 | −0.05981 |
| 9 | 0.04419 + 0.04419j | 0.04371 + 0.04371j | −0.01714 − 0.01036j | 0.94493 | −0.06318 |
| 10 | 0.02392 + 0.05774j | 0.02366 + 0.05711j | −0.01636 − 0.03340j | 0.92610 | 0.82303 |
| 11 | 0.00000 − 0.18750j | 0.00000 − 0.18546j | 0.00307 − 0.04416j | 0.93220 | 0.82489 |
| 12 | −0.02392 + 0.05774j | −0.02366 + 0.05711j | −0.02295 + 0.05687j | 0.83754 | −0.08437 |
| 13 | −0.04419 + 0.04419j | −0.04371 + 0.04371j | 0.00056 − 0.00109j | 0.96557 | −0.10796 |
| 14 | −0.05774 + 0.02392j | −0.05711 + 0.02366j | 0.00710 − 0.00362j | 0.95659 | 0.87250 |
| 15 | 0.18750 + 0.00000j | 0.18546 + 0.00000j | 0.01436 + 0.00000j | 0.09418 | −0.14062 |
| 16 | 0.00000 + 0.00000j | 0.00000 + 0.00000j | 0.00000 + 0.00000j | 1.00000 | 0.00000 |
| 17 | 0.00000 + 0.00000j | 0.00000 + 0.00000j | 0.00000 + 0.00000j | 1.00000 | 0.00000 |
| 18 | 0.00000 + 0.00000j | 0.00000 + 0.00000j | 0.00000 + 0.00000j | 1.00000 | 0.00000 |
| 19 | 0.00000 + 0.00000j | 0.00000 + 0.00000j | 0.00000 + 0.00000j | 1.00000 | 0.00000 |
| 20 | 0.00000 + 0.00000j | 0.00000 + 0.00000j | 0.00000 + 0.00000j | 1.00000 | 0.00000 |
| 21 | 0.00000 + 0.00000j | 0.00000 + 0.00000j | 0.00000 + 0.00000j | 1.00000 | 0.00000 |
| 22 | 0.00000 + 0.00000j | 0.00000 + 0.00000j | 0.00000 + 0.00000j | 1.00000 | 0.00000 |
| 23 | 0.00000 + 0.00000j | 0.00000 + 0.00000j | 0.00000 + 0.00000j | 1.00000 | 0.00000 |

In this example, the expansion coefficients become complex numbers, because f(z) has no special symmetry. The minimum number of expansion terms required was 15. Based on the expansion coefficients in the table, the amount $\theta_k$ of phase shift of phase controllers of variable directional coupler, and the amount $\phi_k$ of phase shift of phase controllers on the delay line were obtained in accordance with the aforementioned four-step design procedures. Since the minimum required number of expansion terms was 15, the necessary number of stages is N=15. In the optical filter at the 23 stages, the remaining stages ranging from the 16th stage to the 23rd stage were such that the amount of phase shift of the phase controllers of the variable directional coupler was set at π, and the amount of phase shift of the phase controllers was set at 0. The reason why the amount of phase shift of the phase controllers of the variable directional coupler was set at 1 was that with the variable directional coupler of the Mach-Zehnder interferometer configuration, the amplitude coupling rate is 1 when the amount of phase shift of the phase controllers is 0, and 0% when the amount of phase shift is π. In Table 2, the amount of phase coupler and the amount of phase shift of the phase controllers on the delay line. In the instant example, moreover, the time required to change the parameters was as short as about several milliseconds, because changes in refractive index due to heat are utilized, and the variable directional couplers and phase controllers are controlled by heaters.

c) Group delay equalizer

Optical signal that has traveled through optical fibers extending over a long distance undergo distortion in signal waveform due to wavelength dispersion of the optical fibers. This waveform distortion can be compensated for by the use of an equalizer having the dispersion characteristics opposite to the dispersion of the optical fibers. The instant example gives an example in which an optical group delay equalizer was achieved by using the optical signal processor of the present invention. In this example, the equalizer was designed in an attempt to compensate for waveform distortion produced when the optical fibers were used in the 1.55 μm band in connection with the cross port characteristics.

That polynominal expansion f(z) for z in the cross characteristics which satisfies the above requirement was obtained by Fourier expansion as in Equation (12).

$$f(z) = j\left(\sum_{k=0}^{22} b_k z^{-k}\right) z^{11} \qquad (12)$$

$$= j\{(-0.04126 + 0.08628 z^{-1} - 0.1786 z^{-2} + 0.08682 z^{-21} + 0.04126 z^{-22})\} z^{11}$$

Table 3 reveals all the expansion coefficients.

TABLE 3

| Number of stages | Expansion coefficient for F(z) obtained by Fourier series expansion | Normalized expansion coefficient for F(z) $b_k$ | Expansion coefficient for H(z) obtained from normalized F(z) $a_k$ | Amount of phase shift of phase controller of variable directional coupler $\theta_k$ | Amount of phase shift of phase controller on asymmetric Mach-Zehnder interferometer $\phi_k$ |
|---|---|---|---|---|---|
| 0  | −0.04266 | −0.04126 | 0.41506  | −0.06307 × π | |
| 1  | 0.08839  | 0.08628  | 0.00000  | −0.87076 | 0.000 × π |
| 2  | −0.18296 | −0.17860 | 0.32867  | 0.79867  | 0.000 |
| 3  | 0.25041  | 0.24444  | 0.00000  | −0.79612 | 0.000 |
| 4  | −0.24204 | −0.23627 | 0.08626  | 0.92883  | 0.000 |
| 5  | 0.09856  | 0.09621  | 0.00000  | 0.86252  | 0.000 |
| 6  | 0.15421  | 0.15053  | −0.03953 | −0.73506 | 0.000 |
| 7  | −0.25156 | −0.24556 | 0.00000  | 0.92638  | 0.000 |
| 8  | 0.05927  | 0.05786  | 0.04857  | 0.75812  | 0.000 |
| 9  | 0.22442  | 0.21906  | 0.00000  | −0.79504 | 0.000 |
| 10 | −0.19217 | −0.18759 | 0.04567  | −0.86502 | 0.000 |
| 11 | −0.19424 | −0.18960 | 0.00000  | 0.76470  | 0.000 |
| 12 | 0.19217  | 0.18759  | −0.00033 | 0.86502  | 0.000 |
| 13 | 0.22442  | 0.21906  | 0.00000  | −0.79504 | 0.000 |
| 14 | −0.05927 | −0.05786 | −0.00144 | −0.75812 | 0.000 |
| 15 | −0.25156 | −0.24556 | 0.00000  | 0.92638  | 0.000 |
| 16 | −0.15421 | −0.15053 | −0.02105 | 0.73506  | 0.000 |
| 17 | 0.09856  | 0.09621  | 0.00000  | 0.86252  | 0.000 |
| 18 | 0.24204  | 0.23627  | 0.01005  | −0.92883 | 0.000 |
| 19 | 0.25041  | 0.24444  | 0.00000  | −0.79612 | 0.000 |
| 20 | 0.18296  | 0.17860  | 0.01434  | −0.79687 | 0.000 |
| 21 | 0.08839  | 0.08628  | 0.00000  | −0.87076 | 0.000 |
| 22 | 0.04226  | 0.04126  | 0.00410  | 0.06307  | 0.000 |
| 23 | 0.00000  | 0.00000  | 0.00000  | 1.00000  | 0.000 |

Figure 10:
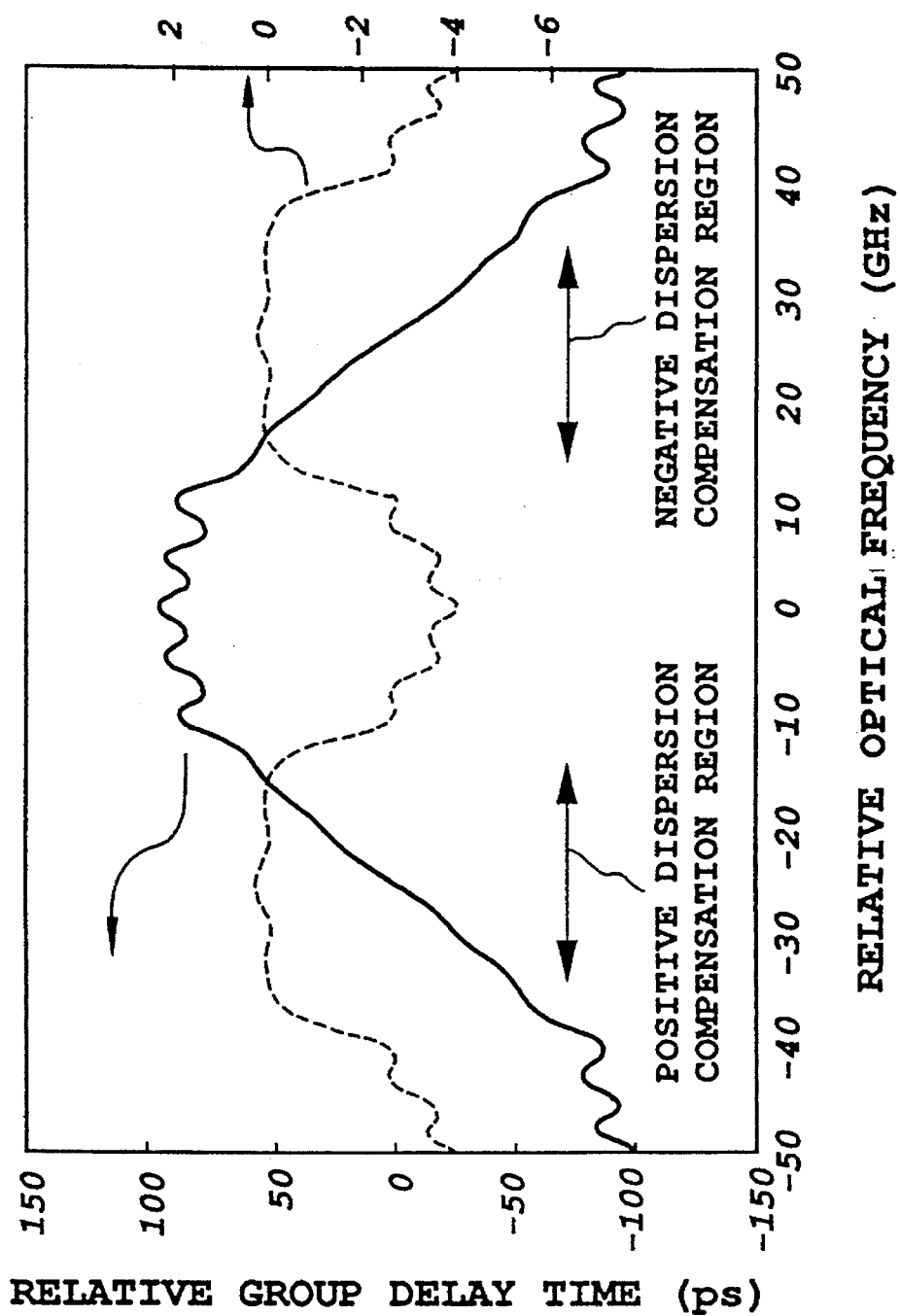
FIG. 10 is a graph showing the group delay characteristics of a light group delay equalizer achieved by the optical signal processor as the first embodiment of the present invention.

In this example, as in the case of Design Example a), the amplitude characteristics are symmetric with respect to the origin of the frequency, while the phase characteristics are asymmetric with respect to the origin of the frequency. Thus, the expansion coefficient for f(z) becomes a real number. In making calculations, the minimum required number of expansion terms that fulfills the desired characteristics was determined to be 22. Based on the expansion coefficients in the table, the amount $\theta_k$ of phase shift of the phase controllers of the variable directional coupler, and the amount $\phi_k$ of phase shift of the phase controllers on the delay line were designed in accordance with the aforementioned design procedures. Since the necessary number of stages for this circuit is 22, the amount of phase shift of the phase controllers of the variable directional coupler at the 23rd stage was set at π, and the amount of phase shift of the phase controllers on the delay line was set at 0. FIG. 10 shows the group delay characteristics of the optical group delay equalizer prepared. A dispersion compensating effect of 650 psec/nm was obtained in a frequency region of about 22 GHz. This outcome can be taken to demonstrate that the achieved optical group delay equalizer shows group delay characteristics practically as were designed.

Examples were shown hereinabove which were intended to realize an optical signal processor having the above-described three kinds of filter characteristics by use of the same circuit. In all examples, maximum transmittance of 100% the present invention aims at could be achieved. In the instant embodiment, directional couplers having a variable coupling rate were used in order to enable arbitrary optical signal processing by a single circuit. To achieve an optical signal processor having a single function, however, it is also possible to use directional couplers having a fixed coupling rate instead of variable directional couplers. This use involves the advantage that the number of parts may be small. This is claimed in claim 3.

<Embodiment 2>

Figure 11:
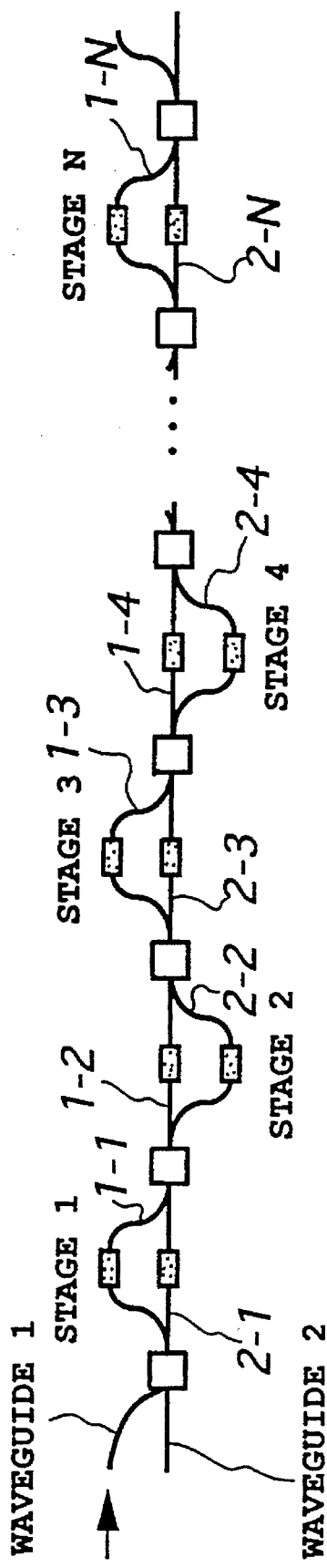
FIG. 11 is a circuit structure diagram showing a second embodiment of an optical signal processor relevant to the present invention.
Figure 12:
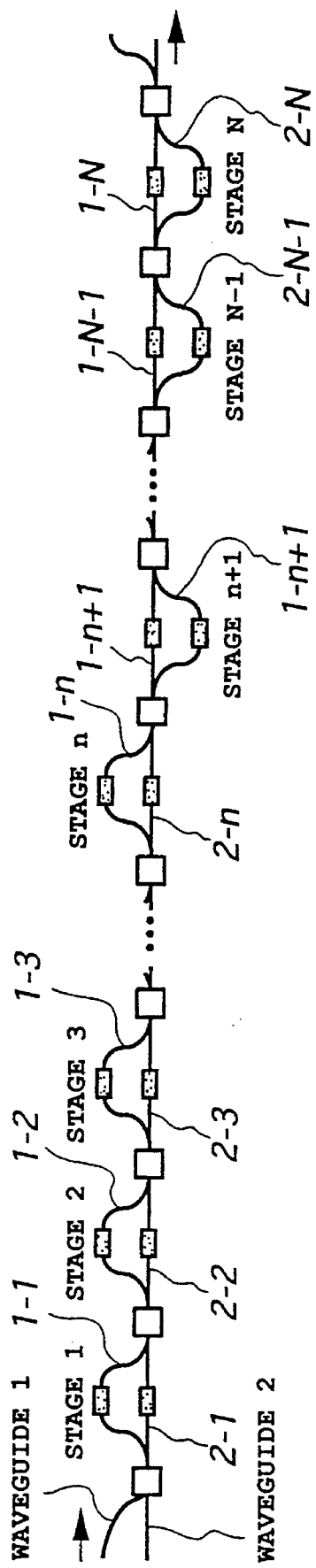
FIG. 12 is a circuit structure diagram showing the second embodiment of an optical signal processor relevant to the present invention, in which the arrangement of the waveguides is different from that in FIG. 11.

This embodiment is one of claim 1 for attaining the object 1. The circuit architecture of the instant embodiment is shown in FIGS. 11 and 12. In Embodiment 1, of the two optical waveguides interposed between the variable directional couplers, the waveguide constituents with a longer optical path were all on the waveguide 1 side. Actually, $2^N$ waveguide layouts are conceivable depending on which of the two optical waveguides interposed between the variable directional couplers will be used as the waveguide with a longer optical path. In the instant embodiment, of the $2^N$ waveguide layouts, the following two kinds of layouts were used to prepare the same linear phase Chebyshev filter as in Example (1-a).

[Waveguide layout 1]

A layout in which waveguides with a longer optical path appear alternately as waveguide 1 and waveguide 2 (FIG. 11).

[Waveguide layout 2]

A layout in which waveguides with a longer optical path are present on the waveguide 1 side in unit constituent circuits k=0 through k=n, and waveguides with a longer optical path are present on the waveguide 2 side in unit constituent circuits k=n+1 through k=N.

Circuit parameters for these waveguide layouts are obtained easily from the results of calculation of circuit parameters shown in Table 2 of Example (1-a). This is performed easily by the following procedures:

[Procedure 2-1]

Obtain circuit parameters for achieving a linear phase Chebyshev filter in connection with a case in which waveguides with a larger optical path length are all present on the waveguide 1 side, as in Example (1-a).

[Procedure 2-2]

In the desired waveguide layout, decrease only by $\pi$ the amount of phase shift of phase controllers for variable directional couplers present at both ends of each asymmetric Mach-Zehnder interferometers in which a waveguide with a larger optical path length is on the waveguide 2 side. Repeat this step for all asymmetric Mach-Zehnder interferometer in which waveguides with a larger optical path length are on the waveguide 2 side.

Table 4 presents circuit parameters obtained in connection with the waveguide structure of [Waveguide layout 1] shown in FIG. 11.

TABLE 4

| Number of stages | Expansion coefficient for F(z) obtained by Remez exchange | Normalized expansion coefficient for F(z) $b_k$ | Expansion coefficient for H(z) obtained from normalized F(z) $a_k$ | Amount of phase shift of phase controllers of variable directional coupler $\theta_k$ | Amount of phase shift of phase controllers on asymmetric Mach-Zehnder interferometer $\phi_k$ |
|---|---|---|---|---|---|
| 0 | 0.00337 | 0.00332 | −0.00369 | 0.00295 × $\pi$ | |
| 1 | 0.01494 | 0.01468 | −0.02777 | −0.01493 | 0.000 × $\pi$ |
| 2 | 0.01057 | 0.01039 | −0.06446 | 0.01955 | 0.000 |
| 3 | 0.00254 | 0.00250 | −0.07708 | −0.01940 | 0.000 |
| 4 | −0.01593 | −0.01565 | −0.11144 | 0.00523 | 0.000 |
| 5 | −0.03409 | −0.03349 | −0.00643 | 0.02049 | 0.000 |
| 6 | −0.03811 | −0.03745 | −0.02560 | −0.04665 | 0.000 |
| 7 | −0.01463 | −0.01438 | 0.25958 | 0.05330 | 0.000 |
| 8 | 0.04009 | 0.03939 | 0.00000 | −0.01988 | 0.000 |
| 9 | 0.11541 | 0.11341 | 0.35648 | −0.06456 | 0.000 |
| 10 | 0.18851 | 0.18524 | −0.67658 | 0.18872 | 0.000 |
| 11 | 0.23355 | 0.22949 | −0.10130 | −0.29263 | 0.000 |
| 12 | 0.23355 | 0.22949 | 0.31968 | 0.29263 | 0.000 |
| 13 | 0.18851 | 0.18524 | 0.00574 | −0.18872 | 0.000 |
| 14 | 0.11541 | 0.11341 | 0.00425 | 0.06465 | 0.000 |
| 15 | 0.04009 | 0.03939 | 0.03567 | 0.01988 | 0.000 |
| 16 | −0.01463 | −0.01438 | 0.01571 | −0.05330 | 0.000 |
| 17 | −0.03811 | −0.03745 | 0.01284 | 0.04665 | 0.000 |
| 18 | −0.03409 | −0.03349 | −0.00428 | −0.02049 | 0.000 |
| 19 | −0.01593 | −0.01565 | −0.00647 | −0.00523 | 0.000 |
| 20 | 0.00254 | 0.00250 | −0.00813 | 0.01940 | 0.000 |
| 21 | 0.01057 | 0.01039 | −0.00482 | −0.01955 | 0.000 |
| 22 | 0.01494 | 0.01468 | 0.00397 | 0.01493 | 0.000 |
| 23 | 0.00337 | <0.00332 | 0.00298 | 0.99705 | 0.000 |

TABLE 5

| Number of stages | Expansion coefficient for F(z) obtained by Remez exchange | Normalized expansion coefficient for F(z) $b_k$ | Expansion coefficient for H(z) obtained from normalized F(z) $a_k$ | Amount of phase shift of phase controllers of variable directional coupler $\theta_k$ | Amount of phase shift of phase controllers on asymmetric Mach-Zehnder interferometer $\phi_k$ |
|---|---|---|---|---|---|
| 0 | 0.00337 | 0.00332 | −0.00369 | 0.00295 × $\pi$ | |
| 1 | 0.01494 | 0.01468 | −0.02777 | −0.01493 | 0.000 × $\pi$ |
| 2 | 0.01057 | 0.01039 | −0.06446 | 0.01955 | 0.000 |
| 3 | 0.00254 | 0.00250 | 0.07708 | −0.01940 | 0.000 |
| 4 | −0.01593 | −0.01565 | −0.11144 | 0.00523 | 0.000 |
| 5 | −0.03409 | −0.03349 | −0.00643 | 0.02049 | 0.000 |
| 6 | −0.03811 | −0.03745 | −0.02560 | −0.04665 | 0.000 |

TABLE 5-continued

| Number of stages | Expansion coefficient for F(z) obtained by Remez exchange | Normalized expansion coefficient for F(z) $b_k$ | Expansion coefficient for H(z) obtained from normalized F(z) $a_k$ | Amount of phase shift of phase controllers of variable directional coupler $\theta_k$ | Amount of phase shift of phase controllers on asymmetric Mach-Zehnder interferometer $\phi_k$ |
|---|---|---|---|---|---|
| 7  | −0.01463 | −0.01438 | 0.25958  | 0.05330  | 0.000 |
| 8  | 0.04009  | 0.03939  | 0.00000  | −0.01988 | 0.000 |
| 9  | 0.11541  | 0.11341  | 0.35648  | −0.06465 | 0.000 |
| 10 | 0.18851  | 0.18524  | −0.67658 | 0.18872  | 0.000 |
| 11 | 0.23355  | 0.22949  | −0.10130 | −0.29263 | 0.000 |
| 12 | 0.23355  | 0.22949  | 0.31968  | −0.70737 | 0.000 |
| 13 | 0.18851  | 0.18524  | 0.00574  | −0.18872 | 0.000 |
| 14 | 0.11541  | 0.11341  | 0.00425  | 0.06465  | 0.000 |
| 15 | 0.04009  | 0.03939  | 0.03567  | 0.10988  | 0.000 |
| 16 | −0.04163 | −0.01438 | 0.01571  | −0.05330 | 0.000 |
| 17 | −0.03811 | −0.03745 | 0.01284  | 0.04665  | 0.000 |
| 18 | −0.03409 | −0.03349 | −0.00428 | −0.02049 | 0.000 |
| 19 | −0.01593 | −0.01565 | −0.00647 | −0.00523 | 0.000 |
| 20 | 0.00254  | 0.00250  | −0.00813 | 0.01940  | 0.000 |
| 21 | 0.01057  | 0.01039  | −0.00482 | −0.01955 | 0.000 |
| 22 | 0.01494  | 0.01468  | 0.00397  | 0.01493  | 0.000 |
| 23 | 0.00337  | 0.00332  | 0.00298  | −0.00295 | 0.000 |

Table 5 Designed values of [Waveguide structure 2] of Embodiment 2

1 Number of stages

2 Expansion coefficient for F (z) obtained by Remez exchange

3 Normalized expansion coefficient for F(z)
$b_k$

4 Expansion coefficient for H(z) obtained from normalized F(z)
$a_k$

5 Amount of phase shift of phase controllers of variable directional coupler
$\theta_k$ 6 Amount of phase shift of phase controllers on asymmetric Mach-Zehnder interferometer
$\phi_k$ In both tables, the gray colored portion represents changes made to the circuit parameters of Example (1-a). Based on these results, a filter circuit was prepared for each waveguide layout, and the filter characteristics were measured. The same filter characteristics as in Example (1-a) were found to be obtained.

As this embodiment indicates, the present invention enables circuit parameters to be designed for all of $2^N$ kinds of waveguide layouts that are different depending on which of the waveguide 1 side and the waveguide 2 side the waveguides with a larger optical path length will be put on. This fact shows that the present invention is in no way restricted to the above-mentioned two waveguide layouts.

<Embodiment 3>

Figure 13:
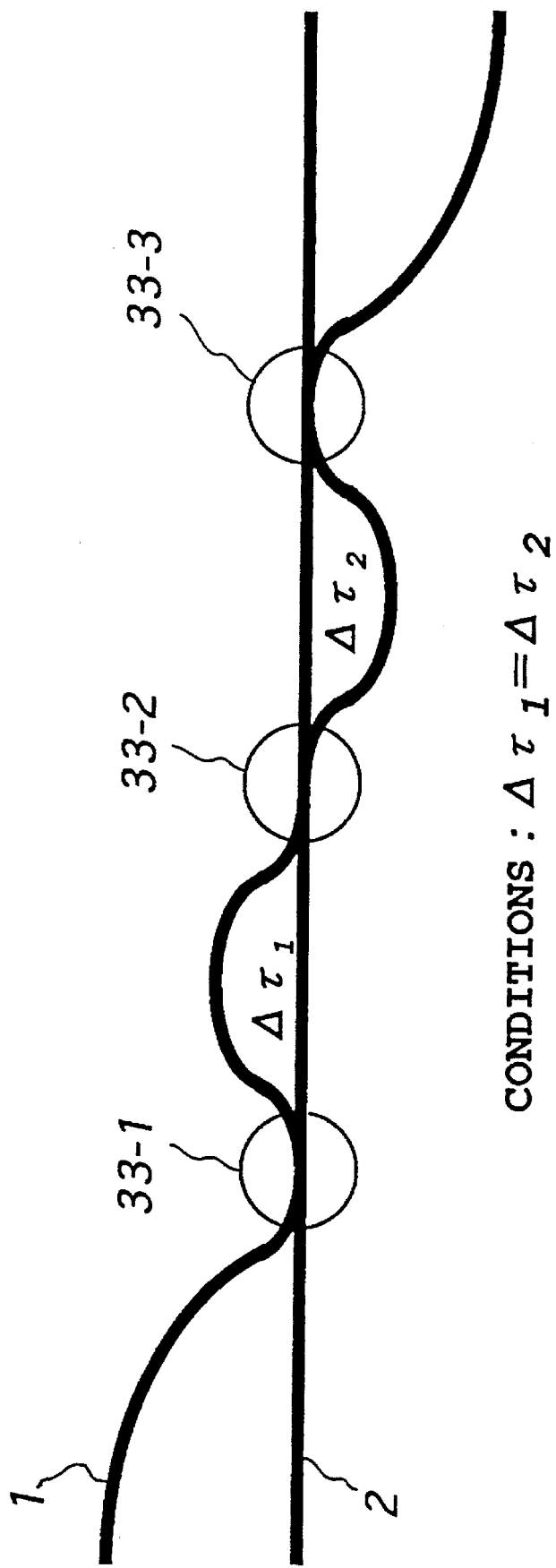
FIG. 13 is a circuit structure diagram showing a fixed directional coupler constituting the optical signal processor as a third embodiment of the present invention, in which the coupler has a practically constant coupling rate with respect to the wavelength used.
Figure 14:
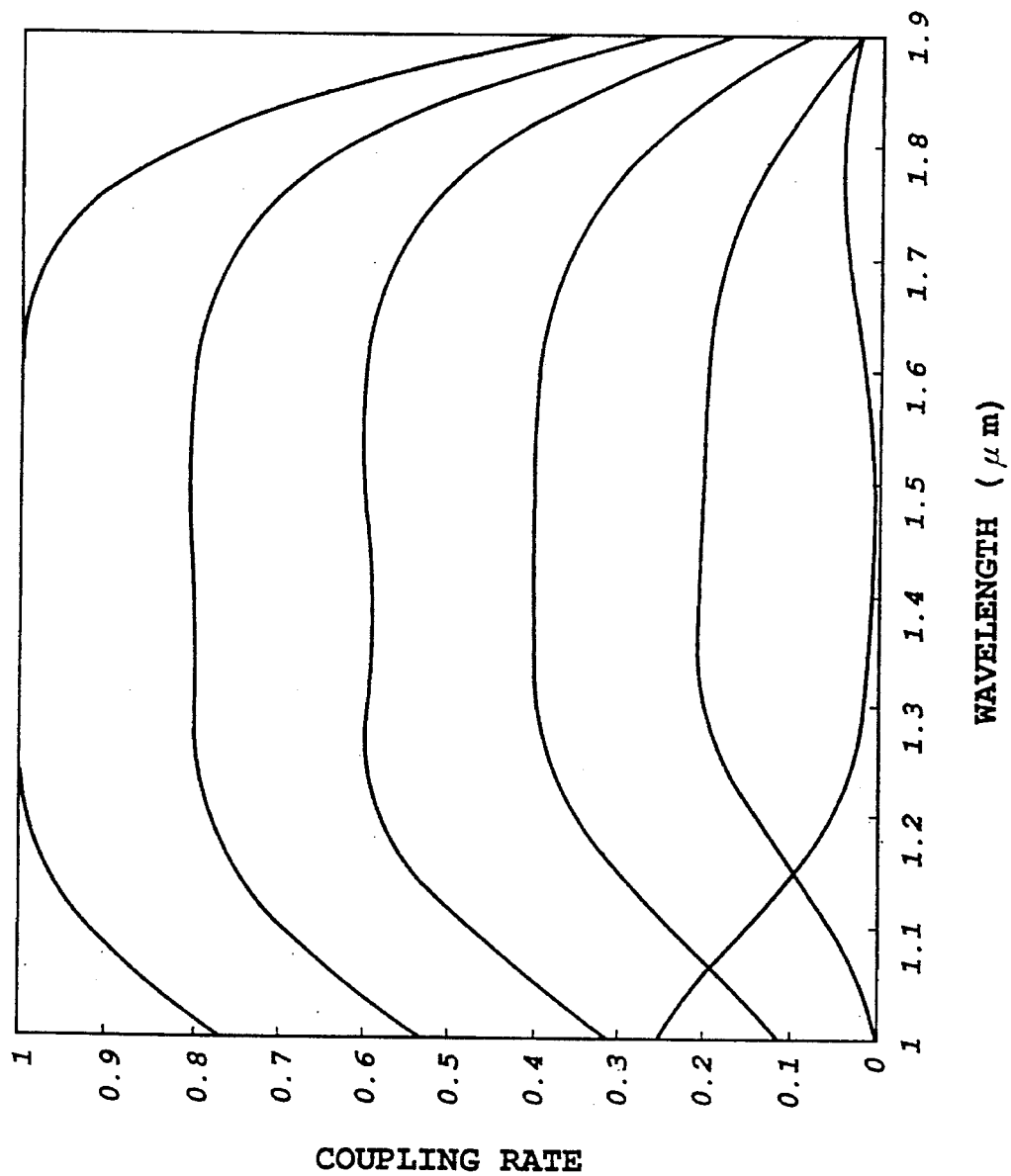
FIG. 14 is a graph showing the wavelength dependency of the coupling rate of a wavelength-independent directional coupler used in the optical signal processor as the third embodiment of the present invention.

This embodiment is claim 4 put into practice in order to attain the object 2. In the present embodiment, the number of stages of the asymmetric Mach-Zehnder interferometers was set at 23 (N=23), in view of the filter characteristics to be realized. As a directional coupler showing a fixed coupling rate practically constant with respect to wavelength, there was used a structure comprising three directional couplers 33 described in claim 9 as illustrated in FIG. 13. FIG. 14 shows the wavelength dependency of the power coupling rate of the directional coupler showing a fixed coupling rate practically constant with respect to the wavelength used.

Here, an optical wavelength filter having the same linear phase Chebyshev transmission characteristics as in Embodiment 1, a) was prepared. This optical filter has phase characteristics with cross characteristics proportional to frequency (inverse number of wavelength). In terms of group delay characteristics, it has constant group delay characteristics, and achieves band-pass Chebyshev type transmission characteristics. The characteristic values required of this optical filter were set at a frequency interval of 12,500 GHz (f=2×10$^{14}$ Hz (λ=1.5 μm), f=1.875×10$^{14}$ Hz (λ=1.6 μm)), a transmission range frequency of −1550 GHz to 1550 GHz, and an attenuation rate at the left and right ends of transmission range of 38.1 dB. From the characteristics of FIG. 14, it can be confirmed that the wavelength-independent directional coupler used in the instant embodiment has a practically constant coupling rate in the wavelength range of 1.5 to 1.6 μm. The polynominal f(z) for z, which satisfies these requirements, is the same expansion equation as Equation (10) of Embodiment 1.

Figure 15:
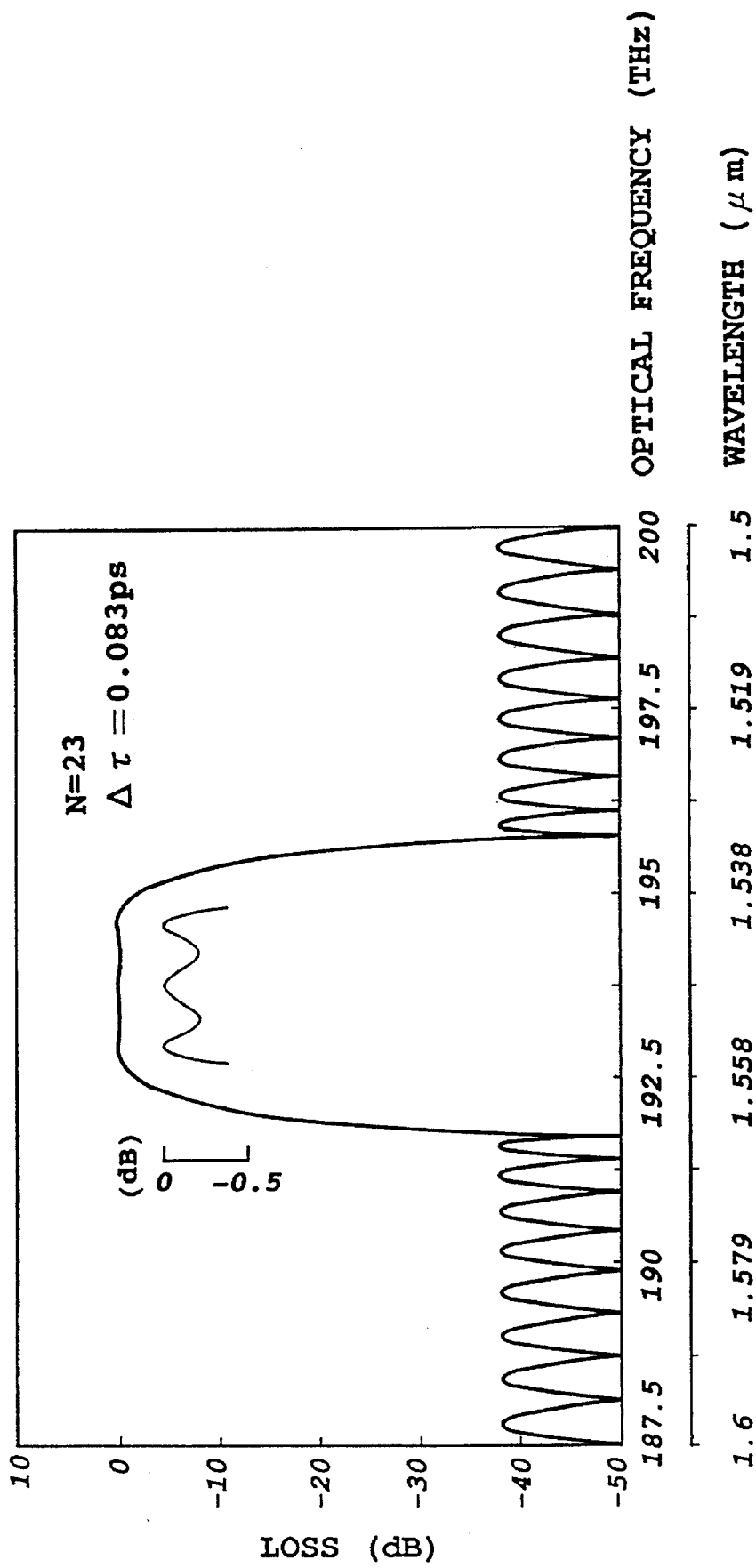
FIG. 15 is a graph showing the transmission characteristics of a Chebyshev type filter achieved by the optical signal processor as the first embodiment of the present invention.

In this embodiment as well, the amplitude characteristics are symmetric with respect to the origin of relative frequency, while the phase characteristics are asymmetric with respect to the origin of relative frequency. Thus, the expansion coefficient for f(z) becomes a real number. Based on the expansion coefficients in the table, the amount $\theta_k$ of phase shift of the phase controllers of the variable directional coupler, and the amount $\phi_k$ of phase shift of the phase controllers on the delay line were designed in accordance with the aforementioned design procedures. FIG. 15 shows the results of measurement of the power transmission intensity of the optical filter prepared. From the results of measurement of the characteristics, the Chebyshev type transmission characteristics as designed were confirmed to be obtained.

In order to achieve a fixed direction coupler having a practically constant coupling rate with respect to wavelength so as to have the designed values, a considerable accuracy is required for directional couplers 33-1, 33-2 and 33-3 constituting such a fixed directional coupler. To solve this problem, it is also possible to replace the directional couplers 33-1, 33-2 and 33-3 further by variable directional couplers having a practically constant coupling rate with respect to the wavelength shown in claim 8 or 9 and tune them.

<Embodiment 4>

Figure 16:
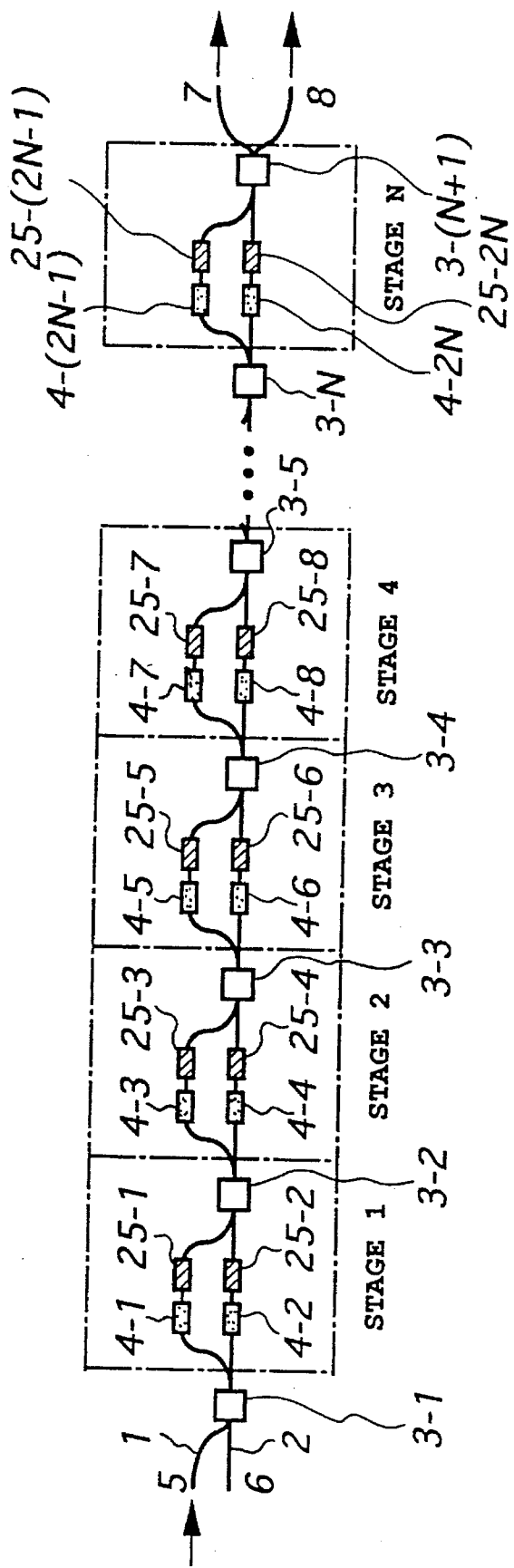
FIG. 16 is a circuit structure diagram of an optical signal processor as the third embodiment of the present invention.
Figure 17:
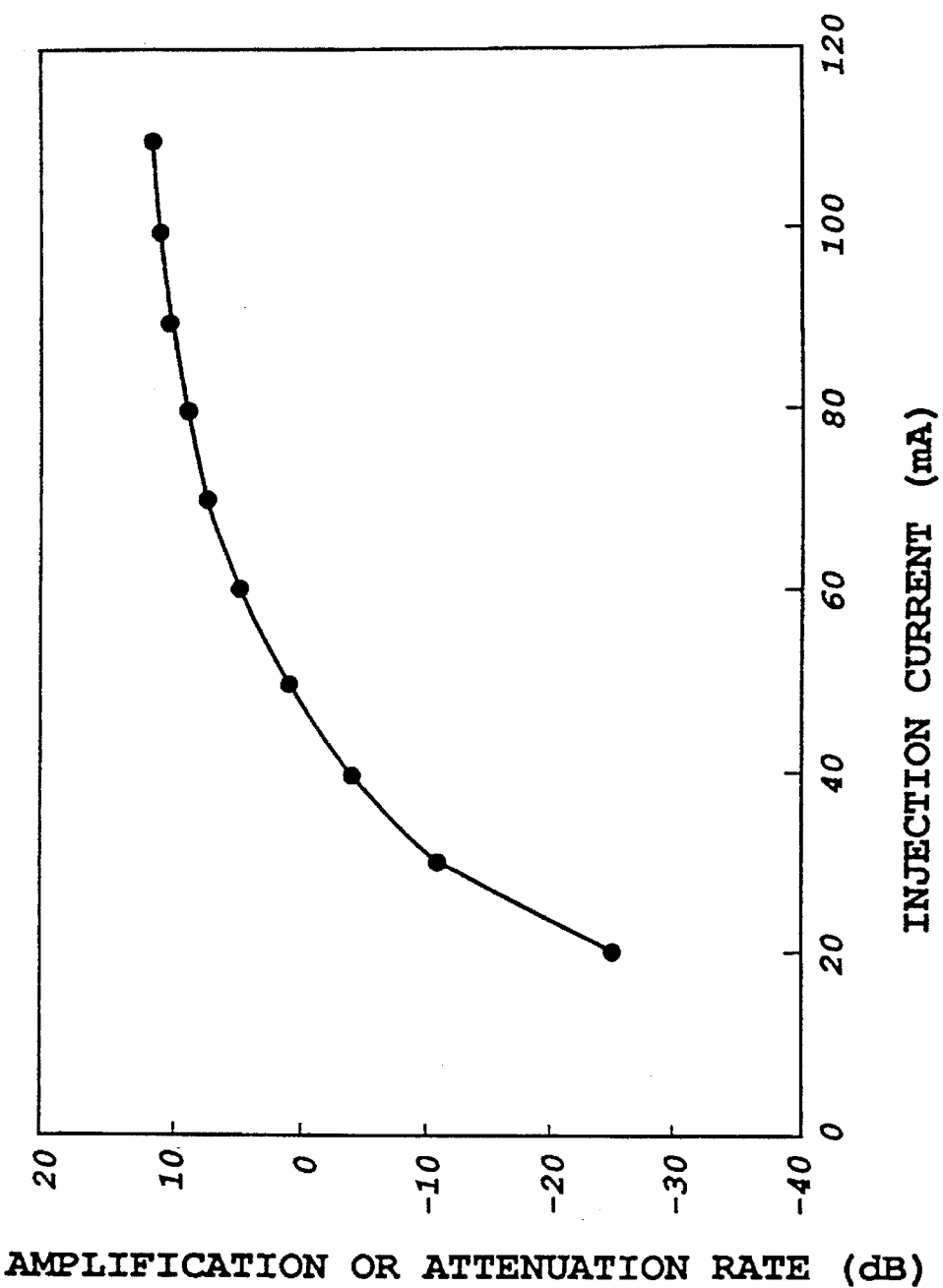
FIG. 17 is a graph showing the injection current dependency of the amplification/attenuation rate of an InGaAsP optical amplifier used in the optical signal processor as the third embodiment of the present invention.

This embodiment is claims 14–16 put into practice in order to attain the object 3. A structural diagram of this embodiment is shown in FIG. 16. The greatest difference of this embodiment from the circuit structure of Embodiment 1 is that an amplifying/attenuating device produced from an InGaAsP semiconductor is provided adjacent to the phase controller. This amplifying/attenuating device is basically an InGaAsP BH type optical amplifier, but works as an attenuator in an area with little injection current, and so is usable as an amplifying/attenuating device. Here its function is defined as amplification if attenuation rate is positive, and as attenuation if attenuation rate is negative. Since the difference in amplification/attenuation rate, if any, between the waveguides 1 and 2 at the asymmetric Mach-Zehnder interferometer makes designing difficult, amplifying/attenuating devices having the same amplification/attenuation rate at each asymmetric Mach-Zehnder interferometer portion were disposed on the waveguides 1 and 2 in the instant embodiment. The length of the InGaAsP amplifying/attenuating device was 300 μm. A silica-based guided-wave circuit was prepared by the same method as described in Embodiment 1, and the portions corresponding to amplifying/attenuating devices were punched by etching, whereafter amplifying/attenuating devices were embedded there. The amplifying/attenuating rates of the GaAS amplifying/attenuating device used here are shown in FIG. 17. When an injection current of 20 mA was applied, the amplifying/attenuating rate was −25 dB; for an injection current of 100 mW, it was 11 dB.

Figure 18:
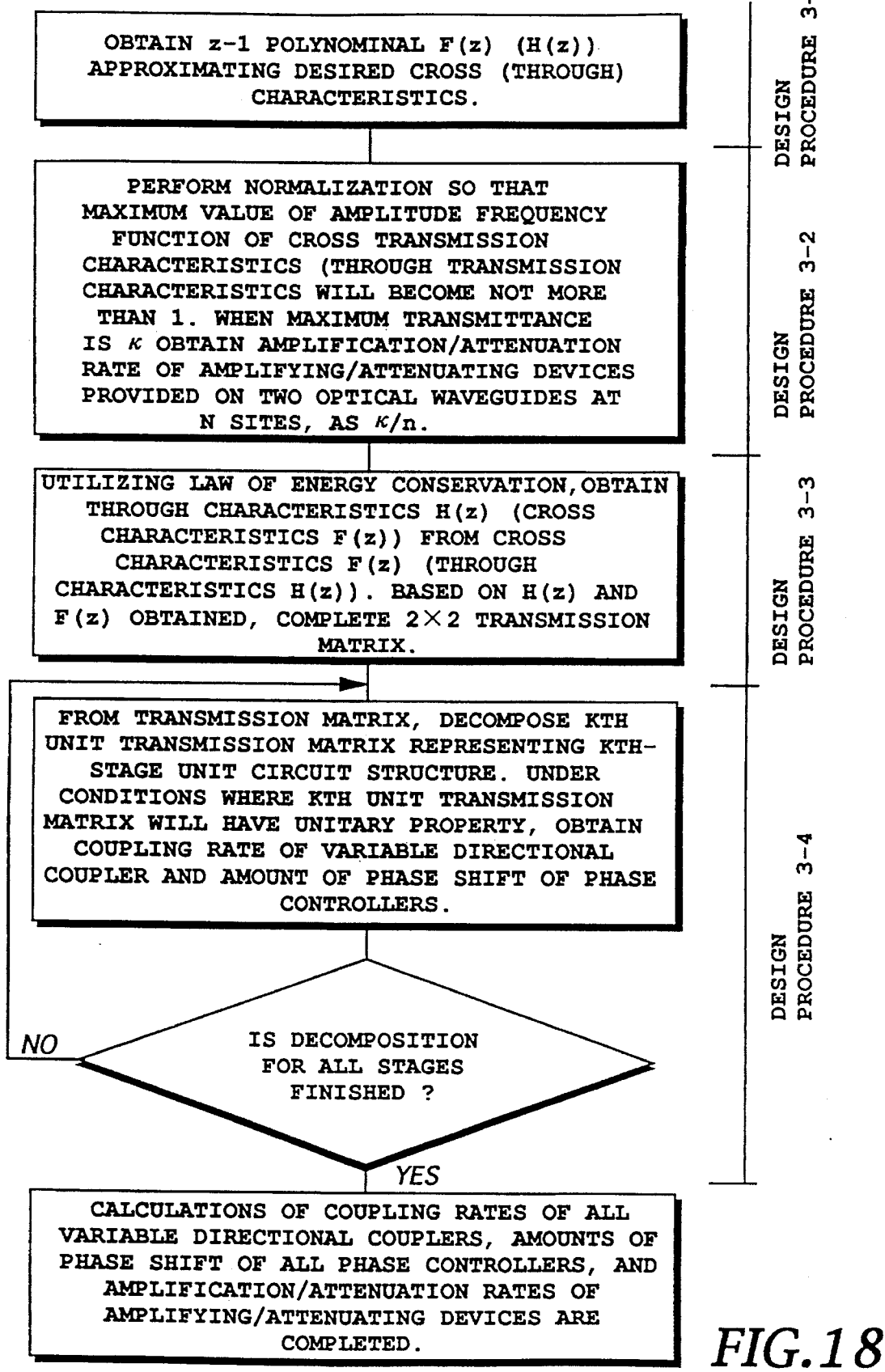
FIG. 18 is a flow chart showing the design procedure for the optical signal processor as the third embodiment of the present invention.

The following are the design procedures for designing circuit parameters in the presence of the desired filter characteristics (FIG. 18).

[Design procedure 4-1]

Same as in [Design procedure 1-1] of Embodiment 1.

[Design procedure 4-2]

The number of stages of the basic constituent circuits of the instant circuit is set at N, and the amplification/attenuation rate of the amplifying/attenuating device of each basic constituent circuit at γ. Let the maximum transmittance of the desired filter characteristics be κ, provided that when κ=1, transmittance=100%. If amplifying/attenuating devices are provided on two optical waveguides at n sites of the N sites, and amplification/attenuation is distributed evenly on each amplifying/attenuating device, the intensity amplification/attenuation rate γ required of each amplifying/attenuating device is obtained as γ=κ/n.

[Design procedure 4-3]

Same as in [Design procedure 1-3] of Embodiment 1.

[Design procedure 4-4]

Same as in [Design procedure 1-4] of Embodiment 1.

As seen from the above procedures, the circuit parameters are obtained by the same method as in Embodiment 1. The only difference from Embodiment 1 is that the optical signal processor of the instant embodiment can achieve the desired maximum transmittance, and the procedures for obtaining the amplification/attenuation rate of each amplifying/attenuating device are added in the synthesis procedures.

Figure 19:
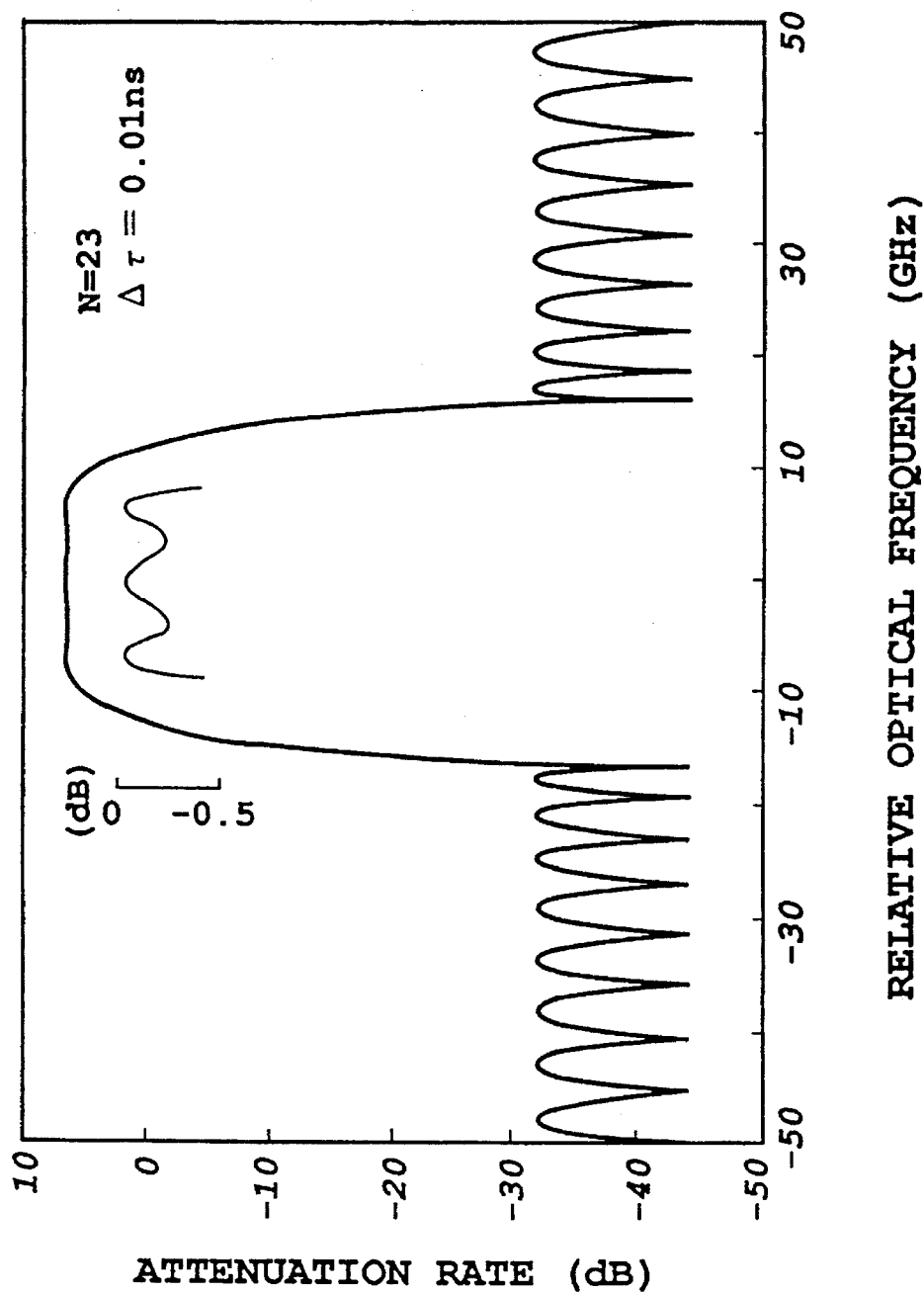
FIG. 19 is a graph showing the optical frequency dependency of the attenuation rate of a Chebyshev type filter with a maximum transmittance of 500% that has been achieved by the optical signal processor as the first embodiment of the present invention.

FIG. 19 shows the results of characteristics measured on a linear phase Chebyshev filter with maximum transmittance of 500% of the same specifications as in Example (1-a) that was prepared in accordance with the above-described design procedures. In preparing it, circuit parameters used were those in Example (1-a). Amplifying/attenuating devices were arranged on all asymmetric Mach-Zehnder interferometers at the 23 stages, and the amplification/attenuation rate γ of each amplifying/attenuating device was set at 0.3 dB. The results of measurement show that maximum transmittance as demanded was obtained.

According to the instant embodiment, an InGaAsP amplifying/attenuating device was used as an amplifying/attenuating device, but the use of other amplifying/attenuating device having an Er-doped silica-based optical waveguide with an equal length enables the same arbitrary maximum transmittance to be achieved.

<Embodiment 5>

This embodiment is claims 17–19 put into practice in order to attain the object 3.

Figure 20:
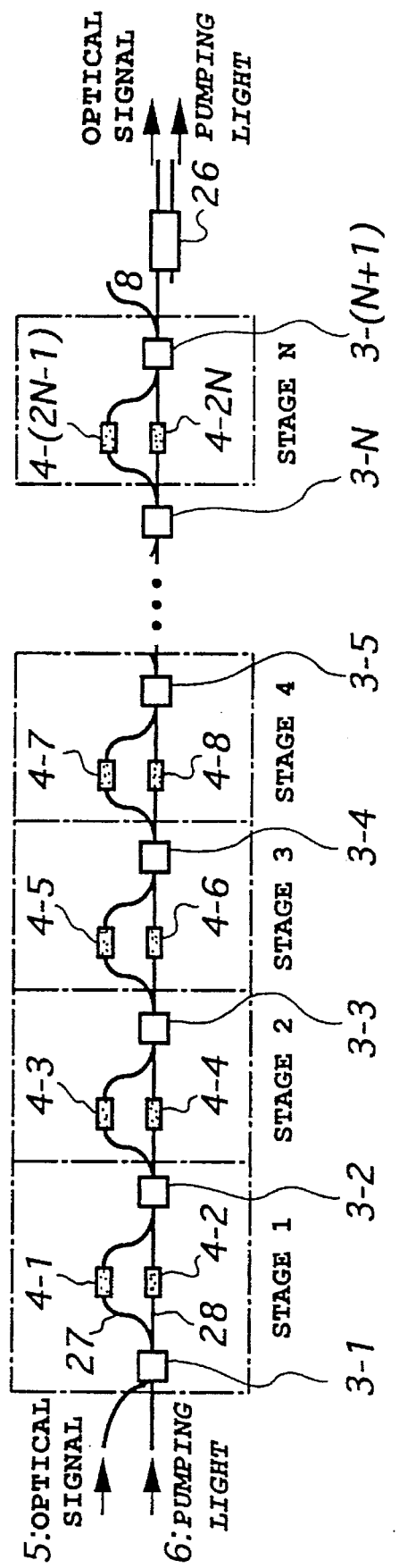
FIG. 20 is a circuit structure diagram of an optical signal processor as a fourth embodiment of the present invention.
Figure 21:
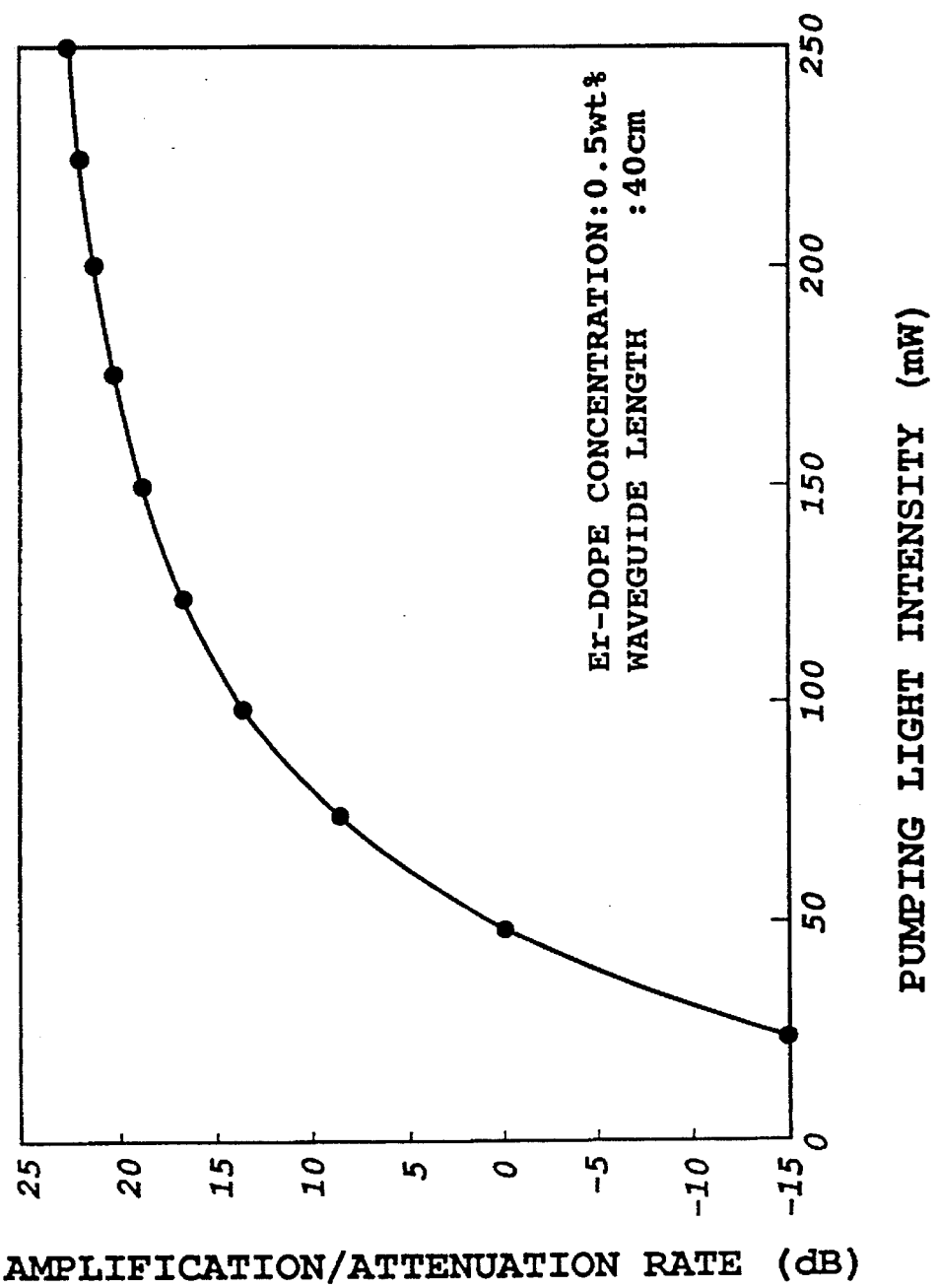
FIG. 21 is a graph showing the pumping optical intensity dependency of the amplification/attenuation rate of an Er-doped silica-based waveguide used in the optical signal processor as the fourth embodiment of the present invention.

A structural diagram of this embodiment is shown in FIG. 20. The greatest difference from the circuit structure described in claims 14–16 is that the amplifying/attenuating devices disposed adjacent to the phase controllers were not used, but instead the two optical waveguides were replaced by Er-doped silica-based optical waveguides 27 and 28. This type of waveguide itself has both functions, amplification and attenuation, in line with the optical intensity of an input pumping light source. Optical signal is injected from an input port 5, and taken out from an output port 8. Pumping light is similarly injected from an input port 6, and taken out from the output port 8. At the output port 8, an optical signal-pumping light separator 26 comprising a guided wave type wavelength filter having a power coupling rate of 0% at 0.98 μm and a coupling rate of 100% at 1,535 μm was used to separate optical signal and pumping light. In preparing the optical circuit of the instant embodiment, the method mentioned in Embodiment 1 was used. FIG. 21 shows the pumping light source intensity of the Er-doped silica-based optical waveguide used in the instant embodiment versus the amplification/attenuation rates of the waveguide. These results are those of a testing waveguide with a waveguide length of 40 cm. The light source used for optical pumping was a Ti:Al$_2$O$_3$ laser pumped by an Ar laser. Its pumping wavelength was 0.98 μm. The light source for optical signal used was a tunable laser diode, and its oscillation wavelength was 1,535 μm. By changing the intensity of pumping light to up to 250 mW, amplification/attenuation rates of from −20 to 22 dB were obtained. The variable directional coupler used was a coupler comprising a symmetric Mach-Zehnder interferometer interposed between 3 dB couplers 9-1 and 9-2 as recited in claim 2. In the asymmetric Mach-Zehnder interferometer portions 14-1 to 14-N being the basic constituents, there are differences in optical path length, which make differences in amplification/attenuation rate between the waveguides 27 and 28. Let the lengths of the two optical waveguides of each asymmetric Mach-Zehnder interferometer be L1 and L2, and the optical density amplification rates of the respective waveguides will become different, i.e. $\exp(\alpha L_1)$ and $\exp(\alpha L_2)$, where α denotes an optical intensity amplification coefficient per unit distance. Actually, designing is difficult if the amplification/attenuation rates of the respective waveguides remain different. Thus, this difference in amplification/attenuation rate according to the difference in optical path length was corrected by utilizing the wavelength dependency of the 3 dB couplers 9 constituting the variable directional coupler 3. Specifically, the coupling rate of the 3 dB directional coupler 9 at 0.98 μm was designed such that the 3 dB directional coupler 9 would remain a 3 dB coupler at 1.535 μm being an optical signal wavelength, but at 0.98 μm being a pumping light wavelength, the amplification/attenuation rate of the waveguides 27 and 28 of the asymmetric Mach-Zehnder interferometer portion would become 1:1; in other words, at the symmetric Mach-Zehnder interferometer portion constituting the variable directional coupler, pumping light is distributed at an optical intensity ratio of 1:1, but it is distributed at an optical intensity ratio of $P_1:P_2$ satisfying $$\alpha(P_1)L_1 = \alpha(P_2)L_2 \quad (13)$$

for the waveguide 27 (waveguide length $L_1$) and the waveguide 28 (waveguide length $L_2$) of the asymmetric Mach-Zehnder interferometer portion. In Equation (13), $\alpha(P)$ represents the pumping optical intensity dependency of optical amplification/attenuation rate shown in FIG. 21. Only the 3 dB couplers at both ends were changed in terms of coupling characteristics so that pumping light would be let in from the input port 6 and let out from the output port 8. Thus, the difference in amplification/attenuation value according to the difference in optical path length can be compensated for by using a 3 dB coupler giving consideration to wavelength dependency. As 3 dB couplers with such wavelength dependency, there exit various types such as directional couplers with asymmetric waveguides coming close to each other. Here, there was used a 3 dB coupler with wavelength dependency comprising two serially arranged asymmetric Mach-Zehnder interferometers having an optical path length difference comparable to the wavelength.

Figure 22:
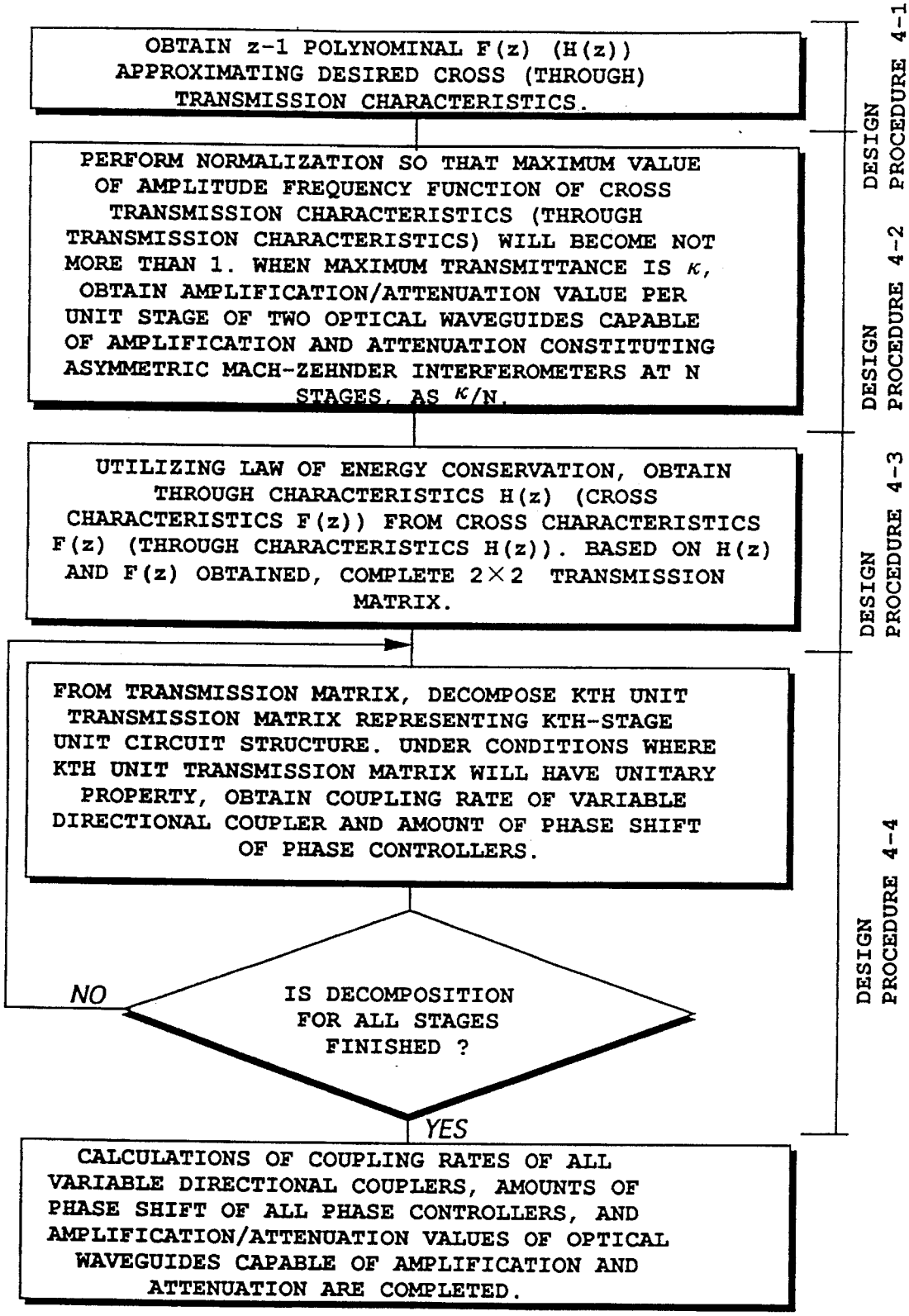
FIG. 22 is a flow chart showing the design procedure for the optical signal processor as the fourth embodiment of the present invention.

The following are the design procedures for designing circuit parameters in the presence of the desired filter characteristics (FIG. 22).

[Design procedure 5-1]

Same as in [Design procedure 1-1] of Embodiment 1.

[Design procedure 5-2]

The number of stages of the basic constituent circuits of the instant circuit is set at N, and the amplification/attenuation rate of the amplifying/attenuating device of each basic constituent circuit at $\gamma$. Let the maximum transmittance of the desired filter characteristics be $\kappa$, provided that when $\kappa=1$, transmittance=100%. In this case, the amplification/attenuation rate $\gamma$ of the two optical waveguides capable of amplification and attenuation that constitute the necessary basic constituent circuit is obtained as $\gamma = \kappa/n$.

The expansion coefficient of the cross filter characteristics is obtained similarly by the [Design procedure 1-2] of Embodiment 1.

[Design procedure 5-3]

Same as in [Design procedure 1-3] of Embodiment 1.

[Design procedure 5-4]

Same as in [Design procedure 1-4] of Embodiment 1.

As seen from the above procedures, the circuit parameters are obtained by the same method as in Embodiment 1. The only difference from Embodiment 1 is that the optical signal processor of the instant embodiment can achieve the desired maximum transmittance, and the procedures for obtaining the amplification/attenuation rate in each basic constituent circuit are added in the synthesis procedures.

Figure 23:
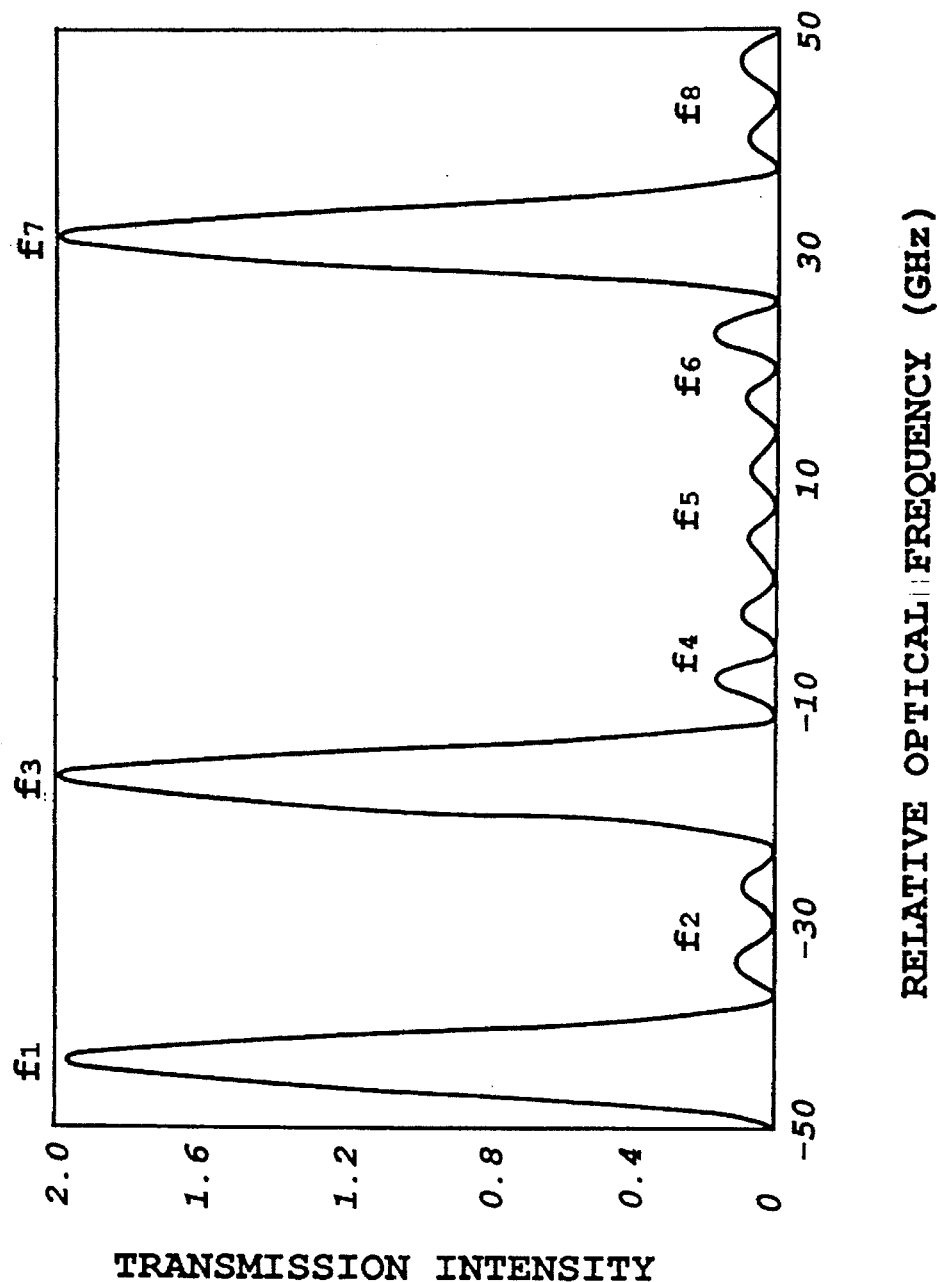
FIG. 23 is a graph showing the transmission characteristics of a frequency selective filter with a maximum transmittance of 200% that has been achieved by the optical signal processor as the fourth embodiment of the present invention.

FIG. 23 shows the results of characteristics measured on a frequency selective filter with a maximum transmittance of 200% of the same specifications as in Example (1-b) that was prepared in accordance with the above-described design procedures. In preparing it, circuit parameters used were those in Example (1-b). The amplification/attenuation rate $\gamma$ in each basic constituent circuit was set at 0.13 dB.

<Embodiment 6>

This embodiment is claims 26–28 put into practice in order to attain the object 4.

Figure 24:
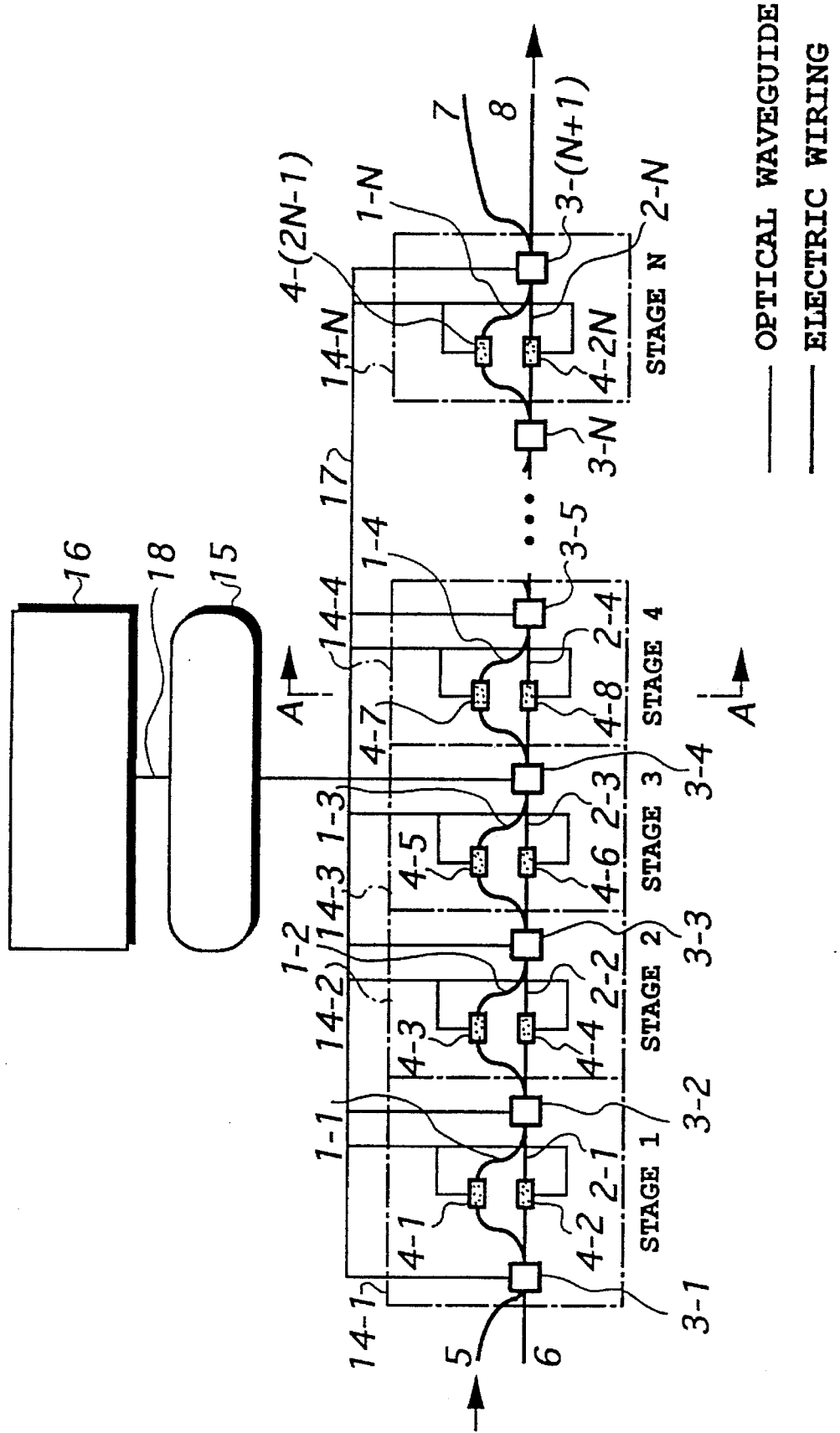
FIG. 24 is a circuit structure diagram of an optical signal processor as a fifth embodiment of the present invention.

In the instant embodiment, a silica-based planar circuit was used, and a phase controller comprising an $LiNbO_3$ crystal relying on an electrooptic effect was used to achieve a high-speed frequency selective switch for optical frequency multiplexing communication. A structural diagram of this embodiment is shown in FIG. 24. The difference from the circuit construction of Embodiment 1 is in the provision of a power control part for controlling electric power to be supplied to directional couplers capable of changing coupling rate and phase controllers, and an operation part for controlling the power control part.

The phase controllers were prepared by forming a groove in the planar circuit stated in Embodiment 1 by a photolithographic technique, and placing $LiNbO_3$ crystals therein. An electrode was placed on the $LiNbO_3$ crystal, and an electrooptic effect was utilized to perform high-speed control of refractive index.

In the instant embodiment, optical signal switching characteristics for taking out an arbitrary signal from an 8-wave FDM signal at a high speed were realized, as in the case of Example (1-b). To perform operation of circuit parameters at the operation part in a real-time manner, the circuit parameters corresponding to the optical signal switching characteristics for taking out signal were obtained from the recurrence formula described in claim 3, formed into database, and stored in the operation part beforehand. In harmony with the ON-OFF switching characteristics, the phase controller using $LiNbO_3$ crystal was driven to actualize a high-speed frequency selective switch. The switching response in this embodiment came to 1 μs or less.

<Embodiment 7>

This embodiment is claims 32 to 34 put into practice in order to attain the object 5. The controlling method is based on claims 38–40.

Generally, an optical circuit carries out filtering by utilizing an interference phenomenon, and does not accommodate temperature changes. In most cases, therefore, a Peltier element or the like is adhered to the substrate in an attempt to curtail changes in external environment. In a place with violent changes in environmental temperature, however, the difficulty in completely suppressing characteristic changes due to temperature changes is expected. In the instant embodiment, part of fluctuating optical output was detected, and feedback control was performed, thereby achieving an optimal filter for minimizing time changes of circuit characteristics associated with temperature changes of the optical circuit.

Figure 25:
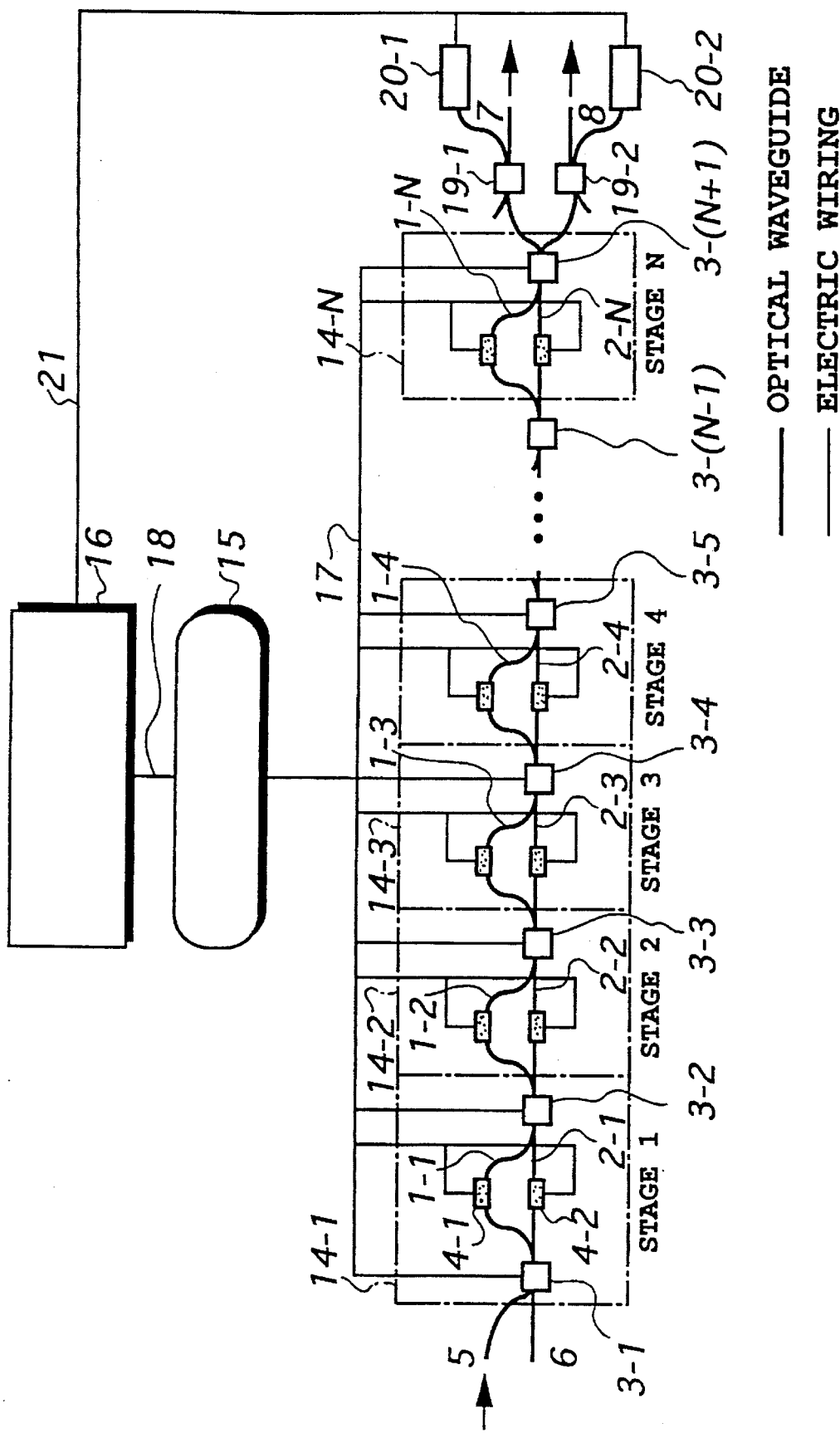
FIG. 25 is a circuit structure diagram of an optical signal processor as a sixth embodiment of the present invention.

A circuit structure of the embodiment is shown in FIG. 25. Major differences from the circuit structure of Embodiment 1 lie in the addition of optical extraction parts 19-1 and 19-2 for branching part of output light, and of detection parts 20-1 and 20-2 for converting the branched optical signal into an electric signal, and the addition of an operation part 16 for feeding back the so converted electric signal and performing feedback control, and of a control part for controlling phase controllers under the control of the operation part 16. The phase controllers to be controlled are phase controllers on waveguides with different optical path lengths constituting an asymmetric Mach-Zehnder interferometer, and phase controllers on waveguides with equal optical path lengths constituting a symmetric Mach-Zehnder interferometer making up a variable directional coupler. According to the instant embodiment, the above construction led to the realization of a highly accurate signal processor which detects part of output light and performs feedback control to estimate the current values of circuit parameters, and change circuit parameters (phase controllers, to be specific) in response to errors from the desired circuit parameters to correct the errors from the desired circuit parameters.

In the instant embodiment, the number of stages of asymmetric Mach-Zehnder interferometers was set at 23 as in the case of Embodiment 1. Also, to make periodic frequency 100 GHz, the delay time of each asymmetric Mach-Zehnder interferometer was set at 0.01 ns. In this embodiment, no high-speed response is required of the phase controller, a heater formed on the waveguide was used as the phase controller, as in the case of Embodiment 1.

Figure 26:
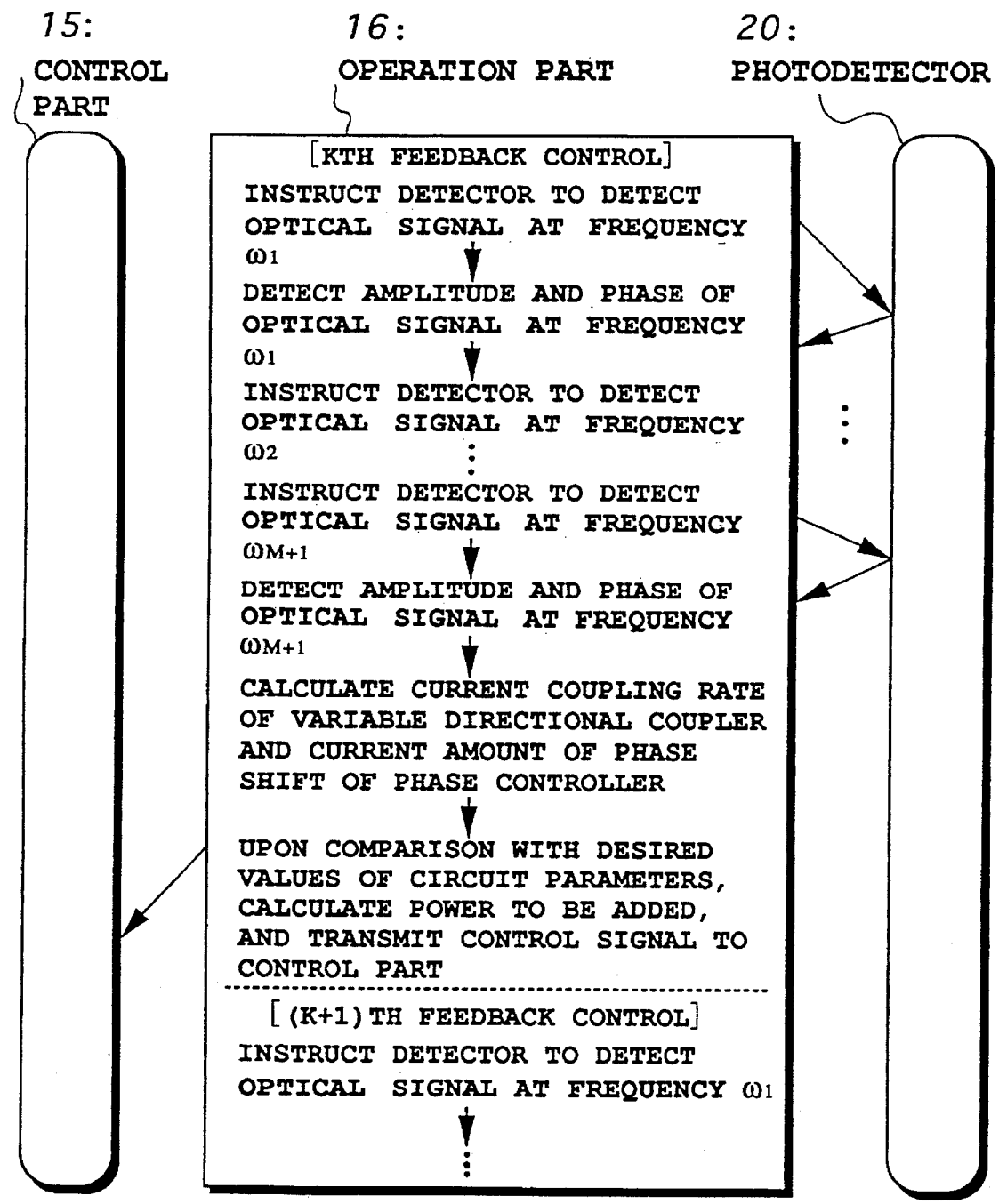
FIG. 26 is a flow chart showing the control procedure for the feedback control of the optical signal processor as the sixth embodiment of the present invention.

Feedback control as illustrated in FIG. 26 was performed by repeating at certain intervals the following two-step procedure:

1) In the detector disposed at the output part, detect the amplitude and phase of optical signal extracted from the optical extraction part at the frequency points $\omega_1, \omega_2, \ldots, \omega_{M+1}$ in accordance with the instruction from the operation part.

2) In the operation part, based on the results of detection in 1), transmit for control a control signal to the control part so that a necessary power is supplied to make the coupling rate of each variable directional coupler and the amount of phase shift of each phase controller close to the desired circuit setting values.

Specifically, in the detection part, the amplitude and phase of equalizer output optical signal were measured at intervals of 2 GHz in the range of from −50 to 50 GHz, and the results were transferred to the operation part. The repeating time of this measurement was 30 seconds. At the operation part 16, the current circuit parameters were calculated on the basis of the results of measurements, and the amount of phase shift of the phase controller was corrected by the power control part 15, in correspondence with the differences from the desired circuit parameters. In the instant embodiment, a program for calculating the current circuit parameters from the amplitude information and phase information of each frequency component was stored in the operation part beforehand.

Figure 27:
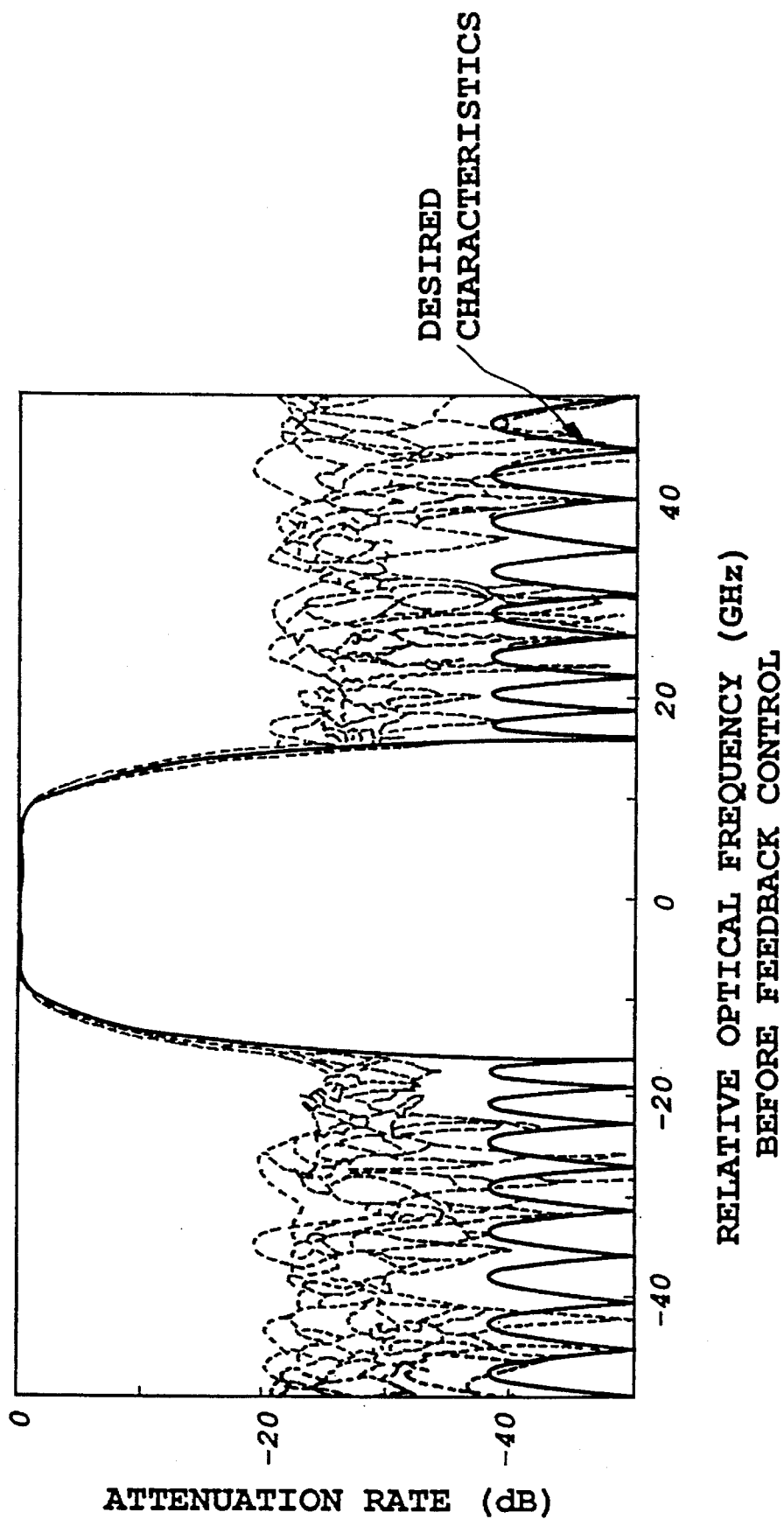
FIG. 27 is a graph showing the filter characteristics, before feedback control, of a Chebyshev filter that has been achieved by the optical signal processor as the sixth embodiment of the present invention.
Figure 28:
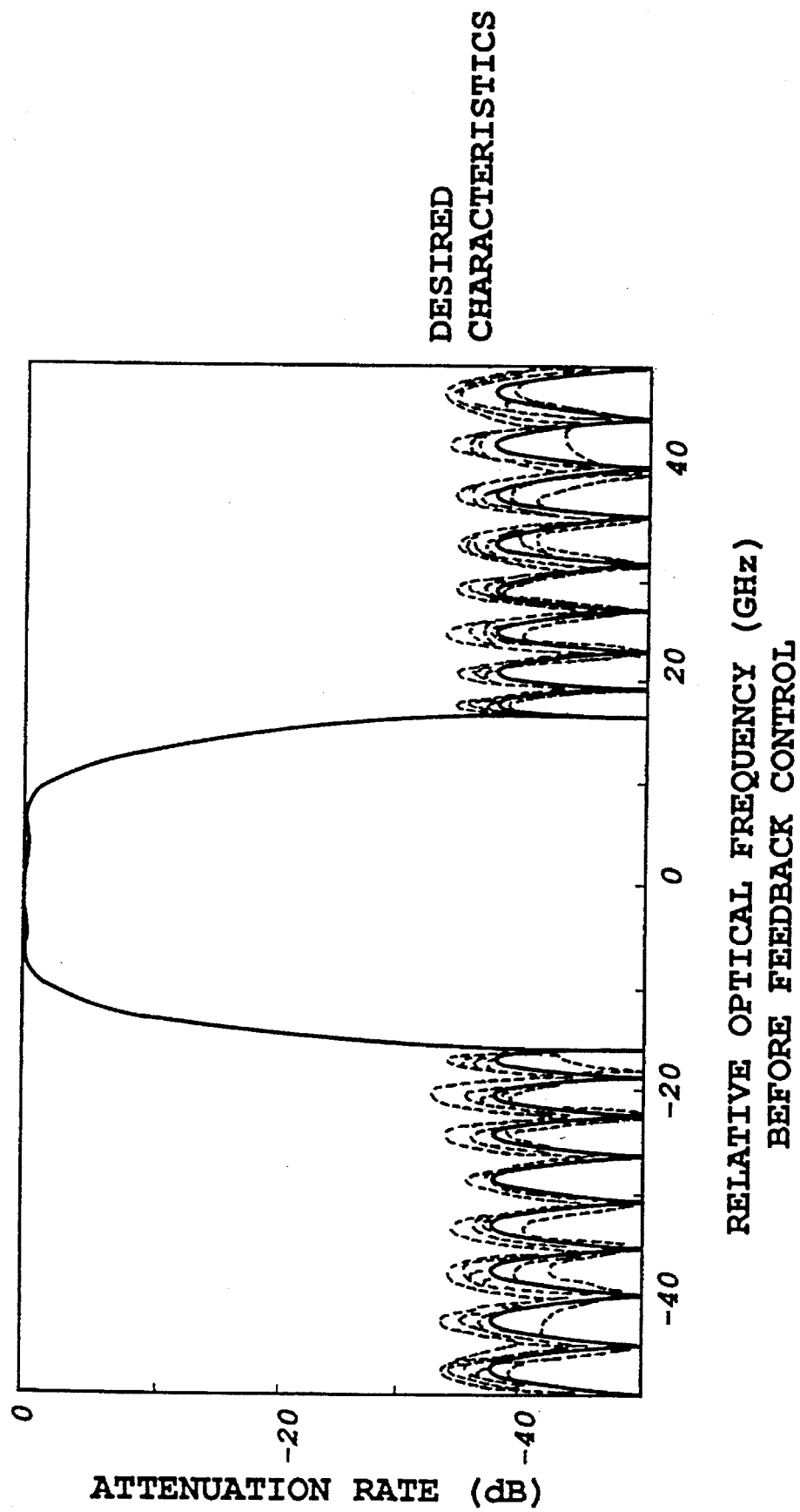
FIG. 28 is a graph showing the filter characteristics, after feedback control, of a Chebyshev filter that has been achieved by the optical signal processor as the sixth embodiment of the present invention.

In the instant embodiment, the linear phase Chebyshev filter of Example (1-a) was prepared actually, and the Peltier element used in Embodiment 1 to eliminate the influence of environmental temperature changes was removed, whereby circuit parameters were intentionally changed, to investigate the improving effect of feedback control on signal processing characteristics. The results are shown in FIGS. 27 and 28. In these drawings, the gray lines represent the results of measurement, at intervals of 30 seconds, of the transmission characteristics of the optical filter prepared, while the solid lines represent the desired filter characteristics. Before improvement, the average attenuation rate in the blocking region of the filter was about −25 dB as shown in FIG. 27, but after feedback control, the average attenuation rate in the blocking region was about −35 dB, an improvement of 10 dB, as shown in FIG. 28. If these results are converted into the improving effect on circuit parameters, the setting error for circuit parameters before improvement was about $0.05\pi$, but after feedback control, the setting error for circuit parameters was improved to $0.005\pi$ or less.

<Embodiment 8>

This embodiment is also claims 35 to 37 put into practice in order to attain the object 5. The controlling method is based on claims 38–40.

Long-distance optical communication poses the problem that the pulse width of propagated pulse broadens because of wavelength dispersion present in the optical fiber. To solve this problem, a wavelength dispersion equalizer was prepared in Example (1-c). However, the equalizer of this example has no characteristic adaptiveness, and thus external disturbances, such as changes in the substantial optical path length associated with the environment temperature of the optical fiber, or changes in oscillation wavelength associated with temperature changes of the semiconductor light source, are imposed on the transmission line. If, as a consequence, the wavelength dispersion characteristics vary over time, the equalizer cannot be used as such. In the present embodiment, a wavelength dispersion adaptive equalizer was prepared which feeds back part of output optical signal as an electric signal, thereby changing the characteristics of the equalizer in response to changes over time in the delay dispersion characteristics of input optical signal, to achieve an always satisfactory dispersion compensation.

The instant embodiment is intended to perform a constant signal processing of an input optical signal with changes over time by detecting part of output light and carrying out feedback control to change circuit parameters (phase controller, to be specific) in accord with input optical signal. This is equivalent to the execution by an optical filter of a function comparable to adaptive processing in digital signal processing. In this sense, this filter is designated hereinbelow as an optical adaptive filter. In order to change the filter characteristics in response to input signal changing over time, as in the adaptive filter, there is required programmability in which arbitrary filter characteristics can be achieved only by varying circuit parameters. In the present invention, this programmability was realized by using the circuit synthesis method shown in Embodiments 1, 3 and 4.

Figure 29:
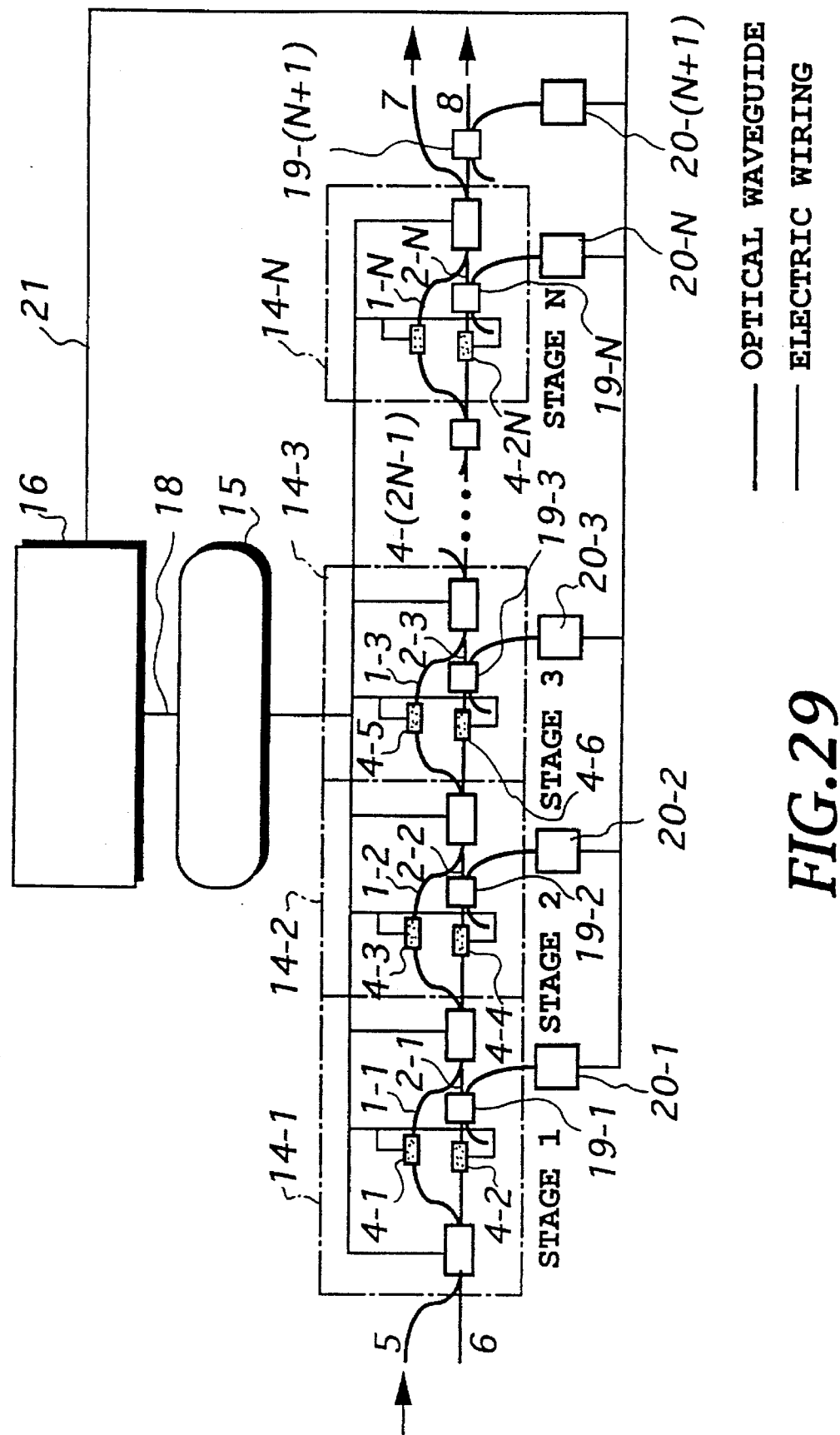
FIG. 29 is a circuit structure diagram of an optical signal processor as a seventh embodiment of the present invention.

A circuit structural diagram is given as FIG. 29. Instead of the construction of Embodiment 6 in which the optical detection part was disposed at the output port, there was employed a construction for feedback control comprising optical extraction parts 19-1, 19-2, 2, ..., 19-(N+1) for extracting part of output optical signal at each asymmetric Mach-Zehnder interferometer portion, and detectors 20-1, 20-2, ..., 20-(N+1) placed behind the respective optical extraction parts. This construction requires more photodetectors than in Embodiment 6, but each optical detection part detects the amplitude and phase of single-frequency components, and transfers the results of detection to the operation part. Thus, the detection time can be shortened compared with Embodiment 6, proving effectiveness when a higher-speed feedback control is necessary.

Figure 30:
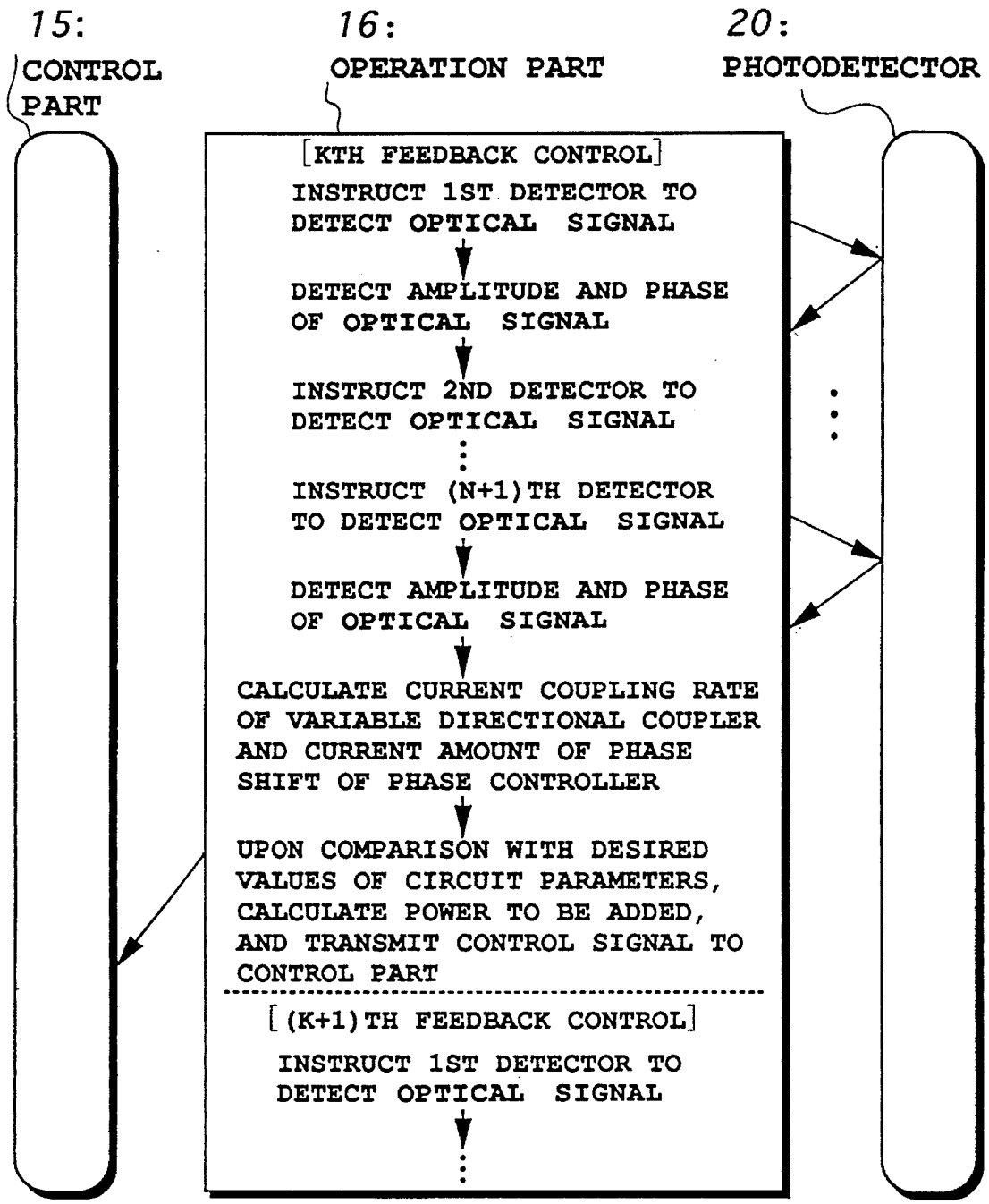
FIG. 30 is a flow chart showing the control procedure for the feedback control of the optical signal processor as the seventh embodiment of the present invention.

Feedback control as illustrated in FIG. 30 was performed by repeating at certain intervals the following two-step procedure:

1) In the detectors disposed at the N+1 sites, detect the amplitude and phase of optical signal extracted from the optical extraction part in accordance with the instruction from the operation part.

2) In the operation part, based on the results of detection in 1), send for control a control signal to the control part so that a necessary power is supplied to make the coupling rate of each variable directional coupler and the amount of phase shift of each phase controller close to the desired circuit setting values. In the instant embodiment, the detection time was set at 1 second.

Figure 31:
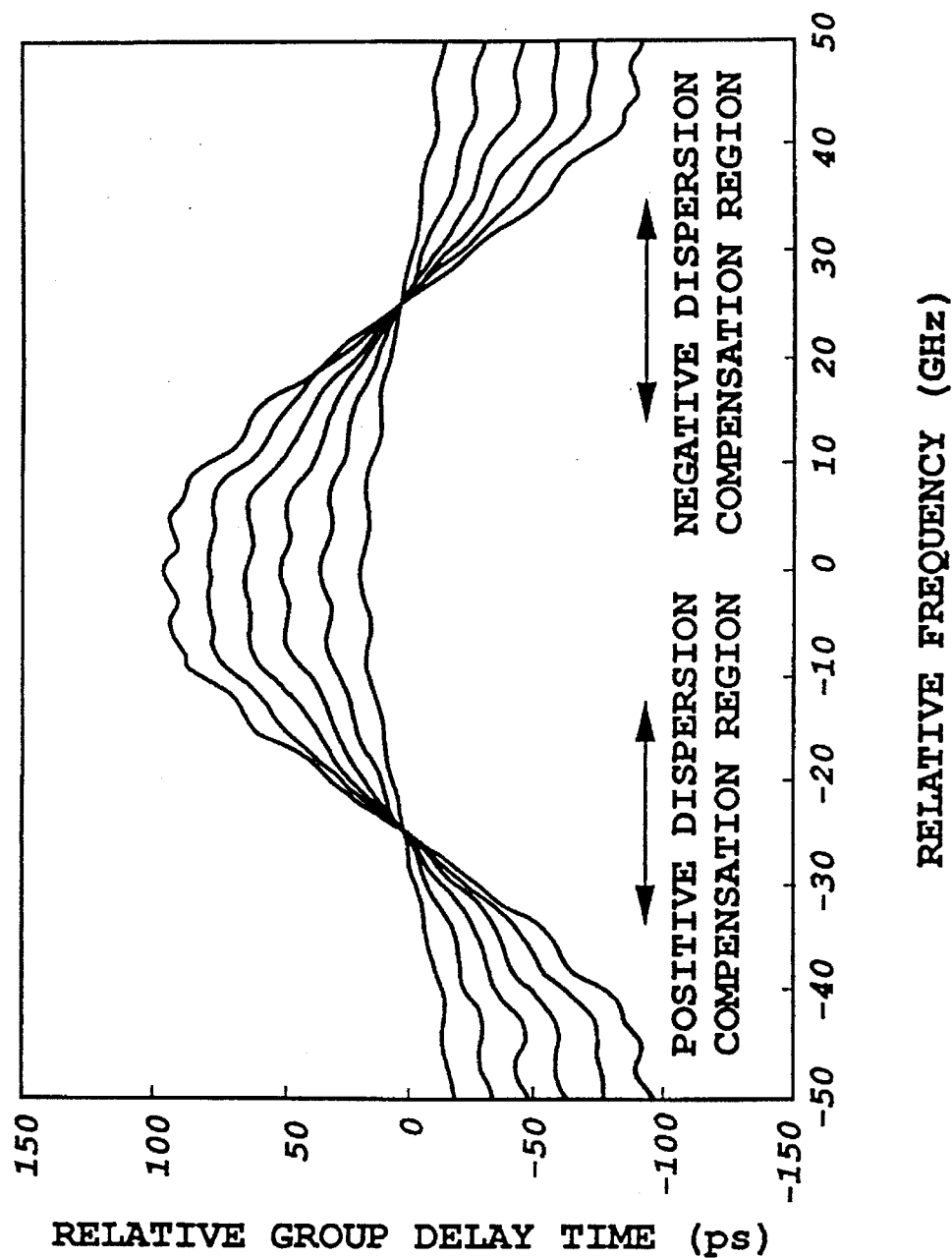
FIG. 31 is a graph showing the simulation of the programmability of an adaptive dispersion equalizer that has been achieved by the optical signal processor as the seventh embodiment of the present invention.
Figure 32:
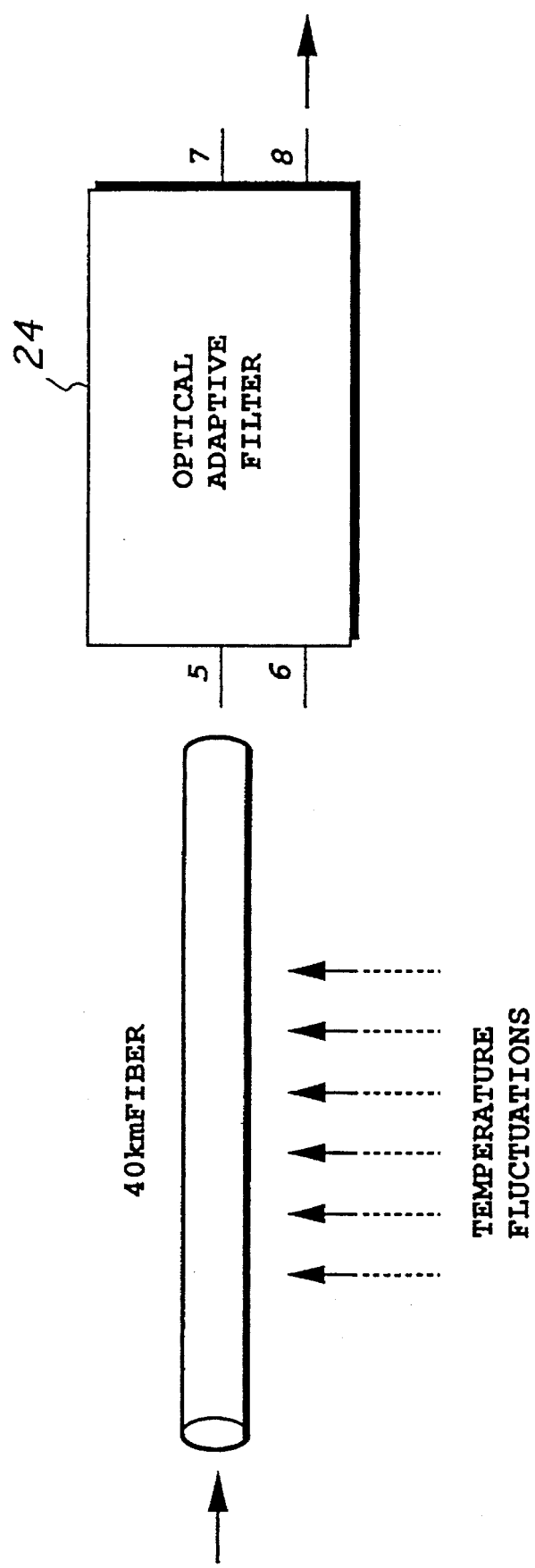
FIG. 32 is an explanatory view for illustrating the adaptiveness of the adaptive dispersion equalizer that has been achieved by the optical signal processor as the seventh embodiment of the present invention.

Using this construction, a wavelength dispersion adaptive equalizer was prepared. The number of stages of asymmetric Mach-Zehnder interferometers was set at 23 as in the case of Embodiment 1. Also, to make periodic frequency 100 GHz, the delay time of each asymmetric Mach-Zehnder interferometer was set at 0.01 ns. In this embodiment, no high-speed response is required of the phase controller, so that a heater formed on the waveguide was used as the phase controller, as in the case of Embodiment 1. The detection part measured the amplitude and phase of equalizer output optical signal;

calculated the amounts of error indicating how much the group delay of optical signal deviates from the fixed value, and the amount of change of center frequency of signal; and transferred the results to the operation part so that feedback control would be done. The operation part 16 minimized the amount of error from the set group delay, calculated the wavelength dispersion equalizing characteristic where center wavelength was present, and had the power control part 15 set circuit parameters. In the instant embodiment, for the purpose of performing real-time control at the operation part, circuit parameter correction data for the amount of error were compiled into database by use of the design methods stated in Embodiment 1, and the database was stored in the operation part. FIG. 31 shows the results of simulation of the equalizing characteristics using some of the circuit parameters formed into database. One will find that the circuit parameters used enable arbitrary amounts of dispersion compensation to be achieved in the range of from 0 to 650 ps/nm.

Figure 33:
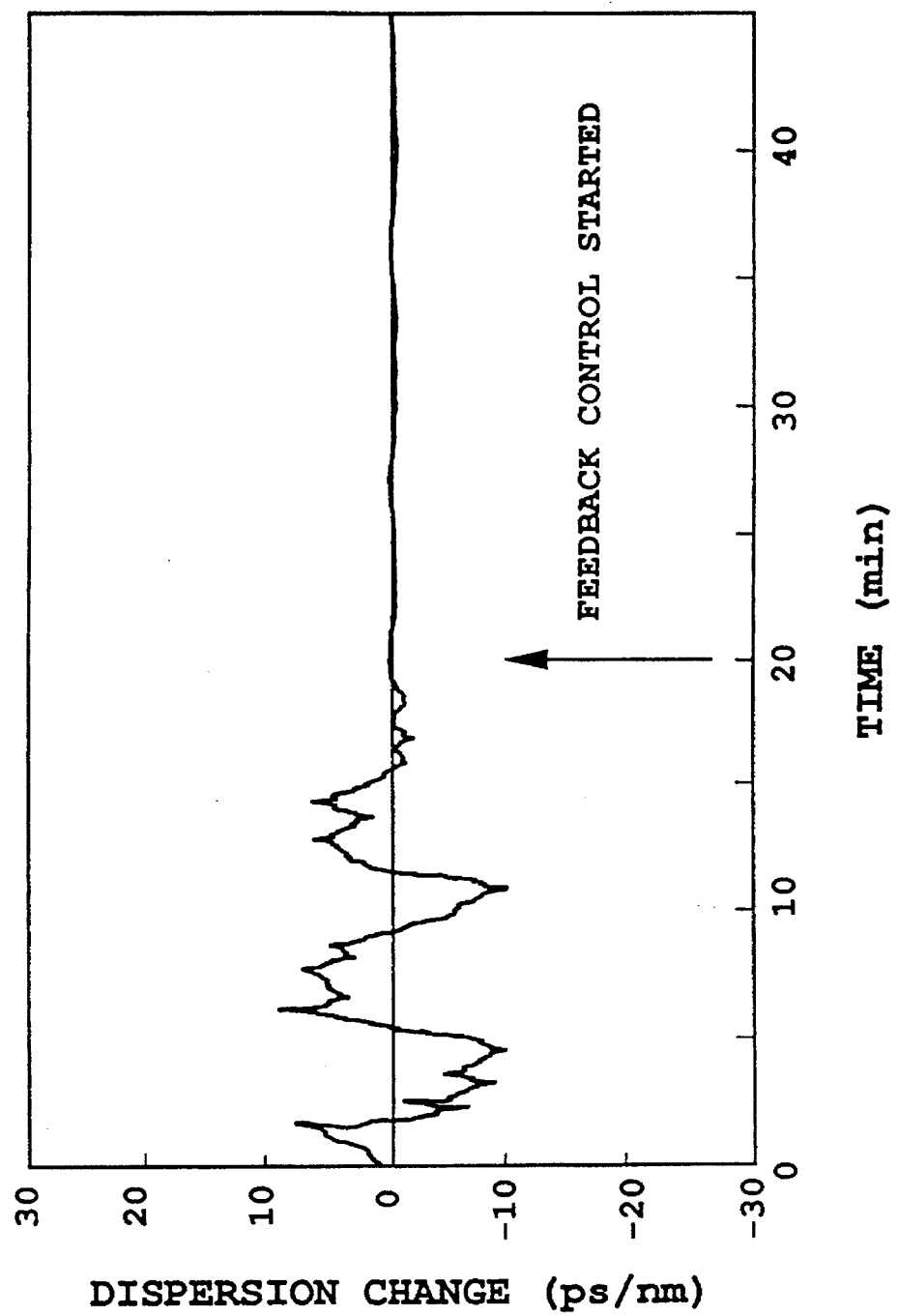
FIG. 33 is a graph showing the adaptiveness of the adaptive dispersion equalizer that has been achieved by the optical signal processor as the seventh embodiment of the present invention.

The actual compensation for wavelength dispersion was performed at a transmission line using 40 km optical fibers. The relevant procedure is shown in FIG. 31, and the results in FIG. 33. The ordinate axis represents the amounts obtained by averaging by the respective frequency components the amounts of error of equalizer output light from the fixed group delay. Before feedback control was applied, a maximum error of 10 ps/nm was present, but after feedback control, the error was kept at 1 ps/nm or less.

<Embodiment 9>

This embodiment is also claims 32 to 34 put into practice in order to attain the object 5. The controlling method is based on claims 44–46.

Figure 34:
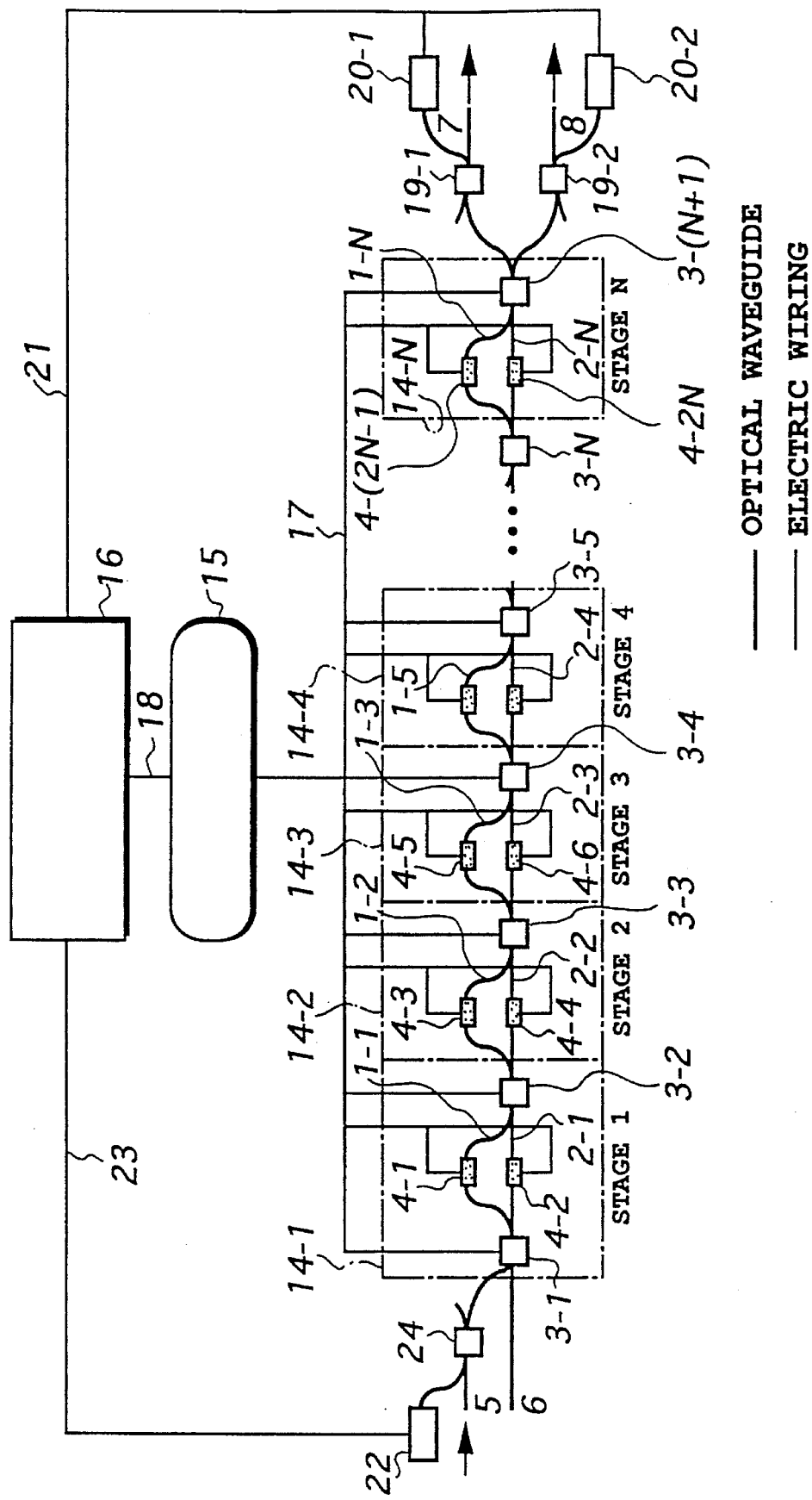
FIG. 34 is a circuit structure diagram of an optical signal processor as an eighth embodiment of the present invention.

In the instant embodiment shown in FIG. 34, in order to curb changes in output characteristics over time, there was a construction comprising, in addition to the structure of Embodiment 6, a frequency-variable light source 22 for reference light, and an insertion part 24 placed on an input port 5 for inserting reference light. Feedback control was performed, and the same measurements as in Embodiment 6 were performed.

Reference light used here was light of a different wavelength band from the wavelength band of optical signal. Specifically, a wavelength band of 1.3 µm was employed for reference light, compared with that of 1.55 µm for optical signal. At the optical extraction part, a directional coupler having a amplitude coupling rate of 100% at 1.3 µm and a amplitude coupling rate of 0 at 1.55 µm was used to separate optical signal and reference light. As the light source for reference light, a multi-electrode DFB laser oscillating at 1.3 µm was used, and frequency was controlled by current control.

Figure 35:
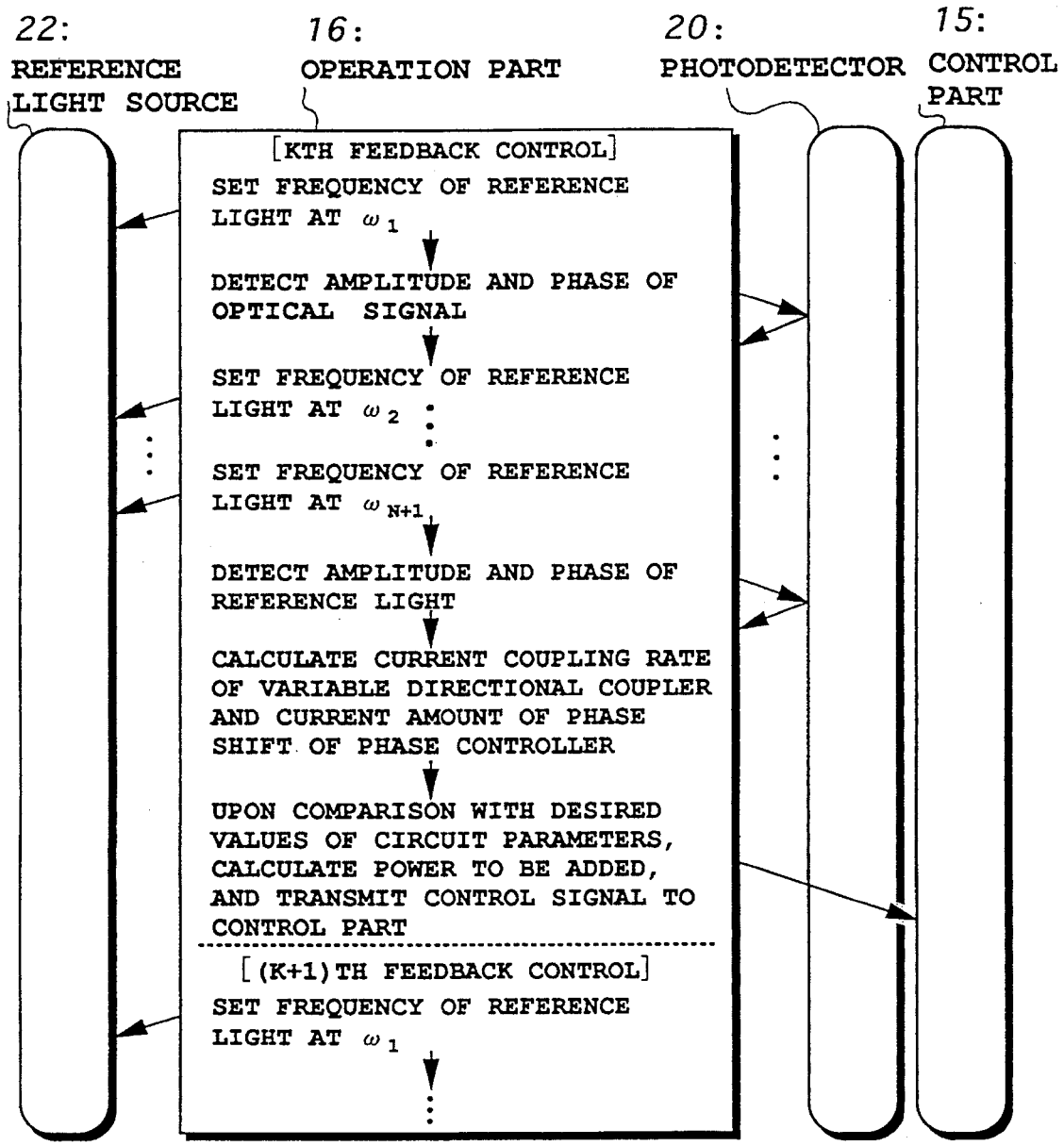
FIG. 35 is a flow chart showing the control procedure for the feedback control of the optical signal processor as the eighth embodiment of the present invention.

Feedback control as illustrated in FIG. 35 was performed by repeating at certain intervals the following two-step procedure:

1) Repeat the procedure of having the operation part control the light source for reference light and set the frequency of reference light, and having the detector disposed at each output port detect reference light extracted from the optical extraction part to detect the amplitude and phase of reference light at each extraction point, M+1 times for different frequencies of reference light, $\omega_1, \omega_2, \ldots, \omega_{M+1}$.

2) At the operation part, based on the results of detection for reference light at the frequency points at the M+1 sites, transmit for control a control signal to the control part so that a necessary power is supplied to make the coupling rate of each variable directional coupler and the amount of phase shift of each phase controller close to the desired circuit setting values. Specifically, the wavelength of light from the light source for reference light was varied at intervals of 0.5 GHz in the range of from −10 to 10 GHz by adjusting injection current at 1.3 µm; the amplitude and phase of reference light with each wavelength were measured; and the results were transferred to the operation part. The repeating time of this measurement was 30 seconds. As a result, more stable characteristics than in Embodiment 6 were obtained. This may be attributed to the feature of the instant embodiment that the feedback control of filter characteristics can be performed constantly regardless of the presence or absence of optical signal.

In the instant embodiment, the arrangement of the optical extraction part stated in claims 32 to 34 was adopted, but it is also possible to execute the embodiment with a construction having the optical extraction part disposed for each asymmetric Mach-Zehnder interferometer of claims 35 to 37. This alternative manner is advantageous in that since there are a plurality of detection points, plenty of information is obtained, and since there is no need to ensure the amount of information by using frequency, a light source oscillating at a fixed wavelength can be used as the light source for reference light.

<Embodiment 10>

Figure 36:
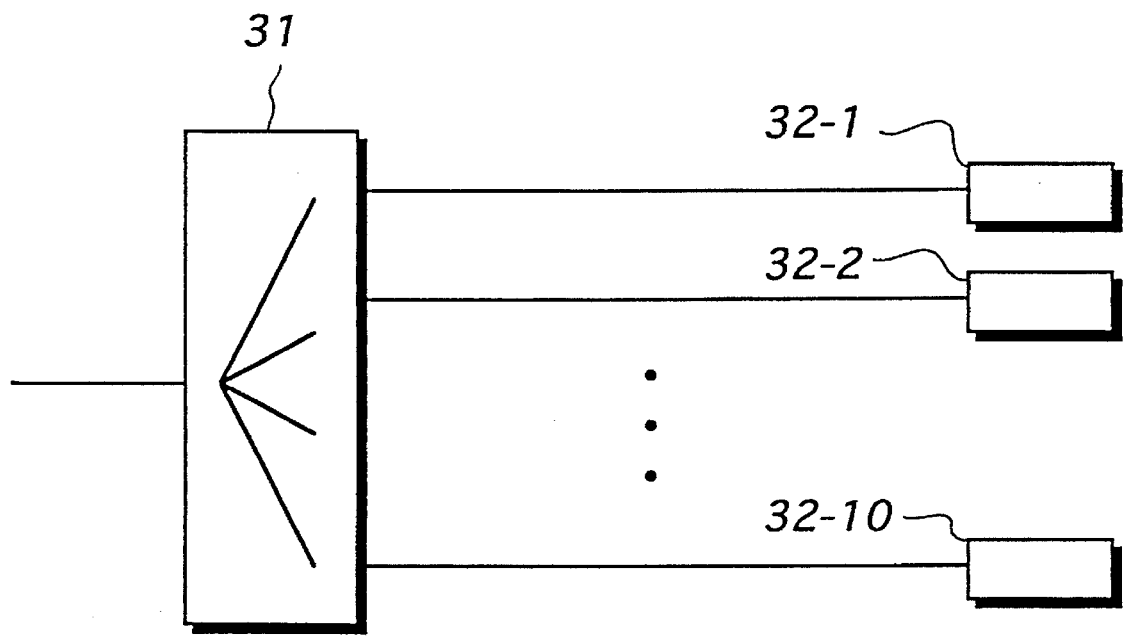
FIG. 36 is a circuit structure diagram showing a ninth embodiment of an optical signal processor relevant to the present invention.
Figure 37:
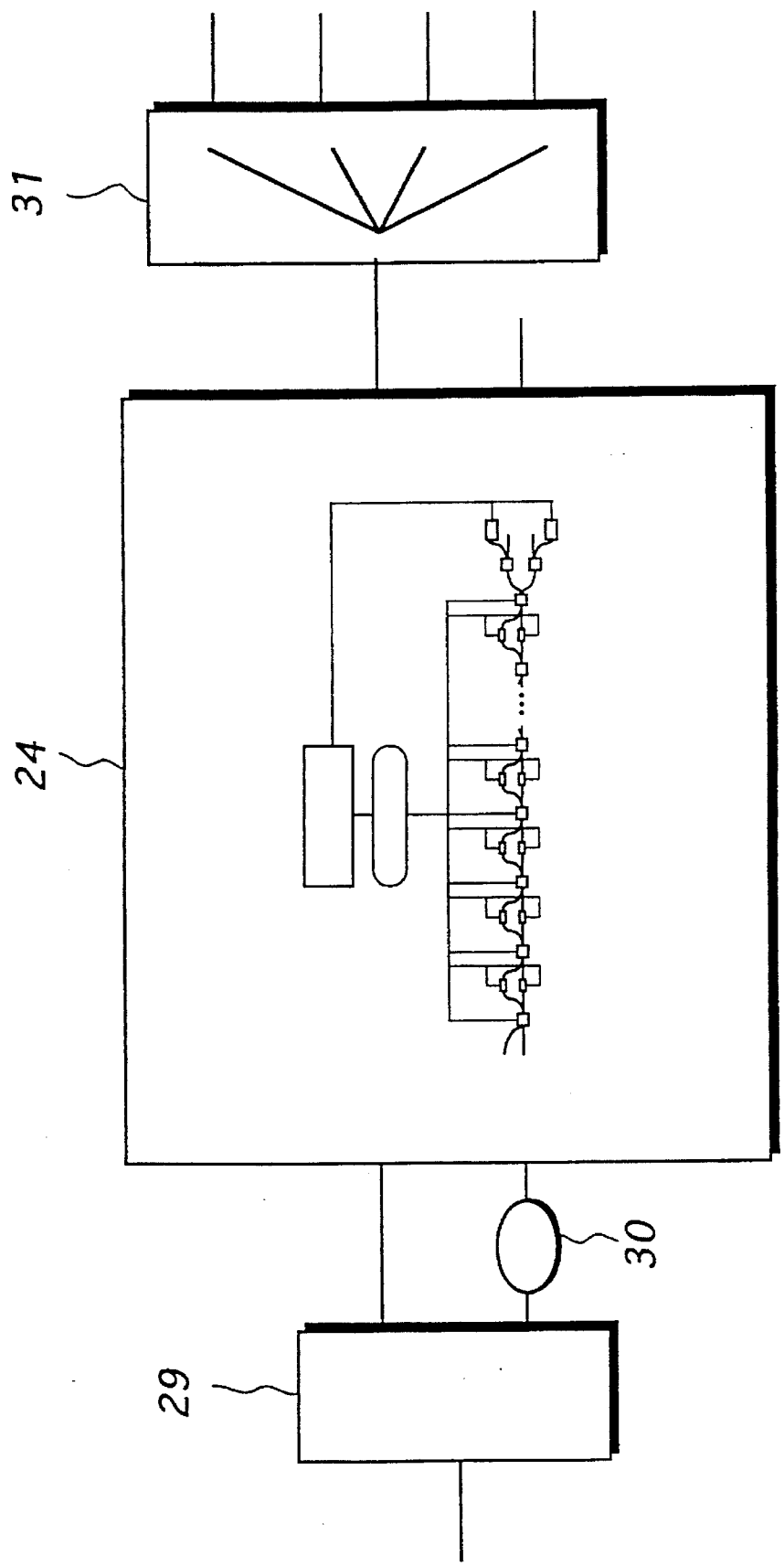
FIG. 37 is another circuit structure diagram showing a second embodiment of the optical signal processor relevant to the present invention.

This is an embodiment in which a polarization equalizer for equalizing changes in polarization over time that occur during long-distance optical communication was realized by the optical signal processor of the present invention. Long-distance optical communication, especially coherent optical frequency multiplexing communication, has posed the problem of polarization changes at each channel. To solve this problem, as shown in FIG. 36, there has been adopted a method in which optical signal is split into respective channels, and polarization changes are removed by polarization diversity photodetectors mounted for the respective channels. With this method, there was need to mount expensive polarization diversity photodetectors for the respective channels, resulting in high costs of the entire system. The instant embodiment is a realization of a system by which polarizations differing according to channel are equalized collectively by a single optical signal processor before the signal is split into the different channels. FIG. 37 shows the structure of a polarization equalizer according to the instant embodiment. Basically, an adaptive equalizer was constructed with the structure involving feedback control of Embodiment 6. In front of an optical signal processor was placed a polarization separator for separating optical signal into a TE mode component and a TM mode component. TM mode was converted into TE mode by use of a halfwave plate, and the respective components were injected into two input ports of the optical signal processor. This converts the time change of polarization into the time change of input power for the two input ports of the optical signal processor. In the instant embodiment, in order to reduce loss, the polarization separator and the halfwave plate were formed on the same planar optical circuit as the optical signal processor by forming a stress release groove on one of the waveguides (M. Kawachi: "Silica waveguides on silicon and their application to integrated-optic components", Optical and Quantum Electronics, 22, pp. 391–416, 1990).

The instant embodiment handled 10-channel frequency multiplexed optical signal with a channel frequency interval period of 10 GHz. To accommodate the 10 channels, the number of stages of asymmetric Mach-Zehnder interferometers was set at 9. To accommodate the channel frequency interval period of 10 GHz, the delay time of each asymmetric Mach-Zehnder interferometer was set at 0.1 ns. Generally, the time change of polarization is a considerably slow one expressed as minutes. In this embodiment, therefore, a heater formed on the waveguide was used as a phase controller, as in Embodiment 6.

Hereinbelow will be described an adaptive equalization control method employed in the instant embodiment for polarization changes over time. This method was performed by repeating at certain time intervals the following two-step procedure:

1) In the detector disposed at the output part, detect the amplitude and phase of optical signal extracted from the optical extraction part at the channel frequency points $\omega_1$, $\omega_2$, ..., $\omega_{10}$ in accordance with the instruction from the operation part.

2) In the operation part, based on the results of detection in 1), transmit for control a control signal to the control part so that a necessary power is supplied to correct the coupling rate of each variable directional coupler and the amount of phase shift of each phase controller so that all optical signal can be always fed to the output port 1, regardless of changes in input power supplied to the input port.

Specifically, in the detection part, the amplitude and phase of equalizer output optical signal were measured at intervals of 10 GHz in the range of from −50 to 50 GHz, and the results were transferred to the operation part. The repeating time of this measurement was 1 minute. At the operation part 16, the current circuit parameters were calculated on the basis of the results of measurements, and the amount of phase shift of the phase controllers was corrected by the power control part 15 so that all optical signal would be emitted through the output port 1. In the instant embodiment, a recurrence formula for calculating the current circuit parameters from the amplitude and phase information on each frequency component was stored in the operation part beforehand. Upon implementation of the instant embodiment, it was confirmed that the time change of polarization could be kept at 1% or less.

<Embodiment 11>

This embodiment is the production of an optical signal processor according to the present invention by the method including a parameter adjusting step as described in claims 53 to 54. The optical signal processor of this embodiment was prepared by using a silicon substrate as a substrate, using a silica-based thin film as a waveguide, and using as a phase controller a chromium heater formed on a silica-based thin film. The outline of the production procedure is shown in FIGS. 38A to 38H. This method is basically a combination of flame deposition and lithography.

[Production step 1]

Using the design method stated in claims 47 to 50, obtain unknown circuit parameters, i.e. the angular representation $\theta_n$ (−π/2 to π/2) of the coupling rate of the directional coupler, and amount of phase shift $\phi_n$ (−π to π) of the phase controller, designed for realizing the desired signal processing characteristics. Recalculate these values, $\theta_n$ (−π/2 to π/2) and $\phi_n$ (−π to π), as concrete circuit parameters for actualizing an optical circuit, such as core size, intercore distance of the coupling portion of the directional coupler, coupling length, size of heater forming the phase controller, and current applied to heater (FIG. 38A).

[Production step 2]

In agreement with the parameter values obtained in Production step 1, perform a flame hydrolysis reaction of silicon tetrachloride, the material of glass, in mixture with oxygen, to deposit a layer of fine glass particles as a buffer layer on the Si substrate. On top of the layer, perform a flame hydrolysis reaction of silicon tetrachloride incorporating a doping material to deposit a layer of fine glass particles serving as a core (FIG. 38B).

[Production step 3]

Sinter the system at a temperature of 1000° C. or more in an electric furnace to turn the layer of fine glass particles into a transparent glass layer (FIG. 38C).

[Production step 4]

Coat a resist material only on that portion obtained in the design step that will become the core. Perform chemically reactive ion etching to remove the unnecessary portion other than the core portion (FIG. 38D).

[Production step 5]

Figure 38E:
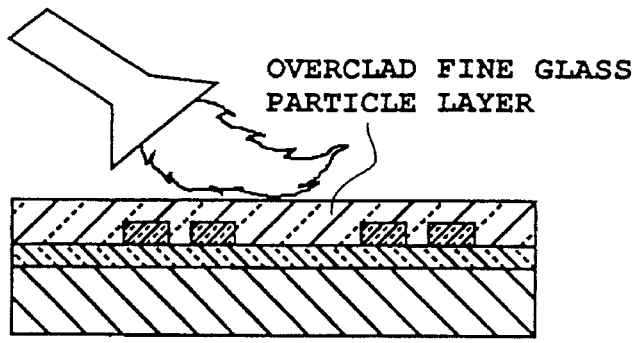
FIG. 38E is an explanatory view of Step 5 of the method of producing an optical signal processor described in Embodiment 10 of the present invention.

Similarly to Production step 2, deposit a layer of fine glass particles which will serve as an overclad (FIG. 38E).

[Production step 6]

Figure 38F:
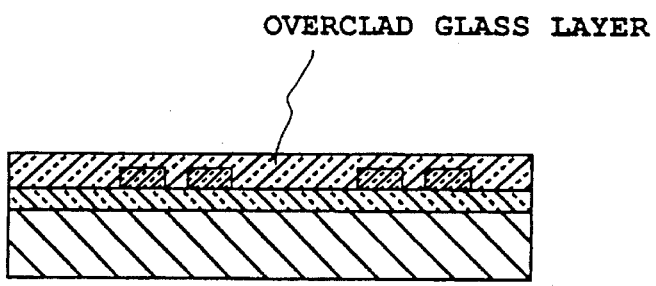
FIG. 38F is an explanatory view of Step 6 of the method of producing an optical signal processor described in Embodiment 10 of the present invention.

Similarly to Production step 3, form glass in an electric furnace (FIG. 38F).

[Production step 7]

Figure 38G:
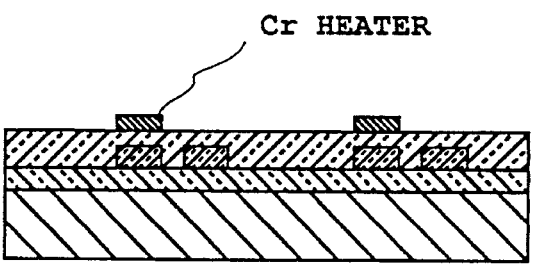
FIG. 38G is an explanatory view of Step 7 of the method of producing an optical signal processor described in Embodiment 10 of the present invention.

Form on a waveguide a chromium heater which will serve as a phase controller (FIG. 38G).

[Production step 8]

Figure 38H:
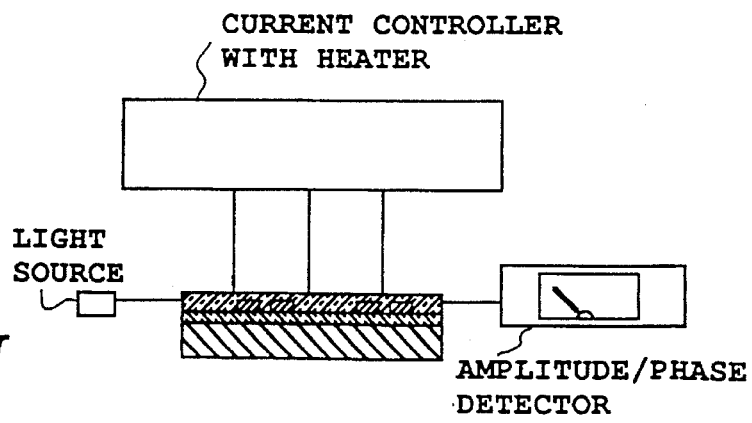
FIG. 38H is an explanatory view of Step 8 of the method of producing an optical signal processor described in Embodiment 10 of the present invention.

In accordance with the procedure stated in claim 27, repeatedly adjust the amount of phase shift of the phase controller so that there will be the desired circuit parameters (FIG. 38H)

In the instant embodiment, it was confirmed that the adjustment of the amount of phase shift in Production step 8 repeated 5 times could keep the error of the set amount of phase shift from the desired value down to 0.02 π.

<Embodiment 12>

This embodiment is the production of an optical signal processor according to the present invention by the method including a polarization trimming step as described in claims 57 and 58. The optical signal processor of this embodiment was prepared by using a silicon substrate as a substrate, using a silica-based thin film as a waveguide, and using as a phase controller a chromium heater formed on a silica-based thin film. The outline of the production procedure is shown in FIGS. 39A to 39I. This method is basically a combination of flame deposition and lithography. An amorphous silicon film was used as a stress imparting film.

[Production step 1]

Figure 39A:
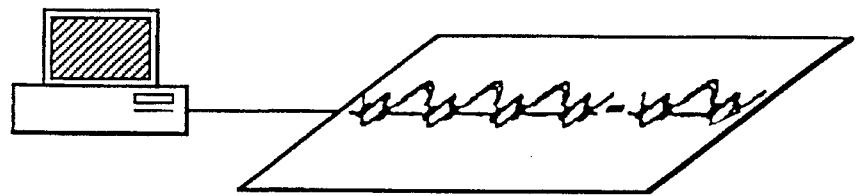
FIG. 39A is an explanatory view of Step 1 of the method of producing an optical signal processor described in Embodiment 11 of the present invention.

Using the design method stated in claims 47 to 50, obtain unknown circuit parameters, i.e. the angular representation $\theta_n$ (−π/2 to π/2) of the coupling rate of the directional coupler, and amount of phase shift $\phi_n$ (−π to π) of the phase controller, designed for realizing the desired signal processing characteristics. Recalculate these values, $\theta_n$ (−π/2 to π/2) and $\phi_n$ (−π to π), as concrete circuit parameters for actualizing an optical circuit, such as core size, intercore distance of the coupling portion of the directional coupler, coupling length, size of heater forming the phase controller, and current applied to heater (FIG. 39A).

[Production step 2]

Figure 39B:
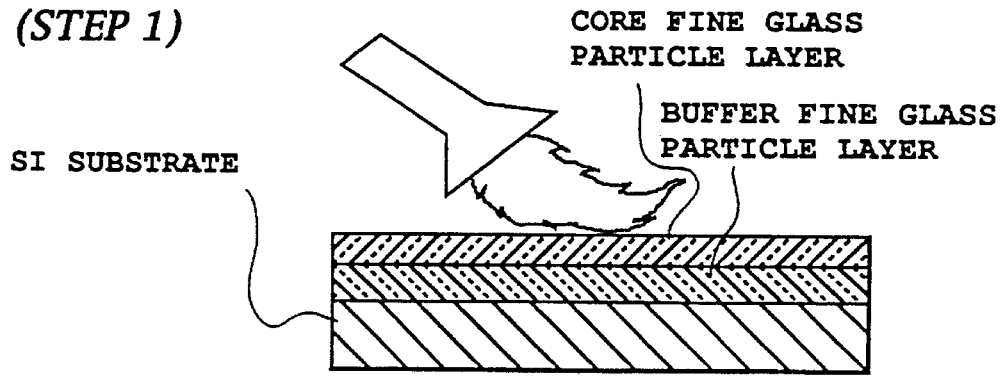
FIG. 39B is an explanatory view of Step 2 of the method of producing an optical signal processor described in Embodiment 11 of the present invention.

In agreement with the parameter values obtained in Production step 1, perform a flame hydrolysis reaction of silicon tetrachloride, the material of glass, in mixture with oxygen, to deposit a layer of fine glass particles as a buffer layer on the Si substrate. On top of the layer, perform a flame hydrolysis reaction of silicon tetrachloride incorporating a doping material to deposit a layer of fine glass particles serving as a core (FIG. 39B).

[Production step 3]

Figure 39C:
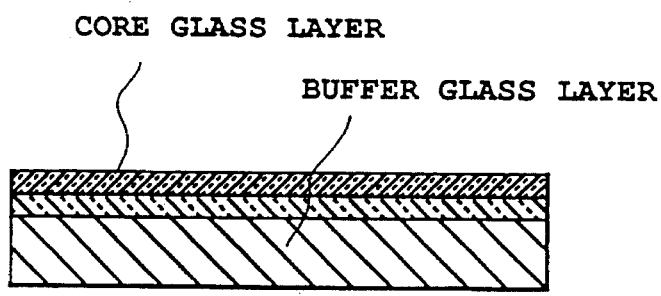
FIG. 39C is an explanatory view of Step 3 of the method of producing an optical signal processor described in Embodiment 11 of the present invention.

Sinter the system at a temperature of 1000° C. or more in an electric furnace to turn the layer of fine glass particles into a transparent glass layer (FIG. 39C).

[Production step 4]

Figure 39D:
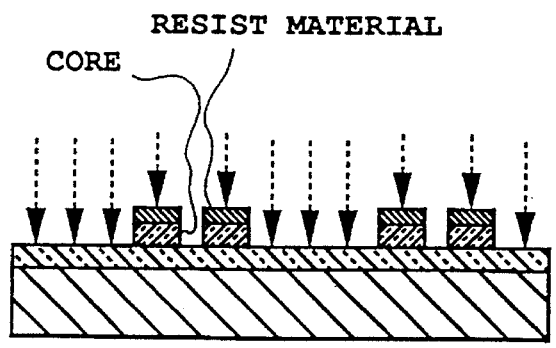
FIG. 39D is an explanatory view of Step 4 of the method of producing an optical signal processor described in Embodiment 11 of the present invention.

Coat a resist material only on that portion obtained in the design step that will become the core. Perform chemically reactive ion etching to remove the unnecessary portion other than the core portion (FIG. 39D).

[Production step 5]

Similarly to Production step 2, deposit a layer of fine glass particles which will serve as an overclad (FIG. 39E).

[Production step 6]

Similarly to Production step 3, form glass in an electric furnace (FIG. 39F).

[Production step 7]

Form on a waveguide a chromium heater which will serve as a phase controller (FIG. 39G).

[Production step 8]

Vacuum deposit an amorphous silicon film as a stress imparting film on each waveguide along the waveguides (FIG. 39H).

[Production step 9]

In accordance with the procedure stated in claim 29, remove the stress imparting film made of an amorphous silicon film by irradiating YAG laser light so that polarization dependency will be eliminated (FIG. 39I)

In the instant embodiment, it was confirmed that the polarization dependency was kept down to 1% or less.

The construction and actions of the present invention have been described above with reference to the Embodiments, but the invention is in no way limited to these Embodiments. For example, a silica-based planar optical circuit was used in the invention, but the planar circuit may be formed of other material, such as a semiconductor of an InGaAsP type or the like, an electrooptic material including $LiNbO_3$ or the like, or an organooptic material. Instead of the planar circuit, an optical fiber may also be used. In the instant embodiments, a thermooptic effect and an electrooptic effect were used to perform phase control. However, methods of phase control may be other ones utilizing physical phenomena, e.g. nonlinear optical effect and magnetooptic effect typified by the Kerr effect. In the Embodiments, the InGaAsP gate was used as an amplifying/attenuating device for amplifying or attenuating optical signal, but the amplifying/attenuating device may be constructed of other optical semiconductor such as InP or an Er-doped waveguide. As noted above, the present invention concerns a circuit synthesis method for providing circuit structures representing how to combine elements, and providing the desired filter characteristics to calculate circuit parameters, and has no restrictions on the physical means of actualizing the circuit. The circuit parameters mentioned in the Embodiments were nothing but one of the design examples, and it is worth mentioning that the invention is not restricted by their values.

Furthermore, the present invention is characterized by a construction in which two optical waveguides at N sites interposed between N+1 variable directional couplers have their constant optical path differences. The waveguide construction concerning whether that one of these two optical waveguides which has a larger optical path length should be placed on one side of the waveguides or not, does not restrict the present invention. This is because, filters of various waveguide constructions can be achieved by varying appropriately the coupling rate of the variable directional couplers, as illustrated in the Embodiments.

The present invention concerns circuit structures representing how to combine elements, the construction of a controlling system for them, and the procedures for design and feedback control of circuit parameters for each circuit. The method of feedback control in the Embodiments focuses on withdrawing part of light propagating through the circuit, detecting its amplitude and phase, and utilizing the results for feedback control. It is not restricted by the number of optical extraction parts, the place of extraction, the number of frequencies to be detected, or the method of separating reference light and optical signal.

What is characteristic of the claims of the present invention is to claim, in addition to the circuit structures, recurrence formulae for calculating circuit parameters. When the desired characteristics are to be realized actually, there is absolute need for equations for calculating circuit parameters which enable the desired characteristics to be realized. In the present invention, the coupling rates of N+1 variable directional couplers capable of changing coupling rates, the amounts of phase shift of N phase controllers, and the values of amplification and attenuation of amplifying/attenuating devices or of optical waveguides capable of amplification or attenuation—the circuit parameters for the claimed circuit constructions—are found on the basis of the recurrence formulae stated in the Embodiments. Finding such numerous circuit parameters on a trial-and-error basis is virtually impossible. Even if one tries to obtain the circuit parameters by computer-assisted sequential approximation, one will hardly be able to obtain optimal circuit parameters. The recurrence formulae used in the present invention that give the circuit parameters are unique to the present invention. Their feature lies in the fact that unlike sequential approximate methods, they are capable of finding optimal circuit parameters by a limited number of calculations.

Even if a patent having similar circuit structures to those in the present invention existed, we would assert that the present invention can be distinguished from other patents because of the presence of the circuit parameter values calculated based on the recurrence formulae unique to the present invention. Concretely, the various frequency filters and adaptive signal processors stated in the Embodiments are those that cannot be obtained without the use of the circuit parameter values calculated based on the recurrence formulae unique to the present invention. Even in the presence of similar circuit structures, one will be able to distinguish the present invention from other patents by comparing the Embodiments described in both.

As described above, the optical signal processor of the present invention adopts the circuit structures mentioned in the claims, and the design and production methods stated in the claims for realizing arbitrary signal processing characteristics, thereby enabling an arbitrary filtering treatment with a maximum transmittance of 100% that has so far not been actualized. In particular, the present invention possesses the excellent feature that maximum transmittance can be designed always to be 100%, even if the number of stages of asymmetric Mach-Zehnder interferometers is increased in order to raise the accuracy of transmission characteristics. By using variable directional couplers with positive and negative amplitude coupling rates whose coupling rates can be selected freely, and using as circuit constituent elements phase controllers capable of giving arbitrary phase shifts, the invention has one more great feature that arbitrary filter characteristics can be realized with the same filter circuit. The invention is also able to achieve an optical signal processor with an arbitrary maximum transmittance by using an amplifying/attenuating device or a waveguide capable of amplification or attenuation. Compared with a conventional transversal type optical signal processor, the invention can decrease the number of variable directional couplers. Take, for instance, an improved transversal type one, the second conventional example. The improved transversal type one of an N-stage construction requires 2×N variable directional couplers. If a similar N-stage structure is achieved by the optical signal processor of the present invention, by contrast, the necessary number of variable directional couplers is N+1. This effect of reducing the number of variable directional couplers is greater as the number of stages, N, increases. Thus, the present invention has the feature of being able to decrease the number of elements, in comparison with the conventional type, and can contribute to the miniaturization of the circuit, and the decrease in production costs. The invention also makes it possible to construct an optical filter of the same function as an adaptive filer, well known in the digital filter field, by detecting part of output light, converting it into an electric signal, and performing the feedback control of circuit parameters on the basis of the detected electric signal in accordance with the feedback control method stated in the claims. The adaptive filter refers to a filter which performs certain functions by feedback controlling circuit parameters with respect to input signal changing over time. As an example for it, there was shown a wavelength dispersion adaptive equalizer prepared in Embodiment 8 for correcting wavelength dispersion for optical signal propagating through optical fibers involving wavelength dispersion changing over time. In addition, the invention can achieve a noise cancellar for eliminating input signal noises changing over time, an echo canceller, an adaptive line spectrum highlighting device for detecting a low-level sine-wave component in input optical signal, and an adaptive notch filter having opposite characteristics.

As noted above, the optical signal processor of the present invention having excellent features enables universal optical signal processing in the advanced information processing field such as frequency multiplex communication requiring broad-band characteristics at a high speed.

The present invention has been described in detail with respect to preferred embodiments, and it will now be that changes and modifications may be made without departing from the invention in its broader aspects, and it is the intention, therefore, in the appended claims to cover all such changes and modifications as fall within the true spirit of the invention.

What is claimed is:

1. An N stage optical signal processor, the N stages being coupled in series such that the output of one stage provides the input to a next stage, each of the N stages comprising:

two optical waveguides;

a variable directional coupler, having an amplitude coupling rate which may range between a positive and negative amplitude coupling rate, which couples together the two optical waveguides at the output of the respective stage and which couples the respective stage to the two optical waveguides of a next stage, wherein an optical path difference of the two optical waveguides in each of the N stages is the same optical path difference; and at least one phase controller for applying a desired phase shift provided on at least one optical waveguide of the two optical waveguides;

wherein a first stage of the N stage optical signal processor further comprises a further variable directional coupler which couples an input of the optical signal processor to the two optical waveguides of the first stage; and wherein the variable directional coupler of the Nth stage provides an output of the optical signal processor.

2. An optical signal processor as claimed in claim 1, wherein the variable directional couplers each comprise:

two 3 dB directional couplers, having amplitude coupling rates which may range between positive and negative amplitude coupling rates;

two optical waveguides interposed between the two 3 dB directional couplers, having one of:
 the same optical path length as each other, and
 an optical path difference of a half-wave length from each other; and a phase controller for applying a desired phase shift is provided on at least one optical waveguide of the two optical waveguides interposed between the two 3 dB directional couplers.

3. An optical signal processor as claimed in claim 1, wherein for each of the N stages, both of the two optical waveguides at least one site are further provided with amplifying/attenuating devices having the same amplification/attenuation value.

4. An optical signal processor as claimed in claim 3, wherein the angular representation θn (−π/2 to π/2) of the coupling rate of the directional couplers and the amount of phase shift φn (−π to π) of the N phase controllers are calculated and set based on the recurrence formula mentioned below, and the power amplification/attenuation value Yk of the amplifying/attenuation devices provided on the two waveguides is set such that $$\kappa = \sum_{k=1}^{K} \gamma k$$

the power amplification/attenuation value of the entire circuit, and K is the number of the stages where the amplifying/attenuating devices are provided) is fulfilled $$\left\{ \begin{array}{l} \theta_n = \tan^{-1}\left( \dfrac{a_0^{[n]}}{b_0^{[n]}} \right) \\[1em] \phi_n = -\arg\left( \dfrac{a_1^{[n]}b_0^{[n]} - a_0^{[n]}b_1^{[n]}}{(a_0^{[n]})^2 + (b_0^{[n]})^2} \right) \end{array} \right.$$

$$\left\{ \begin{array}{l} a_k^{[n-1]} = (a_{k+1}^{[n]}\cos\theta_n - b_{k+1}^{[n]}\sin\theta_n)e^{j\frac{\phi_n}{2}} \\[1em] b_k^{[n-1]} = (a_k^{[n]}\sin\theta_n + b_k^{[n]}\cos\theta_n)e^{-j\frac{\phi_n}{2}} \quad (k=0,1,\ldots,n-1) \end{array} \right.$$

the recurrence formula is solved in the seguence of n=N to n=O, in the first stage of the recurrence formula (n=N), $a_k^{[N]}=a_k$, $b_k^{[N]}=b_k$ (k=0, 1, 2, ... N), where $a_k$ is an expansion coefficient for the polynomial representation indicated below which approximates the desired through port characteristics when the desired characteristics are to be realized by through port, $b_k$ is an expansion coefficient for the polynomial indicated below for cross port characteristics to be obtained from the unitary relationship h(z)h*(z)+f(z)f*(z)=1, or conversely, when $b_k$ is an expansion coefficient for the polynomial representation indicated below which approximates the desired through port characteristics when the desired characteristics are to be realized by through port, $a_k$ is an expansion coefficient for the polynomial indicated below for cross port characteristics to be obtained from the unitary relationship h(z)h*(z)+f(z)f*(z)=1, where z is a complex variable expressed by $z=e^{j\omega\Delta\tau}$ using the complex angular frequency ω=2π(c/λ) (λ=wavelength, c=light velocity), j denotes $\sqrt{-1}$, and Δτ is a delay time corresponding to the constant optical path difference that the two optical wavelengths have, defined by the following formula:

$$h(z) = \left( \sum_{k=0}^{N} a_z Z^{-k} \right) z^{\frac{n}{2}},$$

and $$f(z) = j \left( \sum_{k=o}^{N} b_z Z^{-k} \right) z^{\frac{n}{2}}$$

respectively.

5. An optical signal processor as claimed in claim 1, wherein two optical waveguides capable of amplification and attenuation are used as the two optical waveguides, wherein a pumping light source with a wavelength different from that of an optical signal for pumping the two optical waveguides is provided on an optical injection side of the two optical waveguides, and wherein both of the two optical waveguides have the same amplification and attenuation values.

6. An optical signal processor as claimed in claim 5, wherein the angular representation θn (−π/2 to π/2) of the coupling rate of the directional couplers and the amount of phase shift φn (−π to π) of the N phase controllers are calculated and set based on the recurrence formula mentioned below, and the power amplification/attenuation value Yk of the amplifying/attenuating devices provided on the two waveguides is set such that $$\kappa = \sum_{k=1}^{K} \gamma k$$

(Yk is the power amplification/attenuation value of the entire circuit, and K is the number of the stages where the amplifying/attenuating devices are provided) is fulfilled $$\begin{cases} \theta_n = \tan^{-1}\left( \dfrac{a_o^{[n]}}{b_o^{[n]}} \right) \\ \phi_n = -\arg\left( \dfrac{a_1^{[n]} b_o^{[n]} - a_o^{[n]} b_1^{[n]}}{(a_o^{[n]})^2 + (b_o^{[n]})^2} \right) \\ a_k^{[n-1]} = (a_{k+1}^{[n]} \cos\theta_n - b_{k+1}^{[n]} \sin\theta_n) e^{j\frac{\phi_n}{2}} \\ b_k^{[n-1]} = (a_k^{[n]} \sin\theta_n + + b_k^{[n]} \cos\theta_n) e^{-j\frac{\phi_n}{2}} \\ (k = 0, 1, \ldots, n-1) \end{cases}$$

the recurrence formula is solved in the sequence of n=N to n=0, in the first stage of the recurrence formula (n=N), $a_k^{[N]}=a_k$, $b_k^{[N]}=b_k$ (k=0, 1, 2, ... N), where $a_k$ is an expansion coefficient for the polynomial representation indicated below which approximates the desired through port characteristics when the desired characteristics are to be realized by through port, $b_k$ is an expansion coefficient for the polynomial indicated below for cross port characteristics to be obtained from the unitary relationship $h(z)h_*(z)+f(z)f_*(z)=1$, or conversely, when $b_k$ is an expansion coefficient for the polynomial representation indicated below which approximates the desired through port characteristics when the desired characteristics are to be realized by through port, $a_k$ is an expansion coefficient for the polynomial indicated below for cross port characteristics to be obtained from the unitary relationship $h(z)h_*(z)+f(z)f_*(z)=1$, where z is a complex variable expressed by $z=e^{j\omega}\Delta\tau$ using the complex angular frequency $\omega=2\pi(c/\lambda)$ (λ=wavelength, c=light velocity), j denotes $\sqrt{-1}$, and Δτ is a delay time corresponding to the constant optical path difference that the two optical wavelengths have, defined by the following formula:

$$h(z) = \left( \sum_{k=0}^{N} a_k Z^{-k} \right) z^{\frac{n}{2}}, \text{ and}$$

$$f(z) = j \left( \sum_{k=o}^{N} b_k Z^{-k} \right) z^{\frac{n}{2}}$$

respectively.

7. An optical signal processor as claimed in claim 1, further comprising:
- a power control part for controlling the directional couplers and the phase controllers, and
- an operation part for controlling the power control part, and for storing a database containing one of:
  - the recurrence formulae for obtaining the coupling rates of the directional couplers and the amounts of phase shift of the phase controllers from the desired optical signal processing characteristics, and
  - the results of calculation obtained using the recurrence formulae.

8. An optical signal processor as claimed in claim 7, further comprising:
- an optical extraction part for extracting part of optical signal from the two optical waveguides is disposed at least one site;
- detectors for detecting the respective optical signals extracted from the optical extraction part and converting them into electric signals; and
- a feedback electric wiring extending from the detectors to the operation part for performing feedback control on the basis of the electric signals detected by the detectors.

9. An optical signal processor as claimed in claim 8, wherein the optical extraction part is disposed in at least one of the output ports of the two optical waveguides.

10. An optical signal processor as claimed in claim 8, further comprising an optical extraction part for extracting part of optical signal from at least one of the two optical waveguides provided at the respective two optical waveguides at N sites interposed by the directional couplers.

11. An optical signal processor as claimed in claim 8, further comprising an optical extraction part for extracting part of optical signal from at least one of the two optical waveguides provided at the respective two optical waveguides at N sites interposed by the directional couplers.

12. A method of controlling the optical signal processor of claim 8, which comprises performing feedback control by repeating at certain time intervals a two-step procedure of 1) having the one or plurality of detectors detect the amplitude and phase of optical signal extracted from the optical extraction part at a single or a plurality of different frequency points, and 2) having the operation part calculate, based on the results of detection in 1), the coupling rate of the directional couplers, the amounts of phase shift of the phase controllers, and the amplification/attenuation values of the amplifying/attenuating devices or the optical waveguides capable of amplification and attenuation by use of the database stored in the operation part that contains the recurrence formulae for calculation of parameters or the results of calculation, and transmit for control a control signal to the control part so that a necessary power is supplied to make the values of those parameters close to the desired circuit setting values.

13. An optical signal processor as claimed in claim 8, further comprising:

a wavelength-variable reference light source for generating reference light separable from optical signal provided at input ports for the two optical waveguides to enable reference light to be injected from one of the input ports; and a control line provided to control the reference light source from the operation part.

14. A method of controlling the optical signal processor of claim 13, which comprises performing feedback control by repeating at certain time intervals a two-step procedure of 1) repeating the procedure of having the operation part control the reference light source and set the frequency of reference light, and having the optical extraction parts and detectors separate and detect only the reference light component from optical signal to detect the amplitude and phase of reference light at each extraction point, once or a plurality of times for different frequencies of reference light, and 2) having the operation part calculate, based on the results of detection of reference light at one or a plurality of frequency points obtained in Step 1), the coupling rate of the directional couplers, the amounts of phase shift of the phase controllers, and the amplification/attenuation values of the amplifying/attenuating devices or the optical waveguides capable of amplification and attenuation by use of the database stored in the operation part that contains the recurrence formulae for calculation of parameters or the results of calculation, and transmit for control a control signal to the control part so that a necessary power is supplied to make the values of those parameters close to the desired circuit setting values.

15. An N stage optical signal processor, the N stages being coupled in series such that the output of one stage provides the input to a next stage, each of the N stages comprising:

two optical waveguides;

a directional coupler, having an amplitude coupling rate which may range between a positive and negative amplitude coupling rate, which couples together the two optical waveguides at the output of the respective stage and which couples the respective stage to the two optical waveguides of a next stage, wherein an optical path difference of the two optical waveguides in each of the N stages is the same optical path difference; and at least one phase controller for applying a desired phase shift provided on at least one optical waveguide of the two optical waveguides;

wherein a first stage of the N stage optical signal processor further comprises a further directional coupler which couples an input of the optical signal processor to the two optical waveguides of the first stage;

wherein the directional coupler of the Nth stage provides an output of the optical signal processor;

wherein the angular representation $\theta_n$ ($-\pi/2$ to $\pi/2$) of the amplitude coupling rate of the (N+1) directional couplers, and the amount of phase shift $\phi_n$ ($-\pi$ to $\pi$) of the N phase controllers are calculated and set based on the following recurrence formula:

$$\begin{cases} \theta_n = \tan^{-1}\left(\dfrac{a_0^{[n]}}{b_0^{[n]}}\right) \\ \phi_n = -\arg\left(\dfrac{a_1^{[n]}b_0^{[n]} - a_0^{[n]}b_1^{[n]}}{(a_0^{[n]})^2 + (b_0^{[n]})^2}\right) \end{cases}$$

$$\begin{cases} a_k^{[n-1]} = (a_{k+1}^{[n]}\cos\theta_n - b_{k+1}^{[n]}\sin\theta_n)e^{j\frac{\phi_n}{2}} \\ b_k^{[n-1]} = (a_k^{[n]}\sin\theta_n + b_k^{[n]}\cos\theta_n)e^{-j\frac{\phi_n}{2}} \quad (k=0,1,\ldots,n-1) \end{cases}$$

the recurrence formula is solved in the sequence of n=N to n=0, in the first stage of the recurrence formula (n=N), $a_k^{[N]}=a_k$, $b_k^{[N]}=b_k$ (k=0, 1, 2, ... N), where $a_k$ is an expansion coefficient for the polynomial representation indicated below which approximates the desired through port characteristics when the desired characteristics are to be realized by through port, $b_k$ is an expansion coefficient for the polynomial indicated below for cross port characteristics to be obtained from the unitary relationship $h(z)h_*(z)+f(z)f_*(z)=1$, where z is a complex variable expressed by $z=e^{j\overline{\omega}\Delta\tau}$ using the complex angular frequency $\overline{\omega}$, j denotes $\sqrt{-1}$, and $\Delta\tau$ is a delay time corresponding to the constant optical path difference that the two optical wavelengths have, defined by the following formula:

$$h(z) = \left(\sum_{k=0}^{N} a_z z^{-k}\right) z^{\frac{n}{2}},$$

and $$f(z) = j\left(\sum_{k=0}^{N} b_z z^{-k}\right) z^{\frac{n}{2}}$$

respectively.

16. An optical signal processor as claimed in claim 15, wherein at least one of the directional couplers is a fixed directional coupler having a fixed amplitude coupling rate.

17. An optical signal processor as claimed in claim 15, wherein at least one of the directional couplers is a variable directional coupler having a variable amplitude coupling rate.

18. An optical signal processor as claimed in claim 15, wherein for each of the N stages, both of the two optical waveguides at least one site are further provided with amplifying/attenuating devices having the same amplification/attenuation value.

19. An optical signal processor as claimed in claim 18, wherein the angular representation $\theta_n$ ($-\pi/2$ to $\pi/2$) of the coupling rate of the directional couplers and the amount of phase shift $\phi_n$ ($-\pi$ to $\pi$) of the N phase controllers are calculated and set based on the recurrence formula mentioned below, and the power amplification/attenuation value $Y_k$ of the amplifying/attenuating devices provided on the two waveguides is set such that $$\kappa = \sum_{k=1}^{K} \gamma_k$$

the power amplification/attenuation value of the entire circuit, and K is the number of the stages where the amplifying/attenuating devices are provided) is fulfilled $$\left\{ \begin{array}{l} \theta_n = \tan^{-1}\left(\dfrac{a_0^{[n]}}{b_0^{[n]}}\right) \\ \\ \phi_n = -\arg\left(\dfrac{a_1^{[n]}b_0^{[n]} - a_0^{[n]}b_1^{[n]}}{(a_0^{[n]})^2 + (b_0^{[n]})^2}\right) \end{array} \right.$$

$$\left\{ \begin{array}{l} a_k^{[n-1]} = (a_{k+1}^{[n]}\cos\theta_n - b_{k+1}^{[n]}\sin\theta_n)e^{j\frac{\phi_n}{2}} \\ \\ b_k^{[n-1]} = (a_k^{[n]}\sin\theta_n + b_k^{[n]}\cos\theta_n)e^{-j\frac{\phi_n}{2}} \quad (k=0,1,\ldots,n-1) \end{array} \right.$$

the recurrence formula is solved in the sequence of n=N to n=0, in the first stage of the recurrence formula (n=N), $a_k^{[N]}=a_k$, $b_k^{[N]}=b_k$ (k=0, 1, 2, ... N) where $a_k$ is an expansion coefficient for the polynomial representation indicated below which approximates the desired through port characteristics when the desired characteristics are to be realized by through port, $b_k$ is an expansion coefficient for the polynomial indicated below for cross port characteristics to be obtained from the unitary relationship $h(z)h_*(z)+f(z)f_*(z)=1$, or conversely, when $b_k$ is an expansion coefficient for the polynomial representation indicated below which approximates the desired through port characteristics when the desired characteristics are to be realized by through port, $a_k$ is an expansion coefficient for the polynomial indicated below for cross port characteristics to be obtained from the unitary relationship $h(z)h_*(z)+f(z)f_*(z)=1$, where z is a complex variable expressed by $z=e^{j\omega}\Delta\tau$ using the complex angular frequency $\omega=2\pi(c/\lambda)$ ($\lambda$=wavelength, c=light velocity), j denotes $\sqrt{-1}$, and $\Delta\tau$ is a delay time corresponding to the constant optical path difference that the two optical wavelengths have, defined by the following formula:

$$h(z) = \left(\sum_{k=0}^{N} a_k Z^{-k}\right) z^{\frac{n}{2}}, \text{ and}$$

$$f(z) = j\left(\sum_{k=0}^{N} b_k Z^{-k}\right) z^{\frac{n}{2}}$$

20. An optical signal processor as claimed in claim 15, wherein two optical waveguides capable of amplification and attenuation are used as the two optical waveguides, wherein a pumping light source with a wavelength different from that of an optical signal for pumping the two optical waveguides is provided on an optical injection side of the two optical waveguides, and wherein both of the two optical waveguides have the same amplification and attenuation values.

21. An optical signal processor as claimed in claim 20, wherein the angular representation θn (−π/2 to π/2) of the coupling rate of the directional couplers and the amount of phase shift φn (−π to π) of the N phase controllers are calculated and set based on the recurrence formula mentioned below, and the power amplification/attenuation value Yk of the amplifying/attenuating devices provided on the two waveguides is set such that $$\kappa = \sum_{k=1}^{K} \gamma k$$

(Yk is the power amplification/attenuation value of the entire circuit, and K is the number of the stages where the amplifying/attenuating devices are provided) is fulfilled $$\left\{ \begin{array}{l} \theta_n = \tan^{-1}\left(\dfrac{a_o^{[n]}}{b_o^{[n]}}\right) \\ \\ \phi_n = -\arg\left(\dfrac{a_1^{[n]}b_o^{[n]} - a_o^{[n]}b_1^{[n]}}{(a_o^{[n]})^2 + (b_o^{[n]})^2}\right) \end{array} \right.$$

$$\left\{ \begin{array}{l} a_k^{[n-1]} = (a_{k+1}^{[n]}\cos\theta_n - b_{k+1}^{[n]}\sin\theta_n)e^{j\frac{\phi_n}{2}} \\ \\ b_k^{[n-1]} = (a_k^{[n]}\sin\theta_n + + b_k^{[n]}\cos\theta_n)e^{-j\frac{\phi_n}{2}} \\ (k=0,1,\ldots,n-1) \end{array} \right.$$

the recurrence formula is solved in the sequence of n=N to n=0, in the first stage of the recurrence formula (n=N), $a_k^{[N]}=a_k$, $b_k^{[N]}=b_k$ (k=0, 1, 2, ... N), where $a_k$ is an expansion coefficient for the polynomial representation indicated below which approximates the desired through port characteristics when the desired characteristics are to be realized by through port, $b_k$ is an expansion coefficient for the polynomial indicated below for cross port characteristics to be obtained from the unitary relationship $h(z)h_*(z)+f(z)f_*(z)=1$, or conversely, when $b_k$ is an expansion coefficient for the polynomial representation indicated below which approximates the desired through port characteristics when the desired characteristics are to be realized by through port, $a_k$ is an expansion coefficient for the polynomial indicated below for cross port characteristics to be obtained from the unitary relationship $h(z)h_*(z)+f(z)f_*(z)=1$, where z is a complex variable expressed by $z=e^{j\omega}\Delta\tau$ using the complex angular frequency $\omega=2\pi(c/\lambda)$ ($\lambda$=wavelength, c=light velocity), j denotes $\sqrt{-1}$, and $\Delta\tau$ is a delay time corresponding to the constant optical path difference that the two optical wavelengths have, defined by the following formula:

$$h(z) = \left(\sum_{k=0}^{N} a_k Z^{-k}\right) z^{\frac{n}{2}}, \text{ and}$$

$$f(z) = j\left(\sum_{k=0}^{N} b_k Z^{-k}\right) z^{\frac{n}{2}}$$

respectively.

22. An optical signal processor as claimed in claim 15, further comprising:
   a power control part for controlling the directional couplers and the phase controllers, and
   an operation part for controlling the power control part, and for storing a database containing one of:
      the recurrence formulae for obtaining the coupling rates of the directional couplers and the amounts of phase shift of the phase controllers from the desired optical signal processing characteristics, and
      the results of calculation obtained using the recurrence formulae.

23. An optical signal processor as claimed in claim 22, further comprising:
   an optical extraction part for extracting part of optical signal from the two optical waveguides is disposed at least one site;
   detectors for detecting the respective optical signals extracted from the optical extraction part and converting them into electric signals; and
   a feedback electric wiring extending from the detectors to the operation part for performing feedback control on the basis of the electric signals detected by the detectors.

24. An optical signal processor as claimed in claim 23, wherein the optical extraction part is disposed in at least one of the output ports of the two optical waveguides.

25. An optical signal processor as claimed in claim 23, further comprising an optical extraction part for extracting part of optical signal from at least one of the two optical waveguides provided at the respective two optical waveguides at N sites interposed by the directional couplers.

26. A method of controlling the optical signal processor of claim 23, which comprises performing feedback control by repeating at certain time intervals a two-step procedure of 1) having the one or plurality of detectors detect the amplitude and phase of optical signal extracted from the optical extraction part at a single or a plurality of different frequency points, and 2) having the operation part calculate, based on the results of detection in 1), the coupling rate of the directional couplers, the amounts of phase shift of the phase controllers, and the amplification/attenuation values of the amplifying/attenuating devices or the optical waveguides capable of amplification and attenuation by use of the database stored in the operation part that contains the recurrence formulae for calculation of parameters or the results of calculation, and transmit for control a control signal to the control part so that a necessary power is supplied to make the values of those parameters close to the desired circuit setting values.

27. An optical signal processor as claimed in claim 23, further comprising:

a wavelength-variable reference light source for generating reference light separable from optical signal provided at input ports for the two optical waveguides to enable reference light to be injected from one of the input ports; and a control line provided to control the reference light source from the operation part.

28. A method of controlling the optical signal processor of claim 27, which comprises performing feedback control by repeating at certain time intervals a two-step procedure of 1) repeating the procedure of having the operation part control the reference light source and set the frequency of reference light, and having the optical extraction parts and detectors separate and detect only the reference light component from optical signal to detect the amplitude and phase of reference light at each extraction point, once or a plurality of times for different frequencies of reference light, and 2) having the operation part calculate, based on the results of detection of reference light at one or a plurality of frequency points obtained in Step 1), the coupling rate of the directional couplers, the amounts of phase shift of the phase controllers, and the amplification/attenuation values of the amplifying/attenuating devices or the optical waveguides capable of amplification and attenuation by use of the database stored in the operation part that contains the recurrence formulae for calculation of parameters or the results of calculation, and transmit for control a control signal to the control part so that a necessary power is supplied to make the values of those parameters close to the desired circuit setting values.

29. An N stage optical signal processor, the N stages being coupled in series such that the output of one stage provides the input to a next stage, each of the N stages comprising:

two optical waveguides;

a directional coupler, having an amplitude coupling rate which may range between a positive and negative amplitude coupling rate, which couples together the two optical waveguides at the output of the respective stage and which couples the respective stage to the two optical waveguides of a next stage, the directional couplers also having almost constant coupling rates with respect to wavelength;

wherein an optical path difference of the two optical waveguides in each of the N stages is the same optical path difference wherein a first stage of the N stage optical signal processor further comprises a further directional coupler which couples an input of the optical signal processor to the two optical waveguides of the first stage; and wherein the directional coupler of the Nth stage provides an output of the optical signal processor.

30. An optical signal processor as claimed in claim 29, wherein the directional couplers are variable directional couplers having approximately constant coupling rates with respect to wavelength.

31. An optical signal processor as claimed in claim 30, wherein the variable directional couplers each comprise:

three directional couplers having amplitude coupling rates which may range between positive and negative amplitude coupling rates;

two optical waveguides interposed by the three directional couplers, the respective two optical waveguides at two sites interposed by the three directional couplers having the same optical path difference, the optical path difference being on the order of wavelength; and a phase controller for applying a desired phase shift is provided on at least one optical waveguide of the two optical waveguides interposed by the three directional couplers.

32. An optical signal processor as claimed in claim 30, wherein the variable directional couplers each comprise:

four directional couplers having amplitude coupling rates which may range between positive and negative amplitude coupling rates;

two optical waveguides interposed by the four directional couplers, wherein the two optical waveguides at input and output sides have the same optical path difference, the optical path difference being on the order of wavelength, and wherein the two optical waveguides at a central part have the same waveguide length as each other; and a phase controller for applying a desired phase shift is provided on at least one optical waveguide of the two optical waveguides at the center of the two optical waveguides interposed by the four directional couplers.

33. An optical signal processor as claimed in claim 30, wherein the variable directional couplers each comprise:

four directional couplers having amplitude coupling rates which may range between positive and negative amplitude coupling rates; and two optical waveguides interposed by the four directional couplers, wherein the two optical waveguides at input and output sides have the same optical path difference, the optical path difference being on the order of the wavelength, and wherein the two optical waveguides at a central part have the same waveguide length as each other; and a phase controller for applying a desired phase shift is provided on at least one of the two optical waveguides interposed by the four directional couplers.

34. An optical signal processor as claimed in claim 29, wherein the directional couplers each comprise:

two directional couplers, having amplitude coupling rates which may range between positive and negative amplitude coupling rates; and two optical waveguides interposed between the two directional couplers;

wherein the optical path difference between the two optical waveguides interposed between the two directional couplers is on the order of wavelength.

35. An optical signal processor as claimed in claim 29, wherein the directional couplers each comprise:

three directional couplers having amplitude coupling rates which may range between positive and negative amplitude coupling rates; and two optical waveguides interposed by the three directional couplers, the respective two optical waveguides at two sites interposed by the three directional couplers having the same optical path difference;

wherein the optical path difference is on the order of wavelength.

36. An optical signal processor as claimed in claim 29, wherein for each of the N stages, both of the two optical waveguides at least one site are further provided with amplifying/attenuating devices having the same amplification/attenuation value.

37. An optical signal processor as claimed in claim 36, wherein the angular representation $\theta n$ ($-\pi/2$ to $\pi/2$) of the coupling rate of the directional couplers and the amount of phase shift $\phi n$ ($-\pi$ to $\pi$) of the N phase controllers are calculated and set based on the recurrence formula mentioned below, and the power amplification/attenuation value Yk of the amplifying/attenuating devices provided on the two waveguides is set such that $$\kappa = \sum_{k=1}^{K} \gamma k$$

(Yk is the power amplification/attenuation value of the entire circuit, and K is the number of the stages where the amplifying/attenuating devices are provided) is fulfilled $$\left\{ \begin{array}{l} \theta_n = \tan^{-1}\left(\dfrac{a_o^{[n]}}{b_o^{[n]}}\right) \\ \phi_n = -\arg\left(\dfrac{a_1^{[n]}b_o^{[n]} - a_o^{[n]}b_1^{[n]}}{(a_o^{[n]})^2 + (b_o^{[n]})^2}\right) \\ a_k^{[n-1]} = (a_{k+1}^{[n]}\cos\theta_n - b_{k+1}^{[n]}\sin\theta_n)e^{j\frac{\phi_n}{2}} \\ b_k^{[n-1]} = (a_k^{[n]}\sin\theta_n + + b_k^{[n]}\cos\theta_n)e^{-j\frac{\phi_n}{2}} \\ (k = 0, 1, \ldots, n-1) \end{array} \right\}$$

the recurrence formula is solved in the sequence of n=N to n=0, in the first stage of the recurrence formula (n=N), $a_k^{[N]}=a_k$, $b_k^{[N]}=b_k$ (k=0, 1, 2, ... N), where $a_k$ is an expansion coefficient for the polynomial representation indicated below which approximates the desired through port characteristics when the desired characteristics are to be realized by through port, $b_k$ is an expansion coefficient for the polynomial indicated below for cross port characteristics to be obtained from the unitary relationship $h(z)h_*(z)+f(z)f_*(z)=1$, or conversely, when $b_k$ is an expansion coefficient for the polynomial representation indicated below which approximates the desired through port characteristics when the desired characteristics are to be realized by through port, $a_k$ is an expansion coefficient for the polynomial indicated below for cross port characteristics to be obtained from the unitary relationship $h(z)h_*(z)+f(z)f_*(z)=1$, where z is a complex variable expressed by $z=e^{j\omega}\Delta\tau$ using the complex angular frequency $\omega=2\pi(c/\lambda)$ ($\lambda$=wavelength, c=light velocity), j denotes $\sqrt{-1}$, and $\Delta\tau$ is a delay time corresponding to the constant optical path difference that the two optical wavelengths have, defined by the following formula:

$$h(z) = \left( \sum_{k=0}^{N} a_k Z^{-k} \right) z^{-\frac{n}{2}}, \text{ and}$$

$$f(z) = j \left( \sum_{k=o}^{N} b_k Z^{-k} \right) z^{-\frac{n}{2}}$$

respectively.

38. An optical signal processor as claimed in claim 29, wherein two optical waveguides capable of amplification and attenuation are used as the two optical waveguides, wherein a pumping light source with a wavelength different from that of an optical signal for pumping the two optical waveguides is provided on an optical injection side of the two optical waveguides, and wherein both of the two optical waveguides have the same amplification and attenuation values.

39. An optical signal processor as claimed in claim 38, wherein the angular representation $\theta n$ ($-\pi/2$ to $\pi/2$) of the coupling rate of the directional couplers and the amount of phase shift $\phi n$ ($-\pi$ to $\pi$) of the N phase controllers are calculated and set based on the recurrence formula mentioned below, and the power amplification/attenuation value Yk of the amplifying/attenuating devices provided on the two waveguides is set such that $$\kappa = \sum_{k=1}^{K} \gamma k$$

(Yk is the power amplification/attenuation value of the entire circuit, and K is the number of the stages where the amplifying/attenuating devices are provided) is fulfilled $$\left\{ \begin{array}{l} \theta_n = \tan^{-1}\left(\dfrac{a_o^{[n]}}{b_o^{[n]}}\right) \\ \phi_n = -\arg\left(\dfrac{a_1^{[n]}b_o^{[n]} - a_o^{[n]}b_1^{[n]}}{(a_o^{[n]})^2 + (b_o^{[n]})^2}\right) \\ a_k^{[n-1]} = (a_{k+1}^{[n]}\cos\theta_n - b_{k+1}^{[n]}\sin\theta_n)e^{j\frac{\phi_n}{2}} \\ b_k^{[n-1]} = (a_k^{[n]}\sin\theta_n + + b_k^{[n]}\cos\theta_n)e^{-j\frac{\phi_n}{2}} \\ (k = 0, 1, \ldots, n-1) \end{array} \right\}$$

the recurrence formula is solved in the sequence of n=N to n=0, in the first stage of the recurrence formula (n=N), $a_k^{[N]}=a_k$, $b_k^{[N]}=b_k$ (k=0, 1, 2, ... N), where $a_k$ is an expansion coefficient for the polynomial representation indicated below which approximates the desired through port characteristics when the desired characteristics are to be realized by through port, $b_k$ is an expansion coefficient for the polynomial indicated below for cross port characteristics to be obtained from the unitary relationship $h(z)h_*(z)+$ f(z)f*(z)=1, or conversely, when $b_k$ is an expansion coefficient for the polynomial representation indicated below which approximates the desired through port characteristics when the desired characteristics are to be realized by through port, $a_k$ is an expansion coefficient for the polynomial indicated below for cross port characteristics to be obtained from the unitary relationship h(z)h*(z)+f(z)f*(z)=1, where z is a complex variable expressed by $z=e^{j\omega}\Delta\tau$ using the complex angular frequency $\omega=2\pi(c/\lambda)$ ($\lambda$=wavelength, c=light velocity), j denotes $\sqrt{-1}$, and $\Delta\tau$ is a delay time corresponding to the constant optical path difference that the two optical wavelengths have, defined by the following formula:

$$h(z) = \left( \sum_{k=0}^{N} a_k Z^{-k} \right) z^{\frac{n}{2}}, \text{ and}$$

$$f(z) = j \left( \sum_{k=0}^{N} b_k Z^{-k} \right) z^{\frac{n}{2}}$$

respectively.

40. An optical signal processor as claimed in claim 29, further comprising:

a power control part for controlling the directional couplers and the phase controllers, and an operation part for controlling the power control part, and for storing a database containing one of:

the recurrence formulae for obtaining the coupling rates of the directional couplers and the amounts of phase shift of the phase controllers from the desired optical signal processing characteristics, and the results of calculation obtained using the recurrence formulae.

41. An optical signal processor as claimed in claim 40, further comprising:

an optical extraction part for extracting part of optical signal from the two optical waveguides is disposed at least one site;

detectors for detecting the respective optical signals extracted from the optical extraction part and converting them into electric signals; and a feedback electric wiring extending from the detectors to the operation part for performing feedback control on the basis of the electric signals detected by the detectors.

42. An optical signal processor as claimed in claim 41, wherein the optical extraction part is disposed in at least one of the output ports of the two optical waveguides.

43. A method of controlling the optical signal processor of claim 41, which comprises performing feedback control by repeating at certain time intervals a two-step procedure of 1) having the one or plurality of detectors detect the amplitude and phase of optical signal extracted from the optical extraction part at a single or a plurality of different frequency points, and 2) having the operation part calculate, based on the results of detection in 1), the coupling rate of the directional couplers, the amounts of phase shift of the phase controllers, and the amplification/attenuation values of the amplifying/attenuating devices or the optical waveguides capable of amplification and attenuation by use of the database stored in the operation part that contains the recurrence formulae for calculation of parameters or the results of calculation, and transmit for control a control signal to the control part so that a necessary power is supplied to make the values of those parameters close to the desired circuit setting values.

44. An optical signal processor as claimed in claim 41, further comprising:

a wavelength-variable reference light source for generating reference light separable from optical signal provided at input ports for the two optical waveguides to enable reference light to be injected from one of the input ports, and a control line provided to control the reference light source from the operation part.

45. A method of controlling the optical signal processor of claim 44, which comprises performing feedback control by repeating at certain time intervals a two-step procedure of 1) repeating the procedure of having the operation part control the reference light source and set the frequency of reference light, and having the optical extraction parts and detectors separate and detect only the reference light component from optical signal to detect the amplitude and phase of reference light at each extraction point, once or a plurality of times for different frequencies of reference light, and 2) having the operation part calculate, based on the results of detection of reference light at one or a plurality of frequency points obtained in Step 1), the coupling rate of the directional couplers, the amounts of phase shift of the phase controllers, and the amplification/attenuation values of the amplifying/attenuating devices or the optical waveguides capable of amplification and attenuation by use of the database stored in the operation part that contains the recurrence formulae for calculation of parameters or the results of calculation, and transmit for control a control signal to the control part so that a necessary power is supplied to make the values of those parameters close to the desired circuit setting values.

46. An optical signal processor as claimed in claim 29, wherein the angular representation $\theta_n$ ($-\pi/2$ to $\pi/2$) of the coupling rate of the directional couplers is calculated and set based on the following recurrence formula:

$$\theta_n = \tan^{-1}\left( \frac{a_o^{[n]}}{b_o^{[n]}} \right)$$

$$\begin{cases} a_k^{[n-1]} = a_{k+1}^{[n]}\cos\theta_n - b_{k+1}^{[n]}\sin\theta_n \\ b_k^{[n-1]} = a_k^{[n]}\sin\theta_n + b_k^{[n]}\cos\theta_n \quad (k=0,1,\ldots,n-1) \end{cases}$$

the recurrence formula is solved in the sequence of n=N to n=O, in the first stage of the recurrence formula (n=N), $a_k^{[N]}=a_k$, $b_k^{[N]}=b_k$ (k=0, 1, 2, . . . N), where $a_k$ is an expansion coefficient for the polynomial representation indicated below which approximates the desired through port characteristics when the desired characteristics are to be realized by through port, $b_k$ is an expansion coefficient for the polynomial indicated below for cross port characteristics to be obtained from the unitary relationship h(z)h*(z)+ f(z)f*(z)=1, where z is a complex variable expressed by $z=e^{j\omega}\Delta\tau$ using the complex angular frequency $\omega=2\pi(c/\lambda)$ ($\lambda$=wavelength, c=light velocity), j denotes $\sqrt{-1}$, and $\Delta\tau$ is a delay time corresponding to the constant optical path difference that the two optical wavelengths have, defined by the following formula:

$$h(z) = \left( \sum_{k=0}^{N} a_k Z^{-k} \right) z^{\frac{n}{2}},$$

and $$f(z) = j \left( \sum_{k=0}^{N} b_k Z^{-k} \right) z^{\frac{n}{2}},$$

respectively.

47. An optical signal processor as claimed in claim 29, wherein the angular representation θn (−π/2 to π/2) of the coupling rate of the directional couplers is calculated and set based on the following recurrence formula:

$$\theta_n = \tan^{-1}\left( \frac{a_o^{[n]}}{b_o^{[n]}} \right)$$

$$\left\{ \begin{array}{l} a_k^{[n-1]} = a_{k+1}^{[n]}\cos\theta_n - b_{k+1}^{[n]}\sin\theta_n \\ b_k^{[n-1]} = a_k^{[n]}\sin\theta_n + b_k^{[n]}\cos\theta_n \ (k=0,1,\ldots,n-1) \end{array} \right\}$$

the recurrence formula is solved in the sequence of n=N to n=O, in the first stage of the recurrence formula (n=N), $a_k^{[N]}$=$a_k$, $b_k^{[N]}$=$b_k$ (k=0, 1, 2, . . . N), where bk is an expansion coefficient for the polynomial representation indicated below which approximates the desired through port characteristics when the desired characteristics are to be realized by through port, ak is an expansion coefficient for the polynomial indicated below for cross port characteristics to be obtained from the unitary relationship h(z)h*(z)+ f(z)f*(z)=1, where z is a complex variable expressed by z=$e^{j\omega}\Delta\tau$ using the complex angular frequency ω=2π(c/λ) (λ=wavelength, c=light velocity), j denotes $\sqrt{-1}$, and Δτ is a delay time corresponding to the constant optical path difference that the two optical wavelengths have, defined by the following formula:

$$h(z) = \left( \sum_{k=0}^{N} a_k Z^{-k} \right) z^{\frac{n}{2}},$$

and $$f(z) = j \left( \sum_{k=o}^{N} b_k Z^{-k} \right) z^{\frac{n}{2}},$$

respectively.

48. A method of designing a nonfeedback 2-input 2-output optical signal processor with a lattice structure constructed of serially combined basic constituent elements each comprising two optical waveguides having an optical path difference corresponding to a delay time, Δτ, and directional couplers having positive and negative amplitude coupling rates provided on one side (or on both sides only at the first stage) of the two waveguides for coupling together the two optical waveguides, wherein when desired circuit characteristics $f_o$ (z) for cross port are given, the coupling rate, an unknown parameter of the circuit, of the directional couplers having positive and negative amplitude coupling rates which constitute the respective basic constituent elements can be calculated in accordance with the following procedure so that the cross port output characteristics satisfy the desired circuit characteristics:

(1) Approximating $f_o$ (z) by the polynomial for z, $$f(z) = j \left( \sum_{k=o}^{N} b_k Z^{-k} \right) z^{\frac{n}{2}}$$

where z is a complex variable expressed by z=$e^{j\omega}\Delta\tau$ using the complex angular frequency ω=2π(c/π) (π=wavelength, c=light velocity), j denotes $\sqrt{-1}$, and Δτ is a delay time corresponding to the constant optical path difference that the two optical wavelengths have;

(2) Normalizing the real expansion coefficient $b_k$ for f(z) so that f(z) satisfies $$\max_{|z|=1} |f(z)| \leq 1;$$

(3) Obtaining from f(z) the circuit characteristics for through port, $$h(z) = \left( \sum_{k=0}^{N} a_k Z^{-k} \right) z^{\frac{n}{2}}$$

$a_k$ is a real expansion coefficient), by utilizing the relationship h(z)h*(z)=1−f(z)f*(z), to complete a 2×2 unitary matrix S representing the entire circuit characteristics $$S = \begin{pmatrix} h(z) & -f_*(z) \\ f(z) & h_*(z) \end{pmatrix}$$

where the subscript * is defined by $$h_*(z) = h^* \left( \frac{1}{z^*} \right),$$

and the superscript * denotes a complex conjugate;

(4) Decomposing the entire circuit characteristics matrix S into the form S=$S_N S_{N-1}$ . . . $S_2 S_1 S_0$ by use of the unitary feature of the circuit characteristics matrix $S_n$ of each basic constituent element, to obtain the circuit parameters, such that the following recurrence formula is solved in the sequence of from n=N to n=O, whereby the angular representation $\theta_n$ (−π/2 to π/2) of the coupling rate of the directional couplers having positive and negative amplitude coupling rates that constitute the respective basic constituent elements is calculated:

$$\theta_n = \tan^{-1}\left( \frac{a_o^{[n]}}{b_o^{[n]}} \right)$$

$$\left\{ \begin{array}{l} a_k^{[n-1]} = a_{k+1}^{[n]}\cos\theta_n - b_{k+1}^{[n]}\sin\theta_n \\ b_k^{[n-1]} = a_k^{[n]}\sin\theta_n + b_k^{[n]}\cos\theta_n \end{array} \right. (k=0,1,\ldots,n-1) \right\}$$

provided that $a_o^{[n]}$, $b_o^{[n]}$ is a real expansion coefficient in $S^{[n]}$=$S_n S_{n-1}$ . . . $S_2 S_1 S_0$, and in the initial stage of the recurrence formula (n=N) $a_k^{[N]}$=$a_k$, $b_k^{[N]}$=$b_k$ (k=o, 1, 2, . . . N); and (5) Recalculating the angular representation $\theta_n$ of the coupling rate of the directional coupler obtained in Step (4) as circuit parameters for realization of an optical circuit, such as core size, intercore distance of the coupling portion of the directional coupler, and coupling length.

49. A method of designing a nonfeedback 2-input 2-output optical signal processor with a lattice structure constructed of serially combined basic constituent elements each comprising two optical waveguides having an optical path difference corresponding to a delay time, Δτ, and directional couplers having positive and negative amplitude coupling rates provided on one side (or on both sides only at the first stage) of the two waveguides for coupling together the two optical waveguides, wherein when desired circuit characteristics $f_o$ (z) for cross port are given, the coupling rate, an unknown parameter of the circuit, of the directional couplers having positive and negative amplitude coupling rates which constitute the respective basic constituent elements can be calculated in accordance with the following procedure so that the cross port output characteristics satisfy the desired circuit characteristics:

(1) Approximating $f_0$ (z) by the polynomial for z, $$h(z) = \left( \sum_{k=o}^{N} a_k Z^{-k} \right) z^{\frac{n}{2}}$$

where z is a complex variable expressed by $z=e^{j\omega \Delta \tau}$ using the complex angular frequency $\omega=2\pi(c/\lambda)$ ($\lambda$=wavelength, c=light velocity), j denotes $\sqrt{-1}$, and $\Delta \tau$ is a delay time corresponding to the constant optical path difference that the two optical wavelengths have;

(2) Normalizing the real expansion coefficient $a_k$ for f(z) so that f(z) satisfies $$\max_{|z|=1} |f(z)| \leq 1;$$

(3) Obtaining from f(z) the circuit characteristics for through port, $$f(z) = j \left( \sum_{k=0}^{N} b_k Z^{-k} \right) z^{\frac{n}{2}}$$

($b_k$ is a real expansion coefficient), by utilizing the relationship $f(z)f_*(z)=1-h(z)h_*(z)$, to complete a 2×2 unitary matrix S representing the entire circuit characteristics $$S = \begin{pmatrix} h(z) & -f_*(z) \\ f(z) & h_*(z) \end{pmatrix}$$

where the subscript * is defined by $$h_*(z) = h^* \left( \frac{1}{z^*} \right),$$

and the superscript * denotes a complex conjugate;

(4) Decomposing the entire circuit characteristics matrix S into the form $S=S_N S_{N-1} \ldots S_2 S_1 S_0$ by use of the unitary feature of the circuit characteristics matrix $S_N$ of each basic constituent element, to obtain the circuit parameters, such that the following recurrence formula is solved in the sequence of from n=N to n=O, whereby the angular representation $\theta_n$ ($-\pi/2$ to $\pi/2$) of the coupling rate of the directional couplers having positive and negative amplitude coupling rates that constitute the respective basic constituent elements is calculated:

$$\theta_n = \tan^{-1} \left( \frac{a_o^{[n]}}{b_o^{[n]}} \right)$$

$$\left\{ \begin{array}{l} a_k^{[n-1]} = a_{k+1}^{[n]}\cos\theta_n - b_{k+1}^{[n]}\sin\theta_n \\ b_k^{[n-1]} = a_k^{[n]}\sin\theta_n + b_k^{[n]}\cos\theta_n \end{array} \right. \quad (k=0,1,\ldots,n-1)$$

provided that $a_o^{[n]}$, $b_o^{[n]}$ is a real expansion coefficient in $S^{[n]}=S_n S_{n-1} \ldots S_2 S_1 S_0$, and in the initial stage of the recurrence formula (n=N) $a_k^{[N]}=a_k$, $b_k^{[N]}=b_k$ (k=o, 1, 2, ... N); and (5) Recalculating the angular representation $\theta_n$ of the coupling rate of the directional coupler obtained in Step (4) as circuit parameters for realization of an optical circuit, such as core size, intercore distance of the coupling portion of the directional coupler, and coupling length.

50. A method of designing an optical signal processor having a structure comprising two optical waveguides, and N+1 directional couplers having positive and negative amplitude coupling rates which couple together the two optical waveguides at N+1 different sites, said respective two optical waveguides at N sites interposed by the N+1 directional couplers having a constant optical path difference, and a phase controller for applying a desired phase shift being provided on at least one of the two optical waveguides disposed at each of the N sites, characterized in that when desired circuit characteristics $f_o$ (z) for cross port are given, the coupling rate of the directional coupler having positive and negative amplitude coupling rates which constitutes each basic constituent element, and the amount of phase shift of the phase controller, both being unknown parameters of the circuit, can be calculated in accordance with the following procedure so that the cross port output characteristics satisfy the desired circuit characteristics:

(1) Approximating $f_o$ (z) by the polynomial for z, $$f(z) = j \left( \sum_{k=o}^{N} b_k Z^{-k} \right) z^{\frac{n}{2}}$$

where z is a complex variable expressed by $z=e^{j\omega \Delta \tau}$ using the complex angular frequency $\omega=2\pi(c/\lambda)$ ($\lambda$=wavelength, c=light velocity), j denotes $\sqrt{-1}$, and $\Delta \tau$ is a delay time corresponding to the constant optical path difference that the two optical wavelengths have;

(2) Normalizing the complex expansion coefficient $b_k$ for f(z) so that f(z) satisfies $$\max_{|z|=1} |f(z)| \leq 1;$$

(3) Obtaining from f(z) the circuit characteristics for through port, $$h(z) = \left( \sum_{k=0}^{N} a_k Z^{-k} \right) z^{\frac{n}{2}}$$

$a_k$ is a complex expansion coefficient), by utilizing the relationship $h(z)h_*(z)=1-f(z)f_*(z)$, to complete a 2×2 unitary matrix S representing the entire circuit characteristics $$S = \begin{pmatrix} h(z) & -f_*(z) \\ f(z) & h_*(z) \end{pmatrix}$$

where the subscript * is defined by $$h_*(z) = h^* \left( \frac{1}{z^*} \right),$$

and the superscript * denotes a complex conjugate;

(4) Decomposing the entire circuit characteristics matrix S into the form $S=S_N S_{N-1} \ldots S_2 S_1 S_0$ by use of the unitary feature of the circuit characteristics matrix $S_n$ of each basic constituent element, to obtain the circuit parameters, such that the following recurrence formula is solved in the sequence of from n=N to n=O, whereby the angular representation $\theta_n$ ($-\pi/2$ to $\pi/2$) of the coupling rate of the directional couplers having positive and negative amplitude coupling rates that constitutes each basic constituent element, and the amount of phase shift, $\phi n$ ($-\pi$ to $\pi$), of the phase controller are calculated:

$$\left\{ \begin{array}{l} \theta_n = \tan^{-1}\left( \dfrac{a_o^{[n]}}{b_o^{[n]}} \right) \\ \phi_n = -\arg\left( \dfrac{a_1^{[n]} b_o^{[n]} - a_o^{[n]} b_1^{[n]}}{(a_o^{[n]})^2 + (b_o^{[n]})^2} \right) \end{array} \right.$$

$$\left\{ \begin{array}{l} a_k^{[n-1]} = a_{k+1}^{[n]}\cos\theta_n - b_{k+1}^{[n]}\sin\theta_n)e^{j\frac{\phi_n}{2}} \\ b_k^{[n-1]} = a_k^{[n]}\sin\theta_n + b_k^{[n]}\cos\theta_n)e^{-j\frac{\phi_n}{2}} \quad (k=0,1,\ldots,n-1) \end{array} \right.$$

provided that $a_o^{[n]}$, $b_o^{[n]}$ is a real expansion coefficient in $S^{[n]} = S_n S_{n-1} \ldots S_2 S_1 S_0$, and in the initial stage of the recurrence formula (n=N) $a_k^{[N]} = a_k$, $b_k^{[N]} = b_k$ (k=0, 1, 2, ... N); and (5) Recalculating the angular representation $\theta_n$ ($-\pi/2$ to $\pi/2$) of the coupling rate of the directional coupler and the amount of phase shift, $\phi n$ ($-\pi$ to $\pi$), of the phase controller obtained in Step (4) as circuit parameters for realization of an optical circuit, such as core size, intercore distance of the coupling portion of the directional coupler, coupling length, size of a heater forming the phase controller, and current applied to the heater.

51. A method of designing an optical signal processor having a structure comprising two optical waveguides, and N+1 directional couplers having positive and negative amplitude coupling rates which couple together the two optical waveguides at N+1 different sites, said respective two optical waveguides at N sites interposed by the N+1 directional couplers having a constant optical path difference, and a phase controller for applying a desired phase shift being provided on at least one of the two optical waveguides disposed at each of the N sites, characterized in that when desired circuit characteristics $f_o(z)$ for cross port are given, the coupling rate of the directional coupler having positive and negative amplitude coupling rates which constitutes each basic constituent element, and the amount of phase shift of the phase controller, both being unknown parameters of the circuit, can be calculated in accordance with the following procedure so that the cross port output characteristics satisfy the desired circuit characteristics:

(1) Approximating $h_0(z)$ by the polynomial for z, $$h(z) = \left( \sum_{k=o}^{N} a_k Z^{-k} \right) z^{\frac{n}{2}}$$

where z is a complex variable expressed by $z = e^{j\omega\Delta\tau}$ using the complex angular frequency $\omega = 2\pi(c/\lambda)$ ($\lambda$=wavelength, c=light velocity), j denotes $\sqrt{-1}$, and $\Delta\tau$ is a delay time corresponding to the constant optical path difference that the two optical wavelengths have;

(2) Normalizing the complex expansion coefficient $b_k$ for h(z) so that h(z) satisfies $$\max_{|z|=1} |f(z)| \leq 1;$$

(3) Obtaining from h(z) the circuit characteristics for through port, $$f(z) = j\left( \sum_{k=0}^{N} b_k Z^{-k} \right) z^{\frac{n}{2}}$$

($b_k$ is a complex expansion coefficient), by utilizing the relationship $f(z)f_*(z) = 1 - h(z)h_*(z)$, to complete a 2×2 unitary matrix S representing the entire circuit characteristics $$S = \begin{pmatrix} h(z) & -f_*(z) \\ f(z) & h_*(z) \end{pmatrix}$$

where the subscript * is defined by $$h_*(z) = h^*\left( \dfrac{1}{z^*} \right),$$

and the superscript * denotes a complex conjugate;

(4) Decomposing the entire circuit characteristics matrix S into the form $S = S_N S_{N-1} \ldots S_2 S_1 S_0$ by use of the unitary feature of the circuit characteristics matrix $S_n$ of each basic constituent element, to obtain the circuit parameters, such that the following recurrence formula is solved in the sequence of from n=N to n=O, whereby the angular representation $\theta_n$ ($-\pi/2$ to $\pi/2$) of the coupling rate of the directional coupler that constitutes each basic constituent element, and the amount of phase shift, $\phi n$ ($-\pi$ to $\pi$), of the phase controller are calculated:

$$\left\{ \begin{array}{l} \theta_n = \tan^{-1}\left( \dfrac{a_o^{[n]}}{b_o^{[n]}} \right) \\ \phi_n = -\arg\left( \dfrac{a_1^{[n]} b_o^{[n]} - a_o^{[n]} b_1^{[n]}}{(a_o^{[n]})^2 + (b_o^{[n]})^2} \right) \end{array} \right.$$

$$\left\{ \begin{array}{l} a_k^{[n-1]} = (a_{k+1}^{[n]}\cos\theta_n - b_{k+1}^{[n]}\sin\theta_n)\,e^{j\frac{\phi_n}{2}} \\ b_k^{[n-1]} = (a_k^{[n]}\sin\theta_n + b_k^{[n]}\cos\theta_n)\,e^{-j\frac{\phi_n}{2}} \quad (k=0,1,\ldots,n-1) \end{array} \right.$$

provided that $a_o^{[n]}$, $b_o^{[n]}$ is a real expansion coefficient in $S^{[n]} = S_n S_{n-1} \ldots S_2 S_1 S_0$, and in the initial stage of the recurrence formula (n=N) $a_k^{[N]} = a_k$, $b_k^{[N]} = b_k$, (k=0, 1,2, ..., N); and (5) Recalculating the angular representation $\theta_n$ ($-\pi/2$ to $\pi/2$) of the coupling rate of the directional coupler and the amount of phase shift, $\phi n$ ($-\pi$ to $\pi$), of the phase controller obtained in Step (4) as circuit parameters for realization of an optical circuit, such as core size, intercore distance of the coupling portion of the directional coupler, coupling length, size of a heater forming the phase controller, and current applied to the heater.

52. A method of producing an optical signal processor having a structure comprising two optical waveguides, and N+1 directional couplers having positive and negative amplitude coupling rates which couple together the two optical waveguides at N+1 different sites, said respective two optical waveguides at N sites interposed by the N+1 directional couplers having a constant optical path difference, characterized by having a designing step such that when desired circuit characteristics $f_o(z)$ ($h_o(z)$) for cross port (through port) are given, the circuit parameters necessary for the production are calculated in accordance with the following procedure so that the cross port (through port) output characteristics satisfy the desired circuit characteristics:

(1) Approximating the desired characteristics $f_o(z)$ ($h_o(z)$) by the polynomial for z, $$f(z) = j \left( \sum_{k=0}^{N} a_k Z^{-k} \right) z^{\frac{N}{2}} \quad \left( h(z) = \left( \sum_{k=0}^{N} a_k^k z \right) z^{\frac{N}{2}} \right)$$

where z is a complex variable expressed by $z = e^{j\omega \Delta \tau}$ using the complex angular frequency $\omega = 2\pi(c/\lambda)$ ($\lambda$=wavelength, c=light velocity), j denotes $\sqrt{-1}$, and $\Delta\tau$ is a delay time corresponding to the constant optical path difference that the two optical wavelengths have;

2) Normalizing the real expansion coefficient $b_k$ ($a_k$) for f(z) (h(z)) so that the best approximation polynomial $f(z)$ ($h_o(z)$) satisfies $$\max_{|z|=1} |f(z)| \leq 1 \quad \left( \max_{|z|=1} |h(z)| \leq 1 \right):$$

(3) Obtaining from the normalized best approximation polynomial f(z) (h(z)) the circuit characteristics for through port (cross port), $$h(z) = \left( \sum_{k=0}^{N} a_k Z^{-k} \right) z^{\frac{N}{2}} \quad \left( f(z) = \left( \sum_{k=0}^{N} b_k Z^{-k} \right) z^{\frac{N}{2}} \right)$$

by utilizing the relationship $h(z)h_*(z) + f(z)f_*(z) = 1$, to complete a 2×2 unitary matrix S representing the entire circuit characteristics $$S = \begin{pmatrix} h(z) & -f_*(z) \\ f(z) & h_*(z) \end{pmatrix}$$

where the subscript * is defined by $$h_*(z) = h^* \left( \frac{1}{z^*} \right),$$

and the superscript * denotes a complex conjugate;

(4) Decomposing the entire circuit characteristics matrix S into the form $S = S_N S_{N-1} \ldots S_2 S_1 S_0$ by use of the unitary feature of the circuit characteristics matrix $S_n$ of each basic constituent element, to obtain the circuit parameters, such that the following recurrence formula is solved in the sequence of from n=N to n=O, whereby the angular representation $\theta_n$ ($-\pi/2$ to $\pi/2$) of the coupling rate of the directional coupler that constitutes each basic constituent element, and the amount of phase shift, $\phi n$ ($-\pi$ to $\pi$), of the phase controller are calculated:

$$\theta_n = \tan^{-1} \left( \frac{a_o^{[n]}}{b_o^{[n]}} \right)$$

-continued $$\begin{cases} a_k^{[n-1]} = a_{k+1}^{[n]} \cos\theta_n - b_{k+1}^{[n]} \sin\theta_n \\ b_k^{[n-1]} = a_k^{[n]} \sin\theta_n + b_k^{[n]} \cos\theta_n \quad (k = 0, 1, \ldots, n-1) \end{cases}$$

provided that $a_o^{[n]}$, $b_o^{[n]}$ is a real expansion coefficient in $S^{[n]} = S_n S_{n-1} \ldots S_2 S_1 S_0$, and in the initial stage of the recurrence formula (n=N) $a_k^{[N]} = a_k$, $b_k^{[N]} = b_k$ (k=o, 1, 2, ..., N);

(5) Recalculating the angular representation $\theta_n$ of the coupling rate of the directional coupler obtained in Step (4) as circuit parameters for realization of an optical circuit, such as core size, intercore distance of the coupling portion of the directional coupler, and coupling length; and (6) Producing said two optical waveguides and said variable directional coupler on the basis of the specific parameters obtained in the process (5) and obtaining said optical signal processor by combining said two optical waveguides and said variable directional coupler.

53. A method of producing an optical signal processor as claimed in claim 52, which further includes a circuit parameter adjusting step for correcting preparation errors for the circuit parameters of the resulting optical signal processor by repeating a plurality of times the following adjusting procedure:

(1) Obtaining the through port characteristics $h(\omega_n)$ and the cross port characteristics $f(\omega_n)$ by measuring the amplitude and phase characteristics of the resulting signal processor for different frequencies $\omega_n$ (n=0, 1, 2, ..., N), and obtaining the expansion coefficients $a_k$ and $b_k$ by solving the following simultaneous equations:

$$\begin{cases} \sum_{k=0}^{N} a_k e^{-jk\omega_n \Delta\tau} = h(\omega_n) \\ \sum_{k=0}^{N} b_k e^{-jk\omega_n \Delta\tau} = -j \cdot f(\omega_n) (n = 0, 1, 2, \ldots, N) \end{cases}$$

where j denotes $\sqrt{-1}$, and $\Delta\tau$ is a delay time corresponding to the constant optical path difference that the two optical wavelengths have, and Calculating, based on the expansion coefficients $a_k$ and $b_k$ obtained, the angular representation $\theta_n$ of the coupling rate of the directional coupler of the optical signal processor prepared, and the amount of phase shift, $\phi_n$, of the phase controller thereof $$\begin{cases} \theta_n = \tan^{-1} \left( \frac{a_0^{[n]}}{b_0^{[n]}} \right) \\ \phi_n = -\arg \left( \frac{a_1^{[n]} b_0^{[n]} - a_0^{[n]} b_1^{[n]}}{(a_0^{[n]})^2 + (b_0^{[n]})^2} \right) \\ a_k^{[n-1]} = (a_{k+1}^{[n]} \cos\theta_n - b_{k+1}^{[n]} \sin\theta_n) e^{j\frac{\phi_n}{2}} \\ b_k^{[n-1]} = (a_k^{[n]} \sin\theta_n + b_k^{[n]} \cos\theta_n) e^{-j\frac{\phi_n}{2}} \quad (k = 0, 1, \ldots, n-1) \end{cases}$$

provided that in the initial stage of the above recurrence formula (n=N) $a_k^{[N]} = a_k$, $b_k^{[N]} = b_k$ (k=0, 1, 2, ..., N); and (2) Adjusting the amount of phase shift of a phase controller constituting the variable directional coupler, and the amount of phase shift of a phase controller on the two optical waveguides with different optical path lengths so as to make small the differences of the angular representation $\theta_n$ of the coupling rate of the directional coupler and the amount of phase shift, $\phi_n$, of the phase controller from the desired values of circuit parameters.

54. A method of producing an optical signal processor as claimed in claim 52, which further includes a circuit parameter adjusting step for correcting preparation errors for the circuit parameters of the resulting optical signal processor by repeating a plurality of times the following trimming procedure:

(1) Obtaining the through port characteristics $h(\omega_n)$ and the cross port characteristics $f(\omega_n)$ by measuring the amplitude and phase characteristics of the resulting signal processor for different frequencies $\omega_n$ (n=0, 1, 2, . . . , N), and obtaining the expansion coefficients $a_k$ and $b_k$ by solving the following simultaneous equations:

$$\begin{cases} \sum_{k=0}^{N} a_k e^{-jk\omega_n \Delta\tau} = h(\omega_n) \\ \sum_{k=0}^{N} b_k e^{-jk\omega_n \Delta\tau} = -j \cdot f(\omega_n)(n=0,1,2,\ldots,N) \end{cases}$$

where j denotes $\sqrt{-1}$, and $\Delta\tau$ is a delay time corresponding to the constant optical path difference that the two optical wavelengths have, and Calculating, based on the expansion coefficients $a_k$ and $b_k$ obtained, the angular representation $\theta_n$ of the coupling rate of the directional coupler of the optical signal processor prepared, and the amount of phase shift, $\phi_n$, of the phase controller thereof $$\begin{cases} \theta_n = \tan^{-1}\left(\dfrac{a_0^{[n]}}{b_0^{[n]}}\right) \\ \phi_n = -\arg\left(\dfrac{a_1^{[n]} b_0^{[n]} - a_0^{[n]} b_1^{[n]}}{(a_0^{[n]})^2 + (b_0^{[n]})^2}\right) \\ a_k^{[n-1]} = (a_{k+1}^{[n]}\cos\theta_n - b_{k+1}^{[n]}\sin\theta_n) e^{j\frac{\phi_n}{2}} \\ b_k^{[n-1]} = (a_k^{[n]}\sin\theta_n + b_k^{[n]}\cos\theta_n) e^{-j\frac{\phi_n}{2}} \quad (k=0,1,\ldots,n-1) \end{cases}$$

provided that in the initial stage of the above recurrence formula (n=N) $a_k^{[N]}=a_k$, $b_k^{[N]}=b_k$ (k=0,1,2, . . . , N); and (2) Adjusting the coupling rate of the directional coupler and the amount of phase shift of the phase controller by laser heating the directional coupler and part of the two optical waveguides, so as to make small the differences of the measured angular representation $\theta_n$ of the coupling rate of the directional coupler and the measured amount of phase shift, $\phi_n$, of the phase controller from the desired values of circuit parameters.

55. A method of producing an optical signal processor as claimed in claim 52, which further includes, after Step (6), a trimming step for eliminating the polarization dependency of the resulting optical signal processor by repeating a plurality of times the following polarization trimming procedure:

(1) Forming a stress imparting film, which produces birefringence, on the directional coupler and part of one or both of the two optical waveguides with different optical path lengths;

(2) Obtaining the through port characteristics $h(\omega_n)$ and the cross port characteristics $f(\omega_n)$ by measuring the amplitude and phase responses of the resulting signal processor for different frequencies $\omega_n$ (n=0, 1, 2, . . . , N) in connection with TE and TM polarizations, and obtaining the expansion coefficients $a_k;m$ and $b_k;m$ with respect to TE and TM polarization by solving the following simultaneous equations:

$$\begin{cases} \sum_{k=0}^{N} a_{k;m} e^{-jk\omega_n \Delta\tau} = h(\omega_n) \\ \sum_{k=0}^{N} b_{k;m} e^{-jk\omega_n \Delta\tau} = j \cdot f(\omega_n)(n=0,1,2,\ldots N) \end{cases}$$

where j denotes $\sqrt{-1}$, and $\Delta\tau$ is a delay time corresponding to the constant optical path difference that the two optical wavelengths have, and m=TE, TM, and Calculating, based on the expansion coefficients $a_k;m$ and $b_k;m$ obtained with respect to TE and TM polarizations, the angular representation $\theta n;m$ of the coupling rate of the directional coupler of the resulting optical signal processor with respect to TE and TM polarizations, and the amount of phase shift, $\phi n;m$, of the phase controller thereof $$\begin{cases} \theta_{n;m} = \tan^{-1}\left(\dfrac{a_{0;m}^{[n]}}{b_{0;m}^{[n]}}\right) \\ \phi_n = -\arg\left(\dfrac{a_{1;m}^{[n]} b_{0;m}^{[n]} - a_{0;m}^{[n]} b_{1;m}^{[n]}}{(a_{0;m}^{[n]})^2 + (b_{0;m}^{[n]})^2}\right) \\ a_{k;m}^{[n-1]} = (a_{k+1;m}^{[n]}\cos\theta_{n;m} - b_{k+1;m}^{[n]}\sin\theta_{n;m}) e^{j\frac{\phi_{n;m}}{2}} \\ b_{k;m}^{[n-1]} = (a_{k;m}^{[n]}\sin\theta_{n;m} + b_{k;m}^{[n]}\cos\theta_{n;m}) e^{-j\frac{\phi_{n;m}}{2}} \\ (k=0,1,2,\ldots n-1) \end{cases}$$

provided that in the initial stage of the above recurrence formula (n=N) $a_{k;m}^{[N]}=a_{k;m}$, $b_{k;m}^{[N]}=b_{k;m}$ (k=0, 1, 2, . . . , N); and (3) Performing a step for removing the stress imparting film formed in Step (1), so as to make small the differences of the measured angular representation $\theta_{n;m}$ of the coupling rate of the directional coupler and the measured amount of phase shift, $\phi n;m$, of the phase controller, with respect to TE and TM polarizations, from the desired values of circuit parameters.

56. A method of producing an optical signal processor having a structure comprising two optical waveguides, and N+1 directional couplers having positive and negative amplitude coupling rates which couple together the two optical waveguides at N+1 different sites, said respective two optical waveguides at N sites interposed by the N+1 directional couplers having a constant optical path difference, and a phase controller for applying a desired phase shift being provided on at least one of the two optical waveguides disposed at each of the N sites, characterized by having a designing step such that when desired circuit characteristics $f_o(z)$ ($h_o(z)$) for cross port (through port) are given, unknown circuit parameters necessary for the production are calculated in accordance with the following procedure so that the cross port (through port) output characteristics satisfy the desired circuit characteristics:

(1) Approximating the desired characteristics $f_o$ (z) ($h_o$ (z)) by the polynomial for z, $$f(z) = j \left( \sum_{k=0}^{N} a_k Z^{-k} \right) z^{\frac{N}{2}} \quad \left( h(z) = \left( \sum_{k=0}^{N} a_{kz}^k \right) z^{\frac{N}{2}} \right)$$

where z is a complex variable expressed by $z = e^{j\omega \Delta \tau}$ using the complex angular frequency $\omega = 2\pi(c/\lambda)$ ($\lambda$=wavelength, c=light velocity), j denotes $\sqrt{-1}$, and $\Delta \tau$ is a delay time corresponding to the constant optical path difference that the two optical wavelengths have;

(2) Normalizing the real expansion coefficient $b_k$ ($a_k$) for f(z) (h(z)) so that the best approximation polynomial f(z) ($h_o(z)$) satisfies $$\max_{|z|=1} |f(z)| \leq 1 \quad \left( \max_{|z|=1} |h(z)| \leq 1 \right):$$

(3) Obtaining from the normalized best approximation polynomial f(z) (h(z)) the circuit characteristics for through port (cross port), $$h(z) = \left( \sum_{k=0}^{N} a_k Z^{-k} \right) z^{\frac{N}{2}} \quad \left( f(z) = \left( \sum_{k=0}^{N} b_k Z^{-k} \right) z^{\frac{N}{2}} \right)$$

by utilizing the relationship $h(z)h_*(z) + f(z)f_*(z) = 1$, to complete a 2×2 unitary matrix S representing the entire circuit characteristics $$S = \begin{pmatrix} h(z) & -f_*(z) \\ f(z) & h_*(z) \end{pmatrix}$$

where the subscript * is defined by $$h_*(z) = h^* \left( \frac{1}{z^*} \right),$$

and the superscript * denotes a complex conjugate;

(4) Decomposing the entire circuit characteristics matrix S into the form $S = S_N S_{N-1} \ldots S_2 S_1 S_0$ by use of the unitary feature of the circuit characteristics matrix $S_n$ of each basic constituent element, to obtain the circuit parameters, such that the following recurrence formula is solved in the sequence of from n=N to n=O, whereby the angular representation $\theta_n$ ($-\pi/2$ to $\pi/2$) of the coupling rate of the directional coupler that constitutes each basic constituent element, and the amount of phase shift, $\phi n$ ($-\pi$ to $\pi$), of the phase controller are calculated:

$$\begin{cases} \theta_n = \tan^{-1}\left( \dfrac{a_o^{[n]}}{b_o^{[n]}} \right) \\ \phi_n = -\arg\left( \dfrac{a_1^{[n]} b_o^{[n]} - a_o^{[n]} b_1^{[n]}}{(a_o^{[n]})^2 + (b_o^{[n]})^2} \right) \end{cases}$$

$$\begin{cases} a_k^{[n-1]} = (a_{k+1}^{[n]} \cos\theta_n - b_{k+1}^{[n]} \sin\theta_n) e^{j\frac{\phi_n}{2}} \\ b_k^{[n-1]} = (a_k^{[n]} \sin\theta_n + b_k^{[n]} \cos\theta_n) e^{-j\frac{\phi_n}{2}} \end{cases} \quad (k=0, 1, \ldots, n-1)$$

provided that $a_o^{[n]}$, $b_o^{[n]}$ is a real expansion coefficient in $S^{[n]} = S_n S_{n-1} \ldots S_2 S_1 S_0$, and in the initial stage of the recurrence formula (n=N) $a_k^{[N]} = a_k$, $b_k^{[N]} = b_k$ (k=0,1, 2, ..., N);

(5) Recalculating the angular representation $\theta_n$ ($-\pi/2$ to $\pi/2$) of the coupling rate of the directional coupler and the amount of phase shift, $\phi n$ ($-\pi$ to $\pi$), of the phase controller obtained in Step (4) as circuit parameters for realization of an optical circuit, such as core size, intercore distance of the coupling portion of the directional coupler, coupling length, size of a heater forming the phase controller, and current applied to the heater; and (6) Producing said two optical waveguides and said variable directional coupler on the basis of the specific parameters obtained in the process (5) and obtaining said optical signal processor by combining said two optical waveguides and said variable directional coupler.

57. A method of producing an optical signal processor as claimed in claim 56, which further includes a circuit parameter adjusting step for correcting preparation errors for the circuit parameters of the resulting optical signal processor by repeating a plurality of times the following adjusting procedure:

(1) Obtaining the through port characteristics $h(\omega_n)$ and the cross port characteristics $f(\omega_n)$ by measuring the amplitude and phase characteristics of the resulting signal processor for different frequencies $\omega_n$ (n= 0, 1, 2, ..., N), and obtaining the expansion coefficients $a_k$ and $b_k$ by solving the following simultaneous equations:

$$\begin{cases} \sum_{k=0}^{N} a_k e^{-jk\omega_n \Delta \tau} = h(\omega_n) \\ \sum_{k=0}^{N} b_k e^{-jk\omega_n \Delta \tau} = -j \cdot f(\omega_n) (n=0,1,2,\ldots,N) \end{cases}$$

where j denotes $\sqrt{-1}$, and $\Delta \tau$ is a delay time corresponding to the constant optical path difference that the two optical wavelengths have, and Calculating, based on the expansion coefficients $a_k$ and $b_k$ obtained, the angular representation $\theta_n$ of the coupling rate of the directional coupler of the optical signal processor prepared, and the amount of phase shift, $\phi_n$, of the phase controller thereof $$\begin{cases} \theta_n = \tan^{-1}\left( \dfrac{a_0^{[n]}}{b_0^{[n]}} \right) \\ \phi_n = -\arg\left( \dfrac{a_1^{[n]} b_0^{[n]} - a_0^{[n]} b_1^{[n]}}{(a_0^{[n]})^2 + (b_0^{[n]})^2} \right) \end{cases}$$

$$\begin{cases} a_k^{[n-1]} = (a_{k+1}^{[n]} \cos\theta_n - b_{k+1}^{[n]} \sin\theta_n) e^{j\frac{\phi_n}{2}} \\ b_k^{[n-1]} = (a_k^{[n]} \sin\theta_n + b_k^{[n]} \cos\theta_n) e^{-j\frac{\phi_n}{2}} \end{cases} \quad (k=0,1,\ldots,n-1)$$

provided that in the initial stage of the above recurrence formula (n=N) $a_k^{[N]} = a_k$, $b_k^{[N]} = b_k$ (k=0, 1, 2, ..., N); and (2) Adjusting the amount of phase shift of a phase controller constituting the variable directional coupler, and the amount of phase shift of a phase controller on the two optical waveguides with different optical path lengths so as to make small the differences of the measured angular representation $\theta_n$ of the coupling rate of the directional coupler and the measured amount of phase shift, $\phi_n$, of the phase controller from the desired values of circuit parameters.

58. A method of producing an optical signal processor as claimed in claim 56, which further includes a circuit parameter adjusting step for correcting preparation errors for the circuit parameters of the resulting optical signal processor by repeating a plurality of times the following trimming procedure:

(1) Obtaining the through port characteristics $h(\omega_n)$ and the cross port characteristics $f(\omega_n)$ by measuring the amplitude and phase characteristics of the resulting signal processor for different frequencies $\omega_n$ (n=0, 1, 2, ..., N), and obtaining the expansion coefficients $a_k$ and $b_k$ by solving the following simultaneous equations:

$$\left\{\begin{array}{l} \sum_{k=0}^{N} a_k e^{-jk\omega_n \Delta\tau} = h(\omega_n) \\ \sum_{k=0}^{N} b_k e^{-jk\omega_n \Delta\tau} = -j \cdot f(\omega_n)(n = 0,1,2,\ldots,N) \end{array}\right.$$

where j denotes $\sqrt{-1}$, and $\Delta\tau$ is a delay time corresponding to the constant optical path difference that the two optical wavelengths have, and Calculating, based on the expansion coefficients $a_k$ and $b_k$ obtained, the angular representation $\theta_n$ of the coupling rate of the directional coupler of the optical signal processor prepared, and the amount of phase shift, $\phi_n$, of the phase controller thereof $$\left\{\begin{array}{l} \theta_n = \tan^{-1}\left(\dfrac{a_0^{[n]}}{b_0^{[n]}}\right) \\ \phi_n = -\arg\left(\dfrac{a_1^{[n]}b_0^{[n]} - a_0^{[n]}b_1^{[n]}}{(a_0^{[n]})^2 + (b_0^{[n]})^2}\right) \end{array}\right.$$

$$\left\{\begin{array}{l} a_k^{[n-1]} = (a_{k+1}^{[n]}\cos\theta_n - b_{k+1}^{[n]}\sin\theta_n) e^{j\frac{\phi_n}{2}} \\ b_k^{[n-1]} = (a_k^{[n]}\sin\theta_n + b_k^{[n]}\cos\theta_n) e^{-j\frac{\phi_n}{2}} \quad (k=0,1,\ldots,n-1) \end{array}\right.$$

provided that in the initial stage of the above recurrence formula (n=N) $a_k^{[N]} = a_k$, $b_k^{[N]} = b_k$ (k=0, 1, 2, ..., N); and (2) Adjusting the coupling rate of the directional coupler and the amount of phase shift of the phase controller by laser heating the directional coupler and part of the two optical waveguides, so as to make small the differences of the measured angular representation $\theta_n$ of the coupling rate of the directional coupler and the measured amount of phase shift, $\phi_n$, of the phase controller from the desired values of circuit parameters.

59. A method of producing an optical signal processor as claimed in claim 56, which further includes, after Step (6), a trimming step for eliminating the polarization dependency of the resulting optical signal processor by repeating a plurality of times the following polarization trimming procedure:

(1) Forming a stress imparting film, which produces birefringence, on the directional coupler and part of one or both of the two optical waveguides with different optical path lengths;

(2) Obtaining the through port characteristics $h(\omega_n)$ and the cross port characteristics $f(\omega_n)$ by measuring the amplitude and phase responses of the resulting signal processor for different frequencies $\omega_n$ (n=0, 1, 2, ..., N) in connection with TE and TM polarizations, and obtaining the expansion coefficients $a_{k;m}$ and $b_{k;m}$ with respect to TE and TM polarization by solving the following simultaneous equations:

$$\left\{\begin{array}{l} \sum_{k=0}^{N} a_{k;m} e^{-jk\omega_n \Delta\tau} = h(\omega_n) \\ \sum_{k=0}^{N} b_{k;m} e^{-jk\omega_n \Delta\tau} = j \cdot f(\omega_n)(n = 0,1,2,\ldots N) \end{array}\right.$$

where j denotes $\sqrt{-1}$, and $\Delta\tau$ is a delay time corresponding to the constant optical path difference that the two optical wavelengths have, and m=TE, TM, and Calculating, based on the expansion coefficients $a_{k;m}$ and $b_{k;m}$ obtained with respect to TE and TM polarizations, the angular representation $\theta n;m$ of the coupling rate of the directional coupler of the resulting optical signal processor with respect to TE and TM polarizations, and the amount of phase shift, $\phi n;m$, of the phase controller thereof $$\left\{\begin{array}{l} \theta_{n;m} = \tan^{-1}\left(\dfrac{a_{o;m}^{[n]}}{b_{o;m}^{[n]}}\right) \\ \phi_n = -\arg\left(\dfrac{a_{1;m}^{[n]}b_{o;m}^{[n]} - a_{o;m}^{[n]}b_{1;m}^{[n]}}{(a_{o;m}^{[n]})^2 + (b_{o;m}^{[n]})^2}\right) \\ a_{k;m}^{[n-1]} = (a_{k+1;m}^{[n]}\cos\theta_{n;m} - b_{k+1;m}^{[n]}\sin\theta_{n;m}) e^{j\frac{\phi_{n;m}}{2}} \\ b_{k;m}^{[n-1]} = (a_{k;m}^{[n]}\sin\theta_{n;m} + b_{k;m}^{[n]}\cos\theta_{n;m}) e^{-j\frac{\phi_{n;m}}{2}} \\ (k = 0,1,2,\ldots n-1) \end{array}\right.$$

provided that in the initial stage of the above recurrence formula (n=N) $a_{k;m}^{[N]} = a_{k;m}$, $b_{k;m}^{[N]} = b_{k;m}$ (k=0, 1, 2, ..., N); and (3) Performing a step for removing the stress imparting film formed in Step (1), so as to make small the differences of the measured angular representation $\theta_{n;m}$ of the coupling rate of the directional coupler and the measured amount of phase shift, $\phi n;m$, of the phase controller, with respect to TE and TM polarizations, from the desired values of circuit parameters.

60. An N stage optical signal processor, the N stages being coupled in series such that the output of one stage provides the input to a next stage, each of the N stages comprising:

two optical waveguides;

a directional coupler, having an amplitude coupling rate which may range between a positive and negative amplitude coupling rate, which couples together the two optical waveguides at the output of the respective stage and which couples the respective stage to the two optical waveguides of a next stage, wherein an optical path difference of the two optical waveguides in each of the N stages is the same optical path difference; and at least one phase controller for applying a desired phase shift provided on at least one optical waveguide of the two optical waveguides;

wherein a first stage of the N stage optical signal processor further comprises a further variable directional coupler which couples an input of the optical signal processor to the two optical waveguides of the first stage;

wherein the variable directional coupler of the Nth stage provides an output of the optical signal processor;

wherein the angular representation $\theta_n$ ($-\pi/2$ to $\pi/2$) of the amplitude coupling rate of the (N+1) directional couplers, and the amount of phase shift $\phi n$ ($-\pi$ to $\pi$) of the N phase controllers are calculated and set based on the following recurrence formula:

$$\begin{cases} \theta_n = \tan^{-1}\left(\dfrac{a_o^{[n]}}{b_o^{[n]}}\right) \\ \phi_n = -\arg\left(\dfrac{a_1^{[n]}b_o^{[n]} - a_o^{[n]}b_1^{[n]}}{(a_o^{[n]})^2 + (b_o^{[n]})^2}\right) \\ a_k^{[n-1]} = (a_{k+1}^{[n]}\cos\theta_n - b_{k+1}^{[n]}\sin\theta_n)e^{j\frac{\phi_n}{2}} \\ b_k^{[n-1]} = (a_k^{[n]}\sin\theta_n + b_k^{[n]}\cos\theta_n)e^{-j\frac{\phi_n}{2}} \\ (k=0,1,2,\ldots,n-1) \end{cases}$$

the recurrence formula is solved in the sequence of n=N to n=0, in the first stage of the recurrence formula (n=N), $a_k^{[N]}=a_k$, $b_k^{[N]}=b_k$ (k=0, 1, 2, ... N), where $b_k$ is an expansion coefficient for the polynomial representation indicated below which approximates the desired through port characteristics when the desired characteristics are to be realized by through port, ak is an expansion coefficient for the polynomial indicated below for cross port characteristics to be obtained from the unitary relationship $h(z)h_*(z)+f(z)f_*(z)=1$, where z is a complex variable expressed by $z=e^{j\overline{\omega}\Delta\tau}$ using the complex angular frequency $\overline{\omega}$, j denotes $\sqrt{-1}$, and $\Delta\tau$ is a delay time corresponding to the constant optical path difference that the two optical wavelengths have, defined by the following formula:

$$h(z) = \left(\sum_{k=0}^{N} a_k Z^{-k}\right) z^{\frac{n}{2}},$$

and $$f(z) = j\left(\sum_{k=o}^{N} b_k Z^{-k}\right) z^{\frac{n}{2}},$$

respectively.

61. An optical signal processor as claimed in claim 60, wherein the directional couplers are fixed directional couplers.

62. An optical signal processor as claimed in claim 60, wherein the directional couplers are variable directional couplers.

63. An optical signal processor as claimed in claim 60, wherein for each of the N stages, both of the two optical waveguides at at least one site are further provided with amplifying/attenuating devices having the same amplification/attenuation value.

64. An optical signal processor as claimed in claim 63, wherein the angular representation $\theta n$ ($-\pi/2$ to $\pi/2$) of the coupling rate of the directional couplers and the amount of phase shift $\phi n$ ($-\pi$ to $\pi$) of the N phase controllers are calculated and set based on the recurrence formula mentioned below, and the power amplification/attenuation value Yk of the amplifying/attenuating devices provided on the two waveguides is set such that $$\kappa = \sum_{k=1}^{K} \gamma k$$

(the power amplification/attenuation value of the entire circuit, and K is the number of the stages where the amplifying/attenuating devices are provided) is fulfilled $$\begin{cases} \theta_n = \tan^{-1}\left(\dfrac{a_o^{[n]}}{b_o^{[n]}}\right) \\ \phi_n = -\arg\left(\dfrac{a_1^{[n]}b_o^{[n]} - a_o^{[n]}b_1^{[n]}}{(a_o^{[n]})^2 + (b_o^{[n]})^2}\right) \\ a_k^{[n-1]} = (a_{k+1}^{[n]}\cos\theta_n - b_{k+1}^{[n]}\sin\theta_n)e^{j\frac{\phi_n}{2}} \\ b_k^{[n-1]} = (a_k^{[n]}\sin\theta_n + b_k^{[n]}\cos\theta_n)e^{-j\frac{\phi_n}{2}} \\ (k=0,1,2,\ldots,n-1) \end{cases}$$

the recurrence formula is solved in the sequence of n=N to n=0, in the first stage of the recurrence formula (n=N), $a_k^{[N]}=a_k$, $b_k^{[N]}=b_k$ (k=0, 1, 2, ... N), where $a_k$ is an expansion coefficient for the polynomial representation indicated below which approximates the desired through port characteristics when the desired characteristics are to be realized by through port, $b_k$ is an expansion coefficient for the polynomial indicated below for cross port characteristics to be obtained from the unitary relationship $h(z)h_*(z)+f(z)f_*(z)=1$, or conversely, when $b_k$ is an expansion coefficient for the polynomial representation indicated below which approximates the desired through port characteristics when the desired characteristics are to be realized by through port, $a_k$ is an expansion coefficient for the polynomial indicated below for cross port characteristics to be obtained from the unitary relationship $h(z)h_*(z)+f(z)f_*(z)=1$, where z is a complex variable expressed by $z=e^{j\overline{\omega}\Delta\tau}$ using the complex angular frequency $\omega=2\pi(c/\lambda)$ ($\lambda$=wavelength, c=light velocity), j denotes $\sqrt{-1}$, and $\Delta\tau$ is a delay time corresponding to the constant optical path difference that the two optical wavelengths have, defined by the following formula:

$$h(z) = \left(\sum_{k=0}^{N} a_k Z^{-k}\right) z^{\frac{n}{2}},$$

and $$f(z) = j\left(\sum_{k=o}^{N} b_k Z^{-k}\right) z^{\frac{n}{2}},$$

respectively.

65. An optical signal processor as claimed in claim 60, wherein two optical waveguides capable of amplification and attenuation are used as the two optical waveguides, wherein a pumping light source with a wavelength different from that of an optical signal for pumping the two optical waveguides is provided on an optical injection side of the two optical waveguides, and wherein both of the two optical waveguides have the same amplification and attenuation values.

66. An optical signal processor as claimed in claim 65, wherein the angular representation $\theta n$ ($-\pi/2$ to $\pi/2$ of the coupling rate of the directional couplers and the amount of phase shift $\phi n$ ($-\pi$ to $\pi$) of the N phase controllers are calculated and set based on the recurrence formula mentioned below, and the power amplification/attenuation value Yk of the amplifying/attenuating devices provided on the two waveguides is set such that $$\kappa = \sum_{k=1}^{K} \gamma k$$

(the power amplification/attenuation value of the entire circuit, and K is the number of the stages where the amplifying/attenuating devices are provided) is fulfilled $$\begin{cases} \theta_n = \tan^{-1}\left(\dfrac{a_o^{[n]}}{b_o^{[n]}}\right) \\ \phi_n = -\arg\left(\dfrac{a_1^{[n]}b_o^{[n]} - a_o^{[n]}b_1^{[n]}}{(a_o^{[n]})^2 + (b_o^{[n]})^2}\right) \\ a_k^{[n-1]} = (a_{k+1}^{[n]}\cos\theta_n - b_{k+1}^{[n]}\sin\theta_n)e^{j\frac{\phi_n}{2}} \\ b_k^{[n-1]} = (a_k^{[n]}\sin\theta_n + b_k^{[n]}\cos\theta_n)e^{-j\frac{\phi_n}{2}} \\ (k = 0,1,2,\ldots, n-1) \end{cases}$$

the recurrence formula is solved in the sequence of n=N to n=0, in the first stage of the recurrence formula (n=N), $a_k^{[N]}=a_k$, $b_k^{[N]}=b_k$ (k=0, 1, 2, ... N), where $a_k$ is an expansion coefficient for the polynomial representation indicated below which approximates the desired through port characteristics when the desired characteristics are to be realized by through port, $b_k$ is an expansion coefficient for the polynomial indicated below for cross port characteristics to be obtained from the unitary relationship $h(z)h_*(z)+f(z)f_*(z)=1$, or conversely, when $b_k$ is an expansion coefficient for the polynomial representation indicated below which approximates the desired through port characteristics when the desired characteristics are to be realized by through port, $a_k$ is an expansion coefficient for the polynomial indicated below for cross port characteristics to be obtained from the unitary relationship $h(z)h_*(z)+f(z)f_*(z)=1$, where z is a complex variable expressed by $z=e^{j\omega\Delta\tau}$ using the complex angular frequency $\omega=2\pi(c/\lambda)$ ($\lambda$=wavelength, c=light velocity), j denotes $\sqrt{-1}$, and $\Delta\tau$ is a delay time corresponding to the constant optical path difference that the two optical wavelengths have, defined by the following formula:

$$h(z) = \left(\sum_{k=0}^{N} a_k z^{-k}\right) z^{\frac{n}{2}},$$

and $$f(z) = j\left(\sum_{k=0}^{N} b_k z^{-k}\right) z^{\frac{n}{2}},$$

respectively.

67. An optical signal processor as claimed in claim 60, which includes a power control part for controlling the directional couplers and the phase controllers, and an operation part for controlling the power control part, and which stores in the operation part a database containing the recurrence formulae for obtaining the coupling rates of the directional couplers and the amounts of phase shift of the phase controllers from the desired optical signal processing characteristics, or the results of calculation obtained using the recurrence formulae.

68. An optical signal processor as claimed in claim 67, in which an optical extraction part for extracting part of optical signal from the two optical waveguides is disposed at one site or a plurality of sites, and which further includes detectors for detecting the respective optical signals extracted from the optical extraction part(s) and converting them into electric signals, and a feedback electric wiring extending from the detectors to the operation part for performing feedback control on the basis of the electric signals detected by the detectors.

69. An optical signal processor as claimed in claim 68, wherein the optical extraction part is disposed in at least one of the output ports of the two optical waveguides.

70. An optical signal processor as claimed in claim 68, wherein an optical extraction part for extracting part of optical signal from at least one of the two optical waveguides is provided at the respective two optical waveguides at N sites interposed by the N+1 directional couplers.

71. A method of controlling the optical signal processor of claim 68, which comprises performing feedback control by repeating at certain time intervals a two-step procedure of 1) having the one or plurality of detectors detect the amplitude and phase of optical signal extracted from the optical extraction part at a single or a plurality of different frequency points, and 2) having the operation part calculate, based on the results of detection in 1), the coupling rate of the directional couplers, the amounts of phase shift of the phase controllers, and the amplification/attenuation values of the amplifying/attenuating devices or the optical waveguides capable of amplification and attenuation by use of the database stored in the operation part that contains the recurrence formulae for calculation of parameters or the results of calculation, and transmit for control a control signal to the control part so that a necessary power is supplied to make the values of those parameters close to the desired circuit setting values.

72. An optical signal processor as claimed in claim 68, wherein a wavelength-variable reference light source for generating reference light separable from optical signal is provided at input ports for the two optical waveguides to enable reference light to be injected from one of the input ports, and a control line is provided to control the reference light source from the operation part.

73. A method of controlling the optical signal processor of claim 72, which comprises performing feedback control by repeating at certain time intervals a two-step procedure of 1) repeating the procedure of having the operation part control the reference light source and set the frequency of reference light, and having the optical extraction parts and detectors separate and detect only the reference light component from optical signal to detect the amplitude and phase of reference light at each extraction point, once or a plurality of times for different frequencies of reference light, and 2) having the operation part calculate, based on the results of detecting of reference light at one or a plurality of frequency points obtained in Step 1), the coupling rate of the directional couplers, the amounts of phase shift of the phase controllers, and the amplification/attenuation values of the amplifying/attenuating devices or the optical waveguides capable of amplification and attenuation by use of the database stored in the operation part that contains the recurrence formulae for calculation of parameters or the results of calculation, and transmit for control a control signal to the control part so that a necessary power is supplied to make the values of those parameters close to the desired circuit setting values.

* * * * *